(12) United States Patent
Mohamed

(10) Patent No.: US 10,094,109 B2
(45) Date of Patent: Oct. 9, 2018

(54) CONSTRUCTION BLOCKS

(71) Applicant: Gouda-Torgerson Building Systems LLC, West Point, CA (US)

(72) Inventor: Hazem Hosny Gouda Mohamed, New Bani Sweif (EG)

(73) Assignee: GOUDA-TORGERSON BUILDING SYSTEMS LLC, West Point, CA (US)

( * ) Notice: Subject to any disclaimer, the term of this patent is extended or adjusted under 35 U.S.C. 154(b) by 0 days.

(21) Appl. No.: 15/467,324

(22) Filed: Mar. 23, 2017

(65) Prior Publication Data

US 2018/0223524 A1 Aug. 9, 2018

Related U.S. Application Data

(60) Provisional application No. 62/454,256, filed on Feb. 3, 2017, provisional application No. 62/462,822, filed on Feb. 23, 2017.

(51) Int. Cl.
*E04B 1/00* (2006.01)
*E04B 2/18* (2006.01)
*B28B 1/14* (2006.01)
*B28B 7/00* (2006.01)
*E04C 1/39* (2006.01)
(Continued)

(52) U.S. Cl.
CPC ............... *E04B 2/18* (2013.01); *B28B 1/14* (2013.01); *B28B 7/0079* (2013.01); *E04B 2/22* (2013.01); *E04C 1/39* (2013.01); *E04C 1/397* (2013.01); *E04B 2/24* (2013.01); *E04B 2002/0215* (2013.01); *E04B 2002/0263* (2013.01)

(58) Field of Classification Search
CPC ... E04C 1/39; E04C 1/397; B28B 1/14; B28B 7/0079; E04B 2/22; E04B 2/24; E04B 2002/0215; E04B 2002/0263
USPC .......................................................... 52/604
See application file for complete search history.

(56) References Cited

U.S. PATENT DOCUMENTS 1,356,590 A * 10/1920 Baumann .................. E04B 2/22
52/284
2,392,551 A   5/1943 Roe
(Continued)

OTHER PUBLICATIONS

"Haener Block 16-Inch Open Faced Two Block System" Aug. 19, 2003.
(Continued)

*Primary Examiner* — Charles A Fox
*Assistant Examiner* — James Buckle, Jr.
(74) *Attorney, Agent, or Firm* — Fisher Broyles LLP

(57) ABSTRACT

An interlocking construction block system comprising a family of blocks that interlock along three axes, including a left/right axis, a front/back axis, and an up/down axis. The family of blocks are self-aligning and do not require skilled labor or mortar to create a structure of any length, width, height, or shape. Each block comprises a specific geometry that allows all blocks in the family to interlock in a woven pattern that not only locks the blocks in place but also allows even distribution of structural weights and stresses. The disclosed blocks can be manufactured in different sizes to conform to any building code requirement and to create wall lengths to a one-inch measurement. The blocks may comprise channel openings to allow for plumbing, electrical, and structural reinforcements in the structure and may each be reinforced with an internal mesh cage.

19 Claims, 88 Drawing Sheets

(51) Int. Cl.
*E04B 2/22* (2006.01)
*E04B 2/02* (2006.01)
*E04B 2/24* (2006.01)

(56) References Cited

U.S. PATENT DOCUMENTS

| | | | |
|---|---|---|---|
| 2,684,589 A | 2/1948 | Perreton | |
| 3,888,060 A | 6/1975 | Haener | |
| 4,075,808 A | 2/1978 | Pearlman | |
| 4,107,894 A | 8/1978 | Mullins | |
| 4,314,431 A | 2/1982 | Rabassa | |
| 4,475,326 A | 10/1984 | Hanson | |
| 4,633,630 A * | 1/1987 | Kindylides | E04B 2/50 52/204.2 |
| 4,704,832 A * | 11/1987 | Vassiliadis | E04B 2/22 52/279 |
| 5,575,128 A | 11/1996 | Haener | |
| D387,431 S | 12/1997 | Tremblay | |
| 6,189,282 B1 | 2/2001 | VanderWerf | |
| 6,226,951 B1 | 5/2001 | Azar | |
| 6,508,041 B1 * | 1/2003 | Boot | E04B 2/18 52/578 |
| 6,907,704 B2 | 6/2005 | Ali et al. | |
| 7,665,269 B2 | 2/2010 | Azar | |
| 7,905,070 B2 | 3/2011 | August | |
| 8,132,988 B2 * | 3/2012 | Dawson | B28B 7/241 405/286 |
| 8,266,855 B1 * | 9/2012 | Altararwah | E04B 2/08 52/275 |
| 8,640,407 B2 | 2/2014 | Alsayed et al. | |
| D711,014 S | 8/2014 | MacDonald | |
| 9,435,118 B2 | 9/2016 | Al-Salloum et al. | |
| 2006/0168907 A1 | 8/2006 | Thorpe | |
| 2008/0184649 A1 | 8/2008 | Khan | |
| 2010/0162649 A1 * | 7/2010 | Boot | E02D 29/025 52/426 |
| 2011/0258957 A1 * | 10/2011 | Virnich | E04B 2/42 52/562 |
| 2017/0121973 A1 * | 5/2017 | Brandao | E04C 1/00 |

OTHER PUBLICATIONS

Fonseca, et al. "Axial Capacity of Dry-Stacked Endura Masonry Walls", 15th International Brick and Block Masonry Conference, Brazil 2012.
Martin "New Masonry Block Systems—Same classic look in less time offers opportunities for masonry contractors", Mar. 20, 2017.
Shepersky, "Haener Block General Building Tips".
Haener Block the Mortarless Interlocking System—The Most Cost Effective & Versatile Construction System in the World!
Making Haener Block: Tips and Guidelines.
Vanderwerf "Mortarless Block Systems—An analysis of the six systems on the market".
Y. Korany and S. Humphrey "Proceedings of the 2nd Masonry Mini Symposium Edmonton, Alberta".
International Search Report and Written Opinion dated Mar. 8, 2018 in corresponding PCT application No. PCT/US18/16884.

* cited by examiner

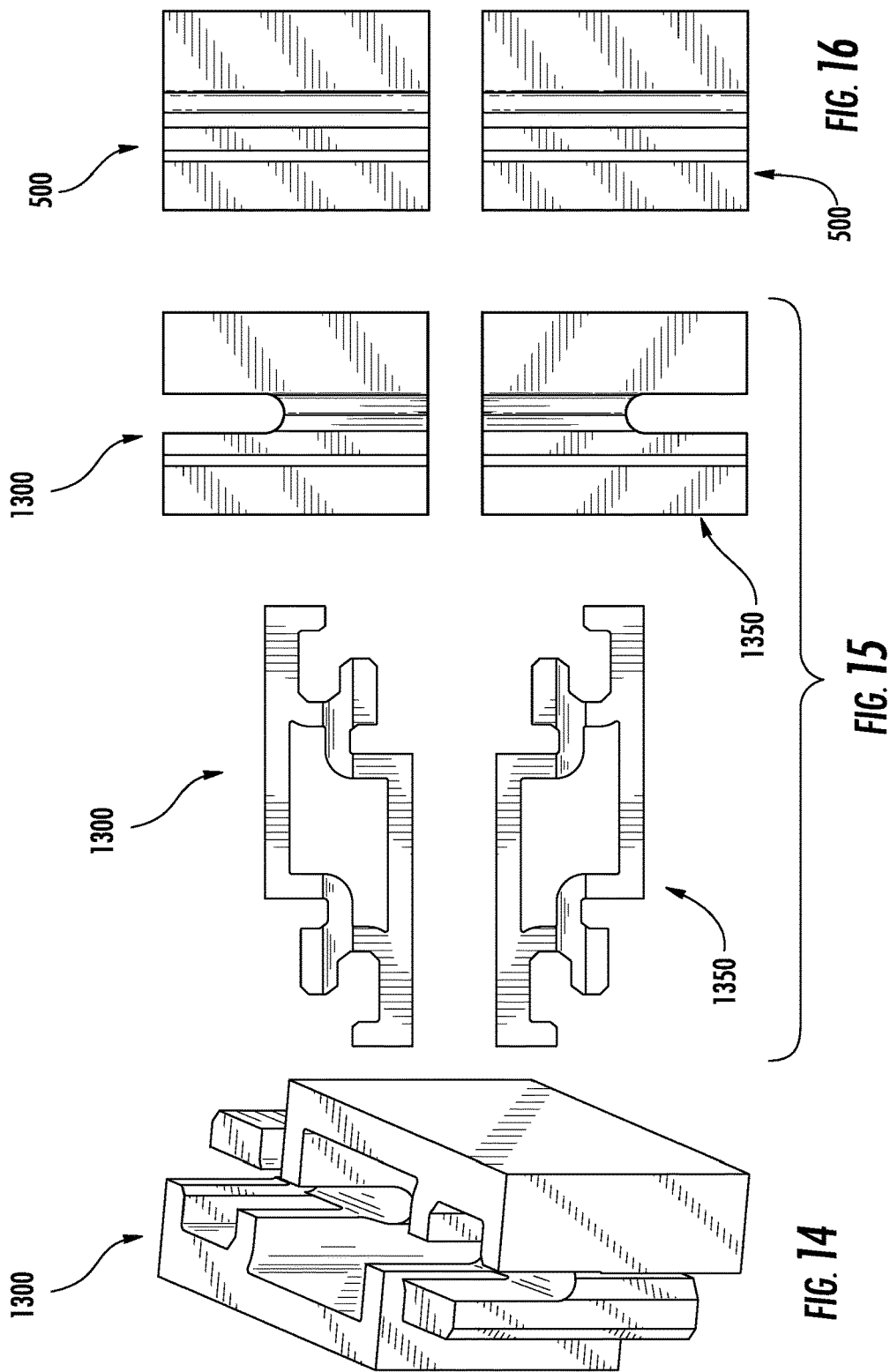

| For 1.2 m wall length | 8 inch | 6 inch | GT block |
|---|---|---|---|
| Block height (mm) | 200 | 200 | 200 |
| Block face length (mm) | 400 | 400 | 300 |
| Block thickness (mm) | 203 | 152 | 150 |
| No. of units in 1.2 m wall length | 3 | 3 | 4 |
| Cross section area (m2) | 0.036036 | 0.027661 | 0.027131 |
| Total Cross section area in 1.2 m | 0.108108 | 0.082983 | 0.108524 |
| Unit Volume (m3) | 0.007207 | 0.005532 | 0.005426 |
| Total Volume in 1.2 m | 0.021621 | 0.016596 | 0.021704 |
| Unit Weight (2100 Kg/m3 density) Kg | 15.14 | 11.62 | 11.3946 |
| Total Weight in 1.2 m | 45.42 | 34.86 | 45.5784 |

CONSTRUCTION BLOCKS

TECHNICAL FIELD

The present disclosure relates generally to masonry units, and more particularly, to improved construction blocks that interlock in three directions to create any length or width of wall structure without the need for a bonding agent such as mortar during assembly.

BACKGROUND

Traditional concrete construction blocks are often rectangular shaped blocks that require mortar and a skilled mason to assemble the blocks into a desired structure. Improper placement of the blocks and/or insufficient or excessive mortar can compromise the integrity and safety of the structure and result in unanticipated expenses for a builder or owner.

A previous attempt at an interlocking block design was presented in the Sparlock system of Canada, which was introduced in the 1980's. However, the Sparlock system of blocks proved to be too heavy and used more concrete material than necessary, and saw only limited use within the construction industry. Sparlock remained in use for many years without any further development or changes. In 2005, other dry stack systems like Haener, Azar blocks, and other construction blocks began to appear on the market, and still other systems have continued to be introduced. These other systems, however, all lack elements of compressive strength and some are very weak. As a result, an improved interlocking construction block system is desired.

BRIEF SUMMARY

Described herein is an interlocking construction block system that can be used to form a rigid structure without the use of a binding agent such as mortar during assembly. Advantageously, the interlocking construction block system requires no prior experience in masonry or other construction trades. Various embodiments of interlocking construction blocks can be combined modularly to create a structural configuration in any length, width, or shape.

In an embodiment, the interlocking construction blocks may comprise internal channels or conduits configured to receive piping, electrical wiring, reinforcing steel beams, rebar, and/or concrete within the channels.

In an embodiment, the interlocking construction blocks may be manufactured using any desired material. For example, the interlocking construction blocks may be manufactured with concrete. However, different materials, such as 3D-printed plastics, expanded polystyrene (EPS) foam or ceramic materials, may also be used.

The embodiments disclosed herein represent a standard family of interlocking construction blocks that meet the ASTM C90 guidelines for concrete masonry units and can be interlocked in various configurations to form a wide variety of structures.

In one embodiment, an interlocking construction block includes: a core section having one or more wall sides, one or more interlocking section attachment sides, and one or more interlocking sections, each section including: a first interlocking portion, which is defined by a first interlocking portion attachment end, a first interlocking portion catch end, and a first interlocking portion catch; a second interlocking portion, which is defined by a second interlocking portion attachment end, and a second interlocking portion key; and an interlocking section bridge capable of connecting the interlocking section to the one or more interlocking section attachment sides of the core section.

In one embodiment, the one or more wall sides of the core section of the interlocking construction block further include a first wall side end and a second wall side end. In one embodiment, the one or more interlocking section attachment sides of the interlocking construction block further include a first interlocking section attachment side end and a second interlocking section attachment side end. In one embodiment, the one or more interlocking sections of the interlocking construction block further include one or more negative space gaps capable of receiving an interlocking section of a second interlocking construction block.

In one embodiment, the interlocking construction block includes a core section and two interlocking sections spaced approximately 180 degrees from each other, where the block is capable of creating a section of a wall structure. In one example, the interlocking construction block is approximately 8" tall and is a stretcher block. In another example, the interlocking construction block is approximately 4" tall and is a half-stretcher block.

In one embodiment, the interlocking construction block includes a core section and an interlocking section, where the block is capable of creating a wall end or window and door frames. In one embodiment, the interlocking construction block includes a core section and two interlocking sections spaced approximately 90 degrees from each other, where the block is capable of connecting two wall structures at a corner.

In some embodiments, the interlocking construction block includes a core section and three interlocking sections each spaced approximately 90 degrees from each other, where the block is capable of connecting three wall structures. In other embodiments, the interlocking construction block includes a core section and four interlocking sections each spaced approximately 90 degrees from each other, where the block is capable of connecting four wall structures.

In one embodiment, the interlocking construction block further includes a reinforcing internal mesh cage. In another embodiment, the internal mesh cage is constructed from steel. In some embodiments, the interlocking construction block as described herein is constructed from a cement mixture, aggregate, sand, water, or other raw materials hardened into concrete.\

In one embodiment, an interlocking construction block includes: a core section having one or more wall sides, one or more interlocking section attachment sides, and one or more interlocking sections, each section having: a first interlocking portion, which is defined by a first interlocking portion attachment end, a first interlocking portion catch end, and a first interlocking portion catch; a second interlocking portion, which is defined by a second interlocking portion attachment end; and a second interlocking portion key. The interlocking construction block further includes an interlocking section bridge capable of connecting the interlocking section to the one or more interlocking section attachment sides of the core section, where the core section is intersected by at least one of a central longitudinal horizontal axis and a central lateral horizontal axis, and where an internal channel is present along the central longitudinal horizontal axis or the central lateral horizontal axis of the block and is capable of receiving an internal conduit or reinforcing member.

In one embodiment, an interlocking construction block system includes two or more interlocking and self-aligning construction blocks, each block having: a core section including one or more wall sides, one or more interlocking section attachment sides, and one or more interlocking sections, each section including: a first interlocking portion, which is defined by a first interlocking portion attachment end, a first interlocking portion catch end, and a first interlocking portion catch; a second interlocking portion, which is defined by a second interlocking portion attachment end; and a second interlocking portion key, one or more gaps capable of receiving a mating interlocking section, and an interlocking section bridge capable of connecting the interlocking section to the one or more interlocking section attachment sides of the core section. The interlocking construction block system further includes the first interlocking construction block capable of receiving the interlocking section of a second interlocking construction block within the gaps of the first interlocking construction block, thereby interlocking the first and second interlocking construction blocks in three axes.

In one embodiment, the three interlocking axes of the interlocking construction block system are a left/right axis, a front/back axis, and an up/down axis. In another embodiment, the core section of one or more of the interlocking construction blocks of the interlocking construction block system is intersected by at least one of a central longitudinal horizontal axis and a central lateral horizontal axis. In some embodiments, an internal channel is present along the central longitudinal horizontal axis of one of the one or more of the interlocking construction blocks of the interlocking construction block system, and where the internal channel is capable of receiving an internal conduit or reinforcing member. In other embodiments, an internal channel is present along both the central longitudinal and lateral horizontal axes of one of the one or more of the interlocking construction blocks the interlocking construction block system, and where the internal channel is capable of receiving an internal conduit or reinforcing member.

While various embodiments are described herein, the embodiments depicted should not be viewed as exhaustive of all possible embodiments.

BRIEF DESCRIPTION OF THE DRAWINGS

Embodiments are illustrated by way of example in the accompanying figures, in which like reference numbers indicate similar parts, and in which:

FIG. 14 depicts an alternate perspective view of an interlocking stretcher construction block with an internal channel spanning the central longitudinal axis of the block presented in FIG. 13.

FIG. 15 depicts a top view of an interlocking stretcher construction block with an internal channel spanning the central longitudinal axis of the block, in accordance with one embodiment of the present disclosure;

FIG. 16 depicts a side view providing comparison between channeled and non-channeled embodiments of an interlocking construction block, in accordance with one embodiment of the present disclosure;

Figure 56:
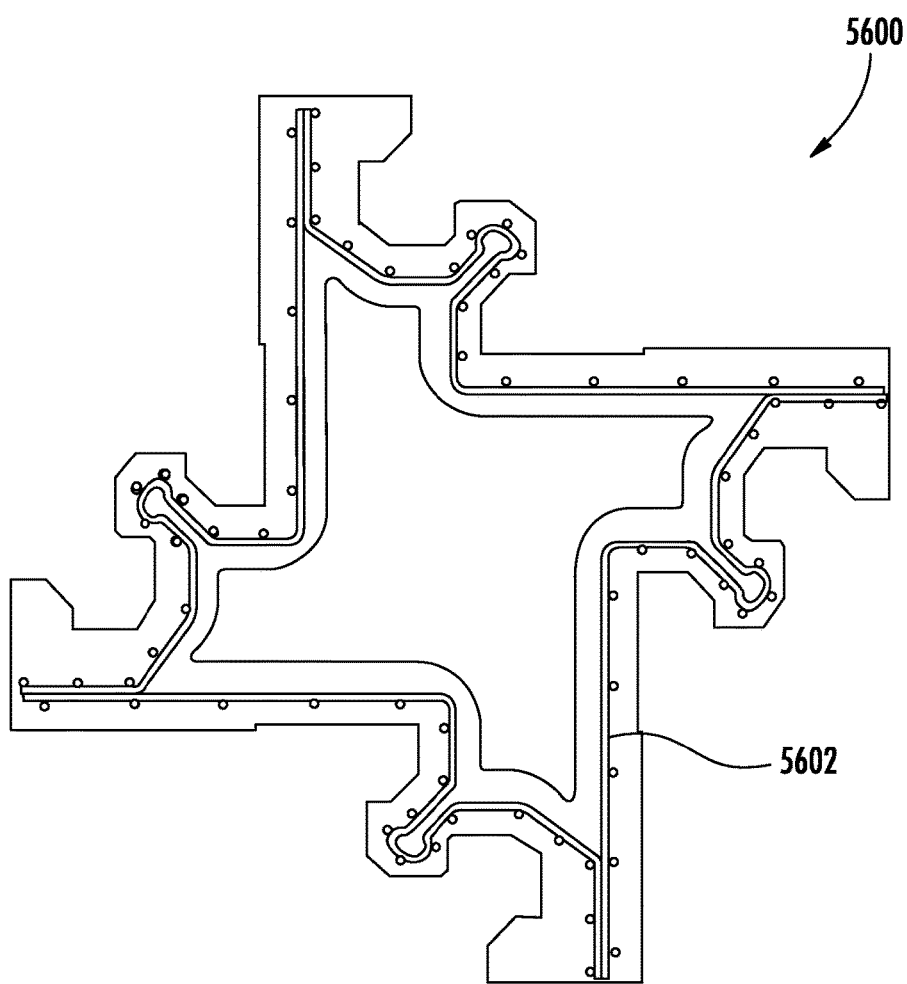
FIG. 56 depicts a top view of an interlocking reinforced concrete cross-section construction block with an internal mesh cage, in accordance with one embodiment of the present disclosure.
Figure 58:
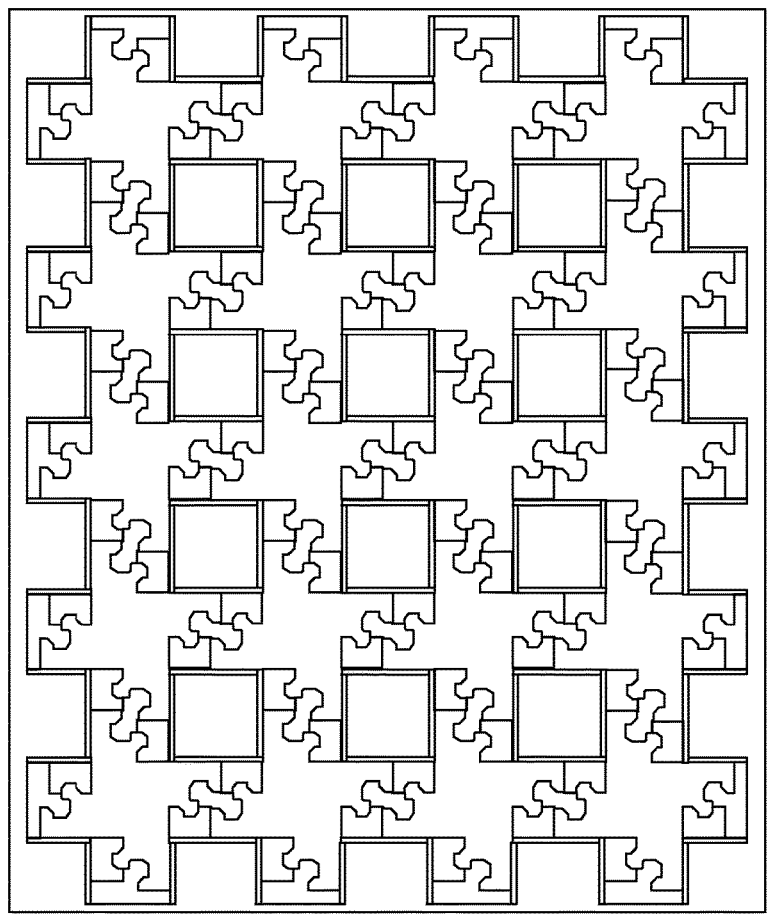
Figure 59:
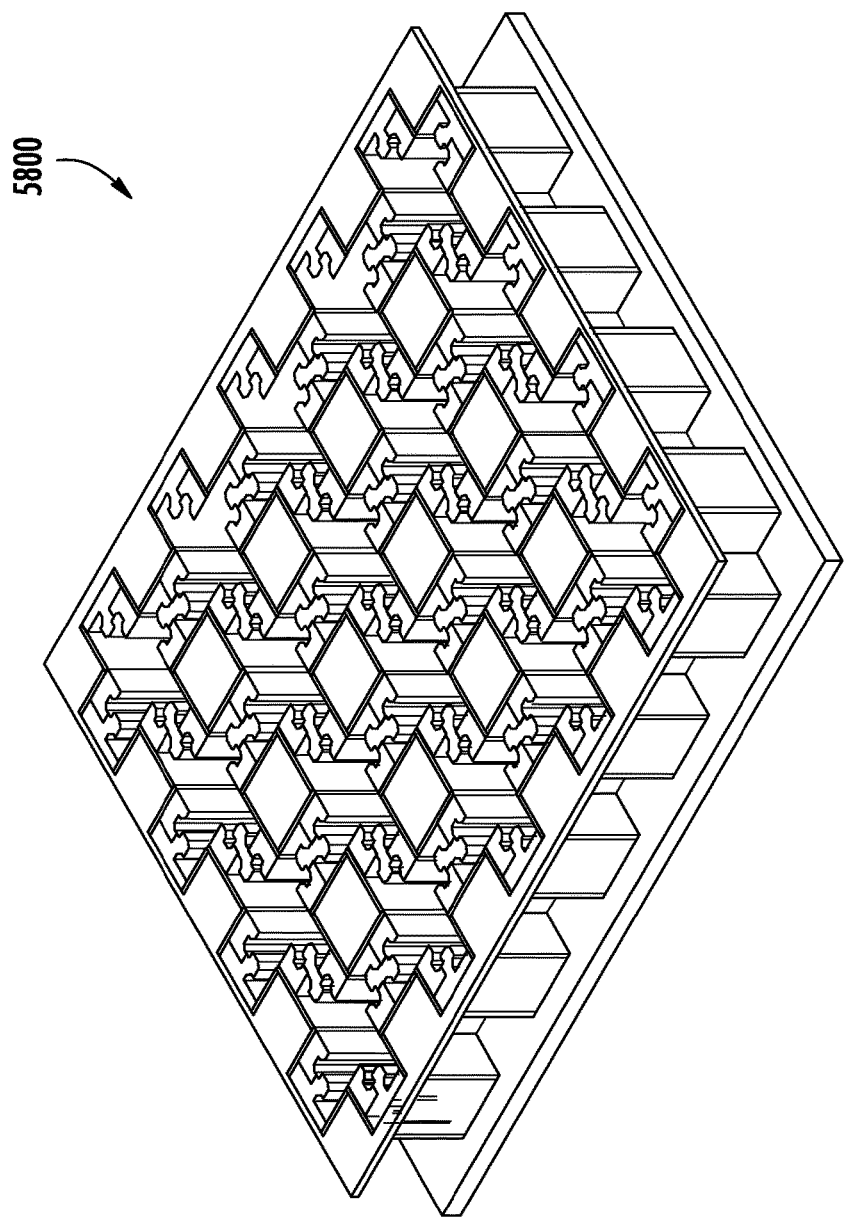
Figure 60:
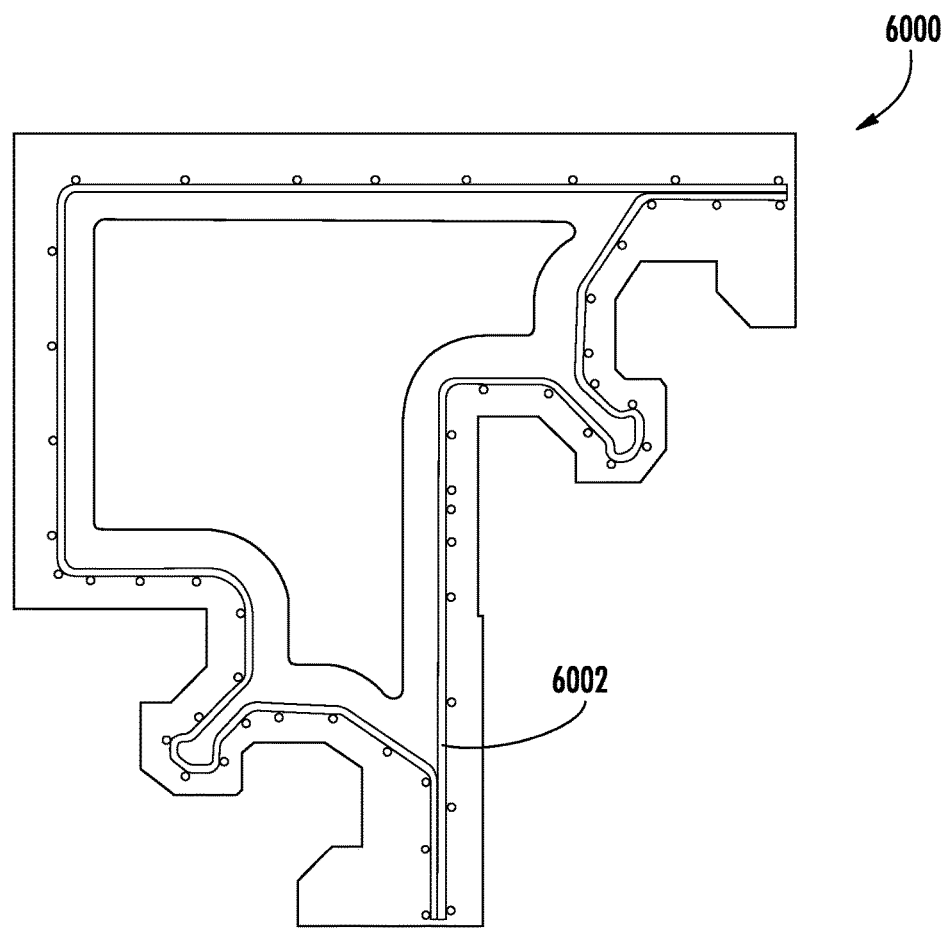
Figure 61:
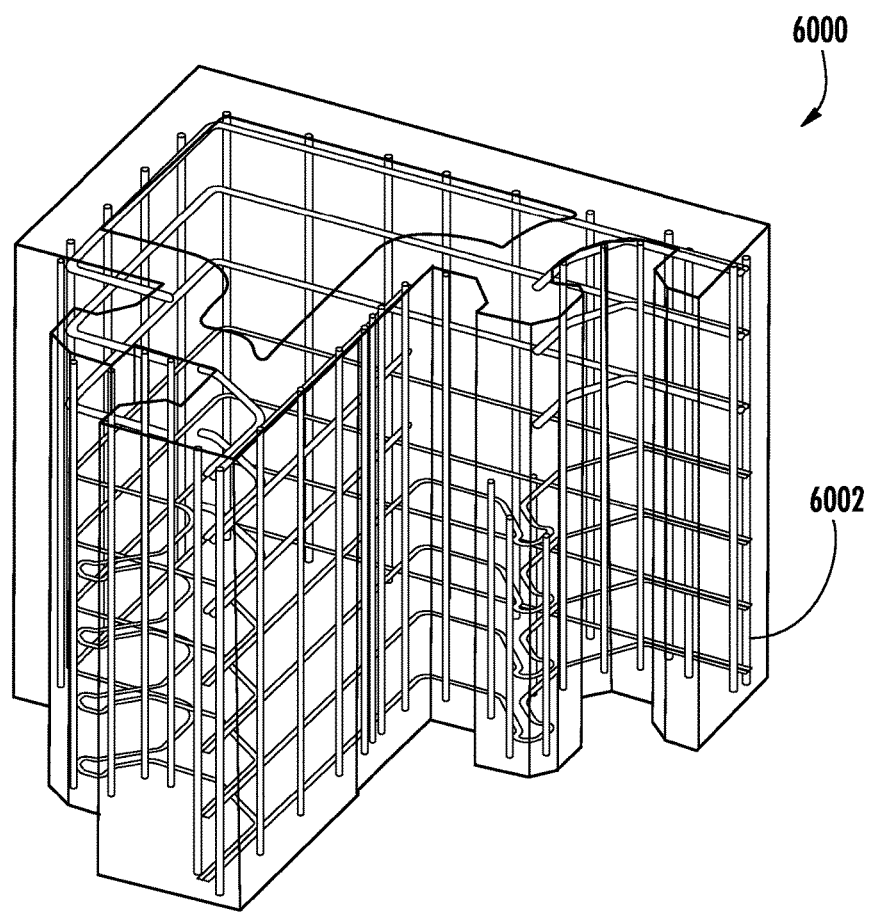
Figure 62:
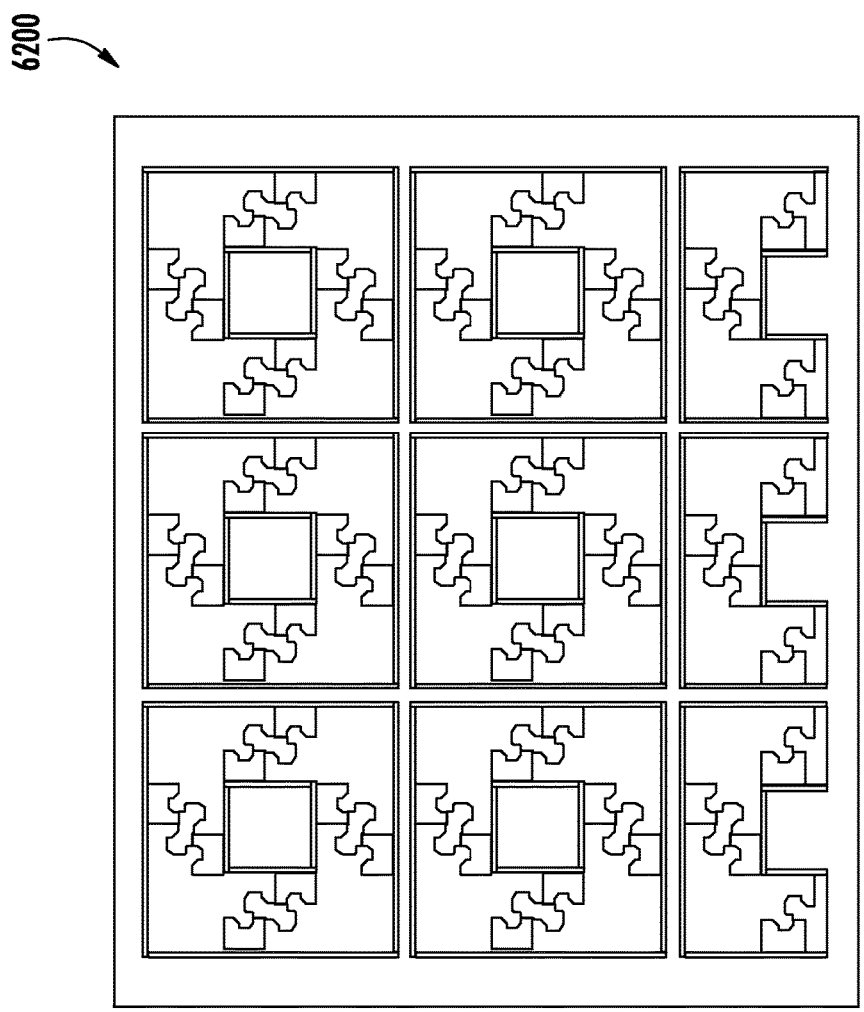
Figure 63:
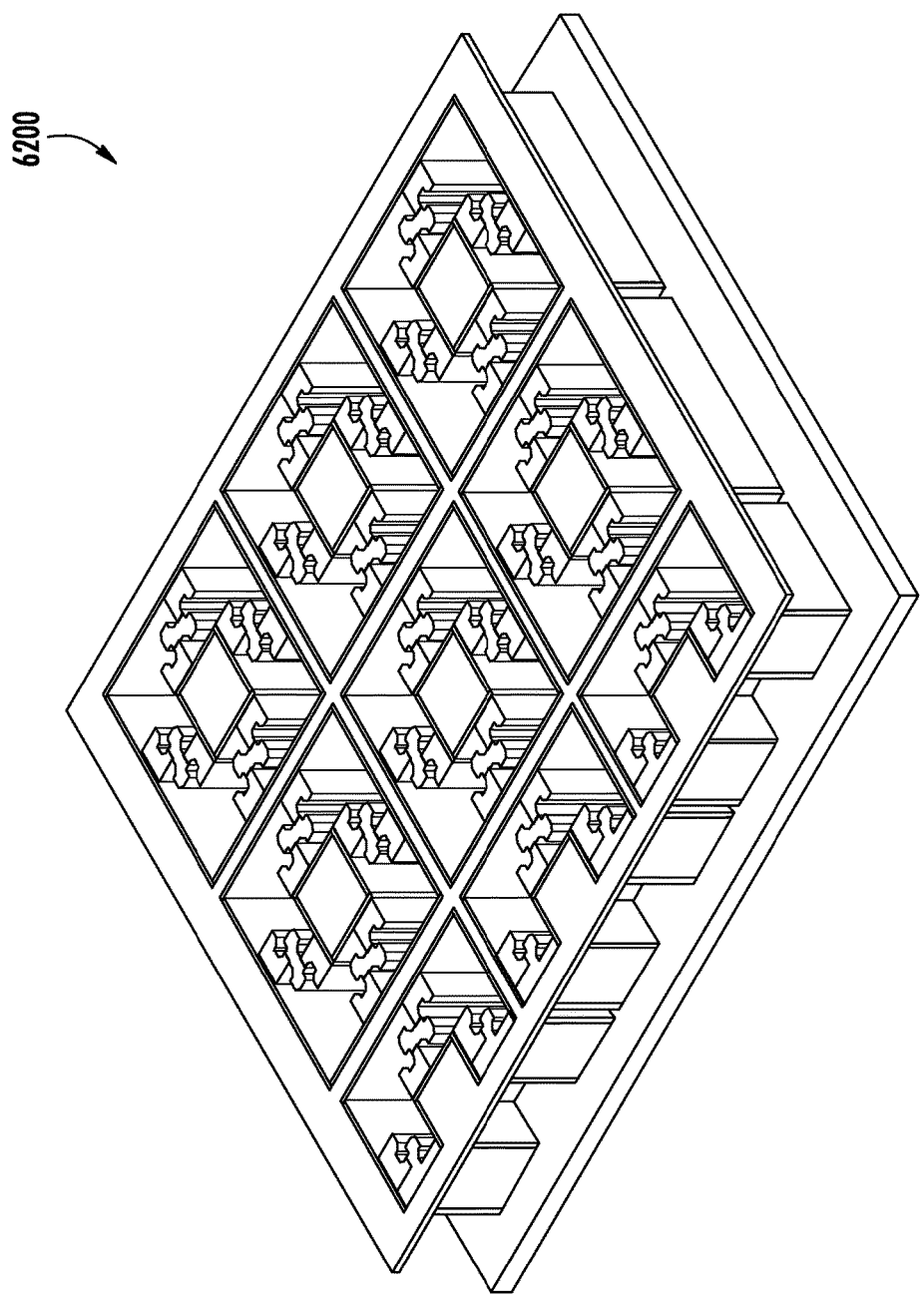
Figure 64:
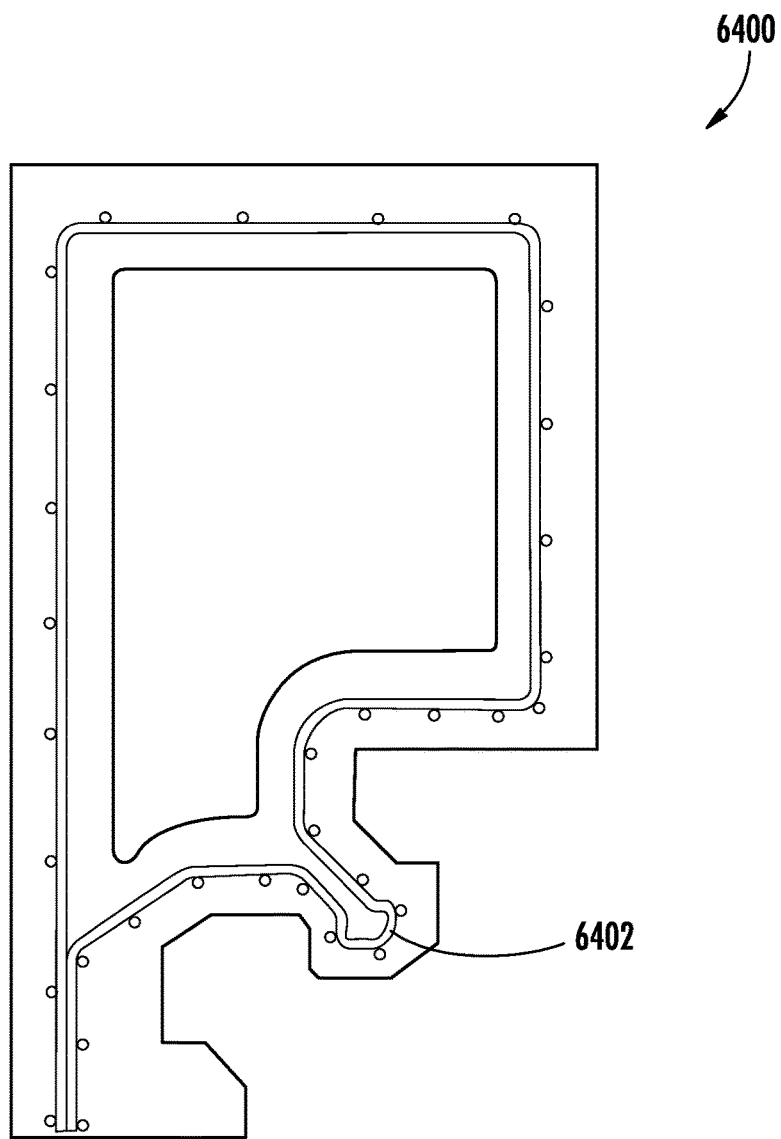
Figure 65:
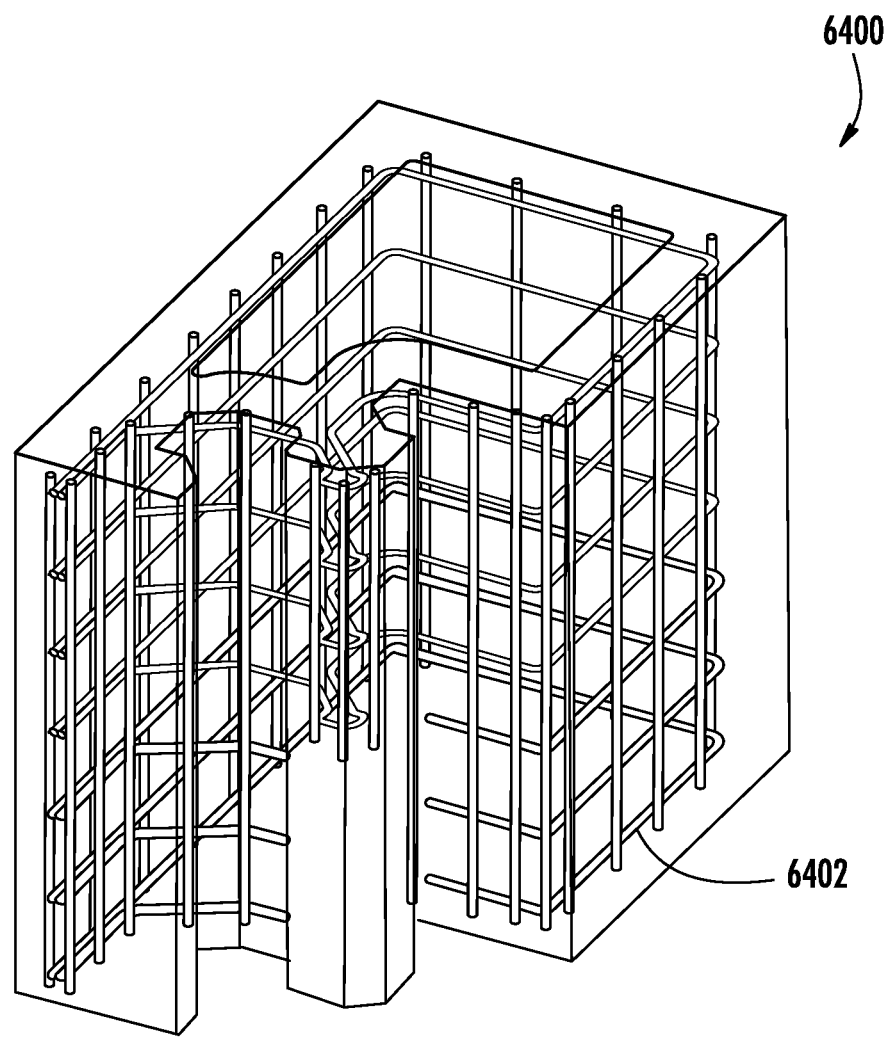
Figure 66:
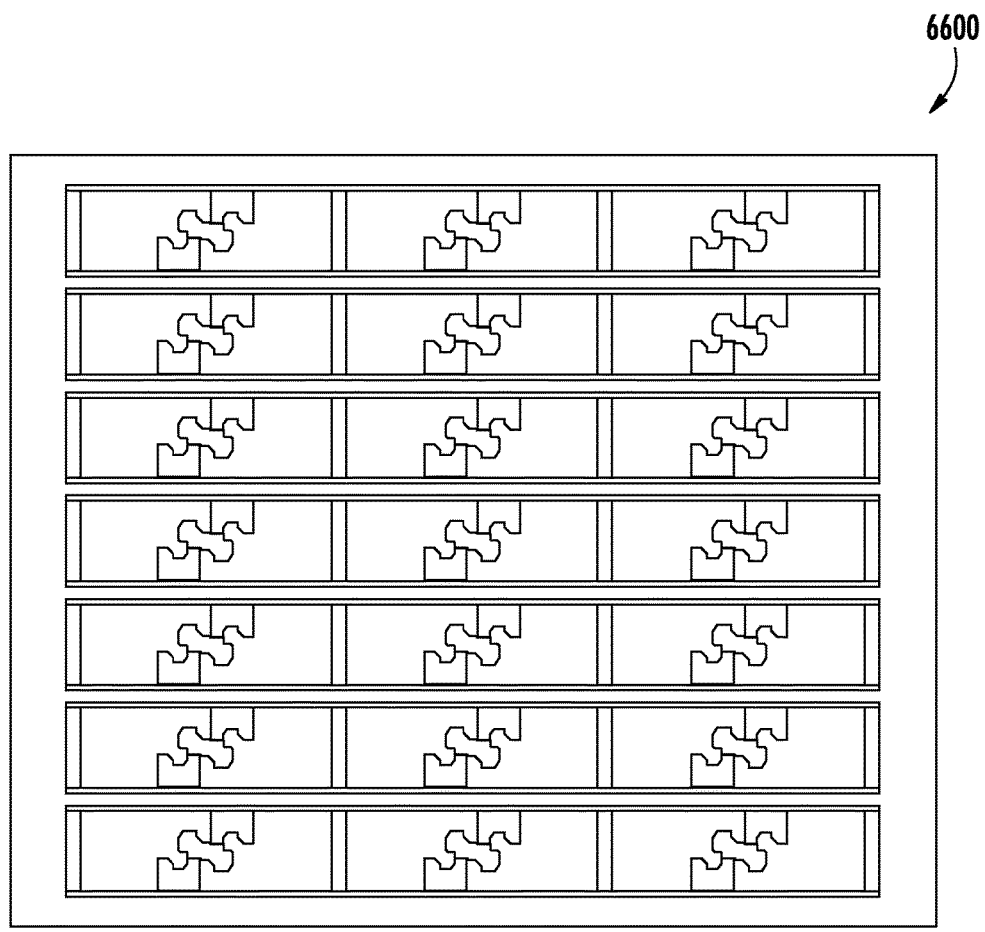
Figure 67:
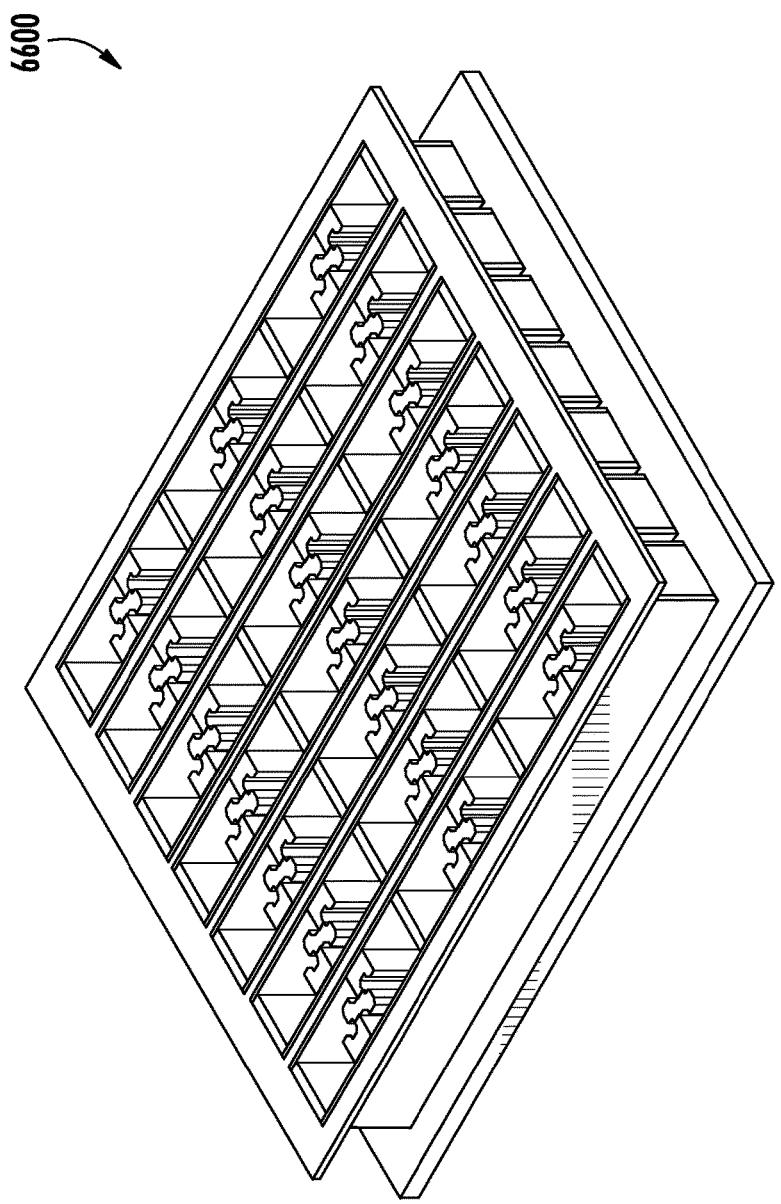
Figure 68:
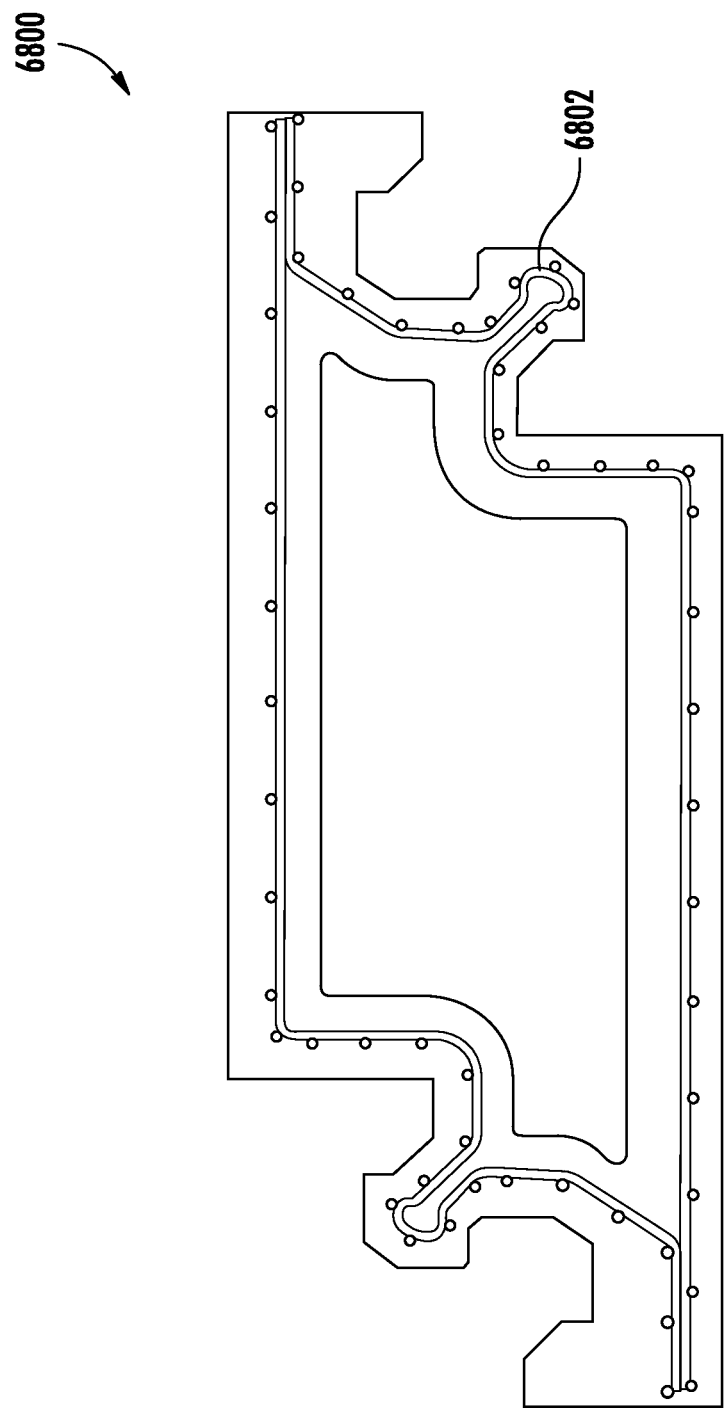
Figure 69:
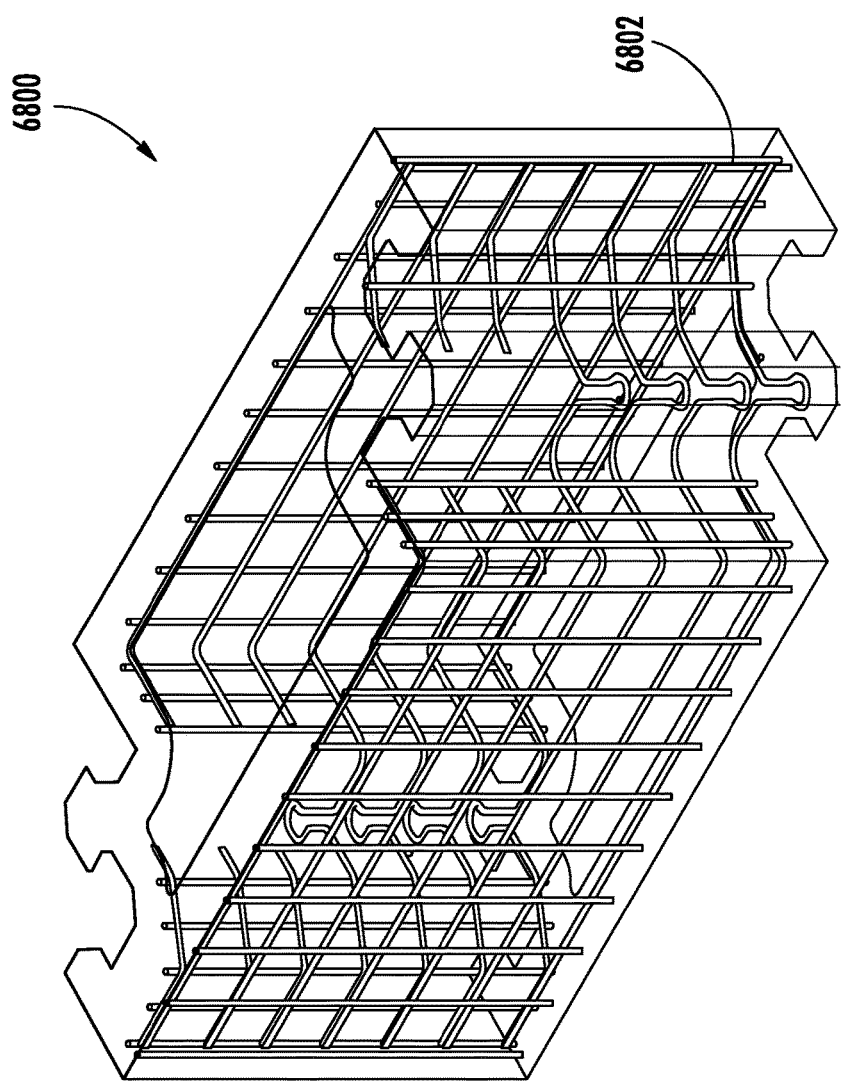
Figure 70:
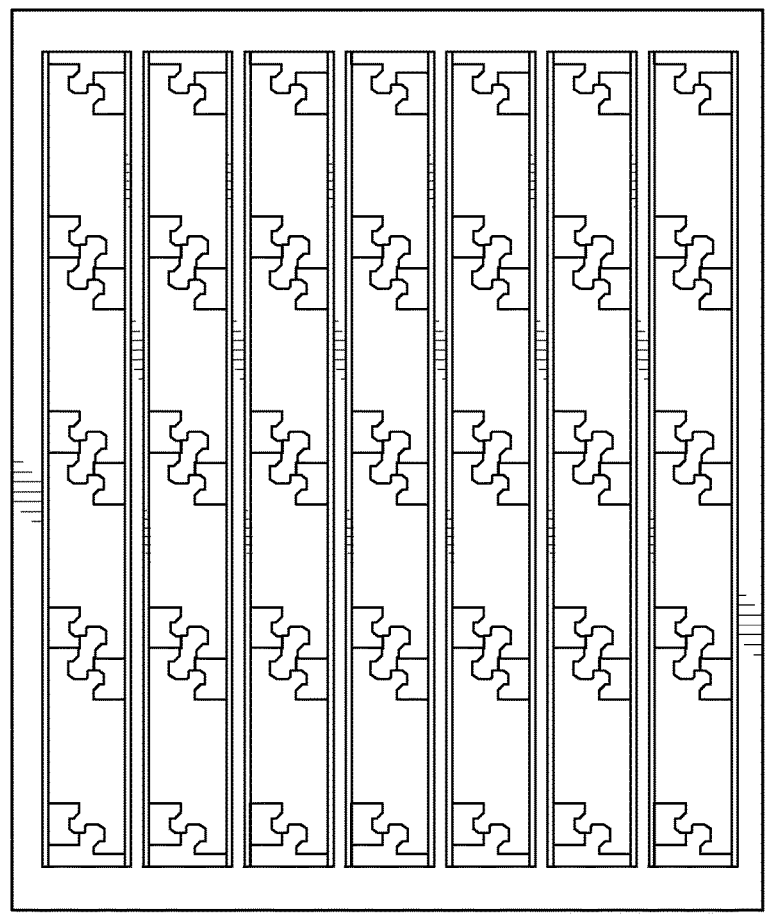
Figure 71:
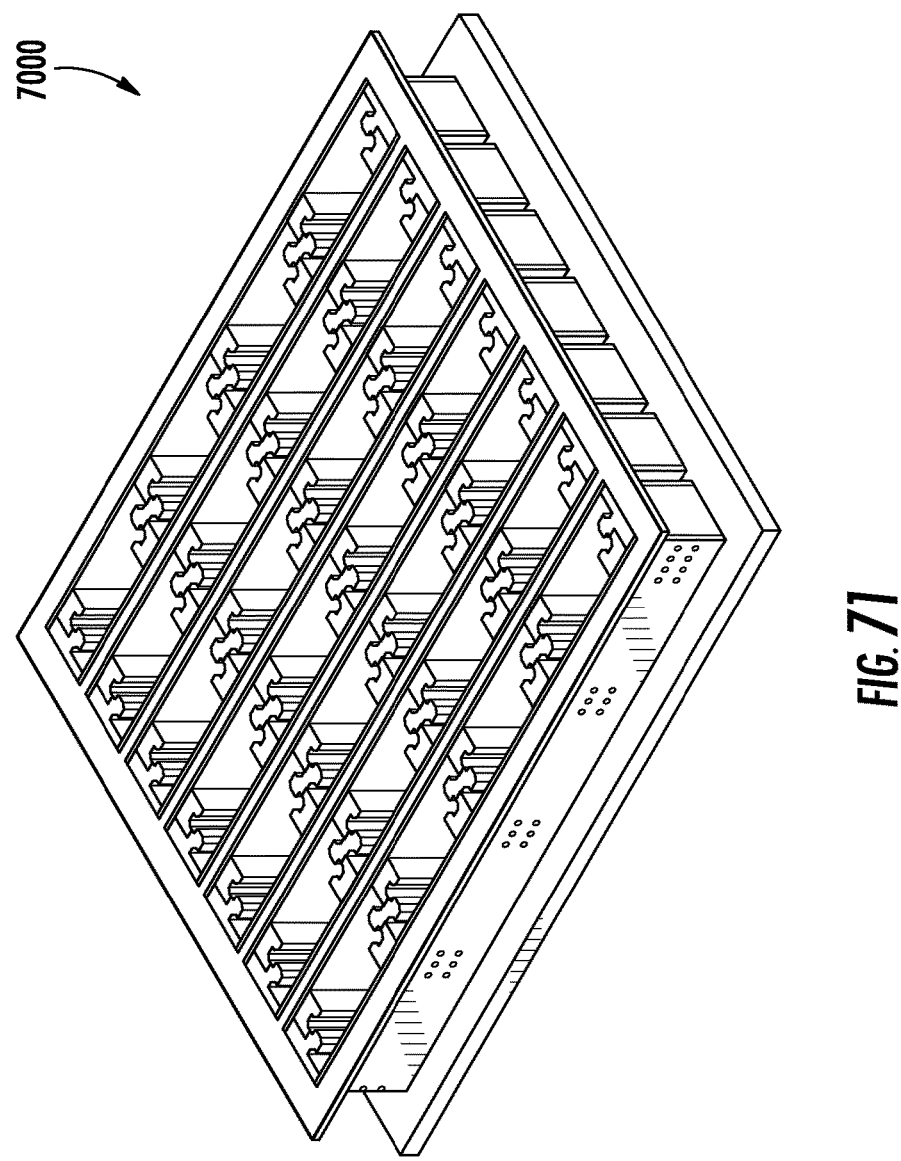
Figure 72:
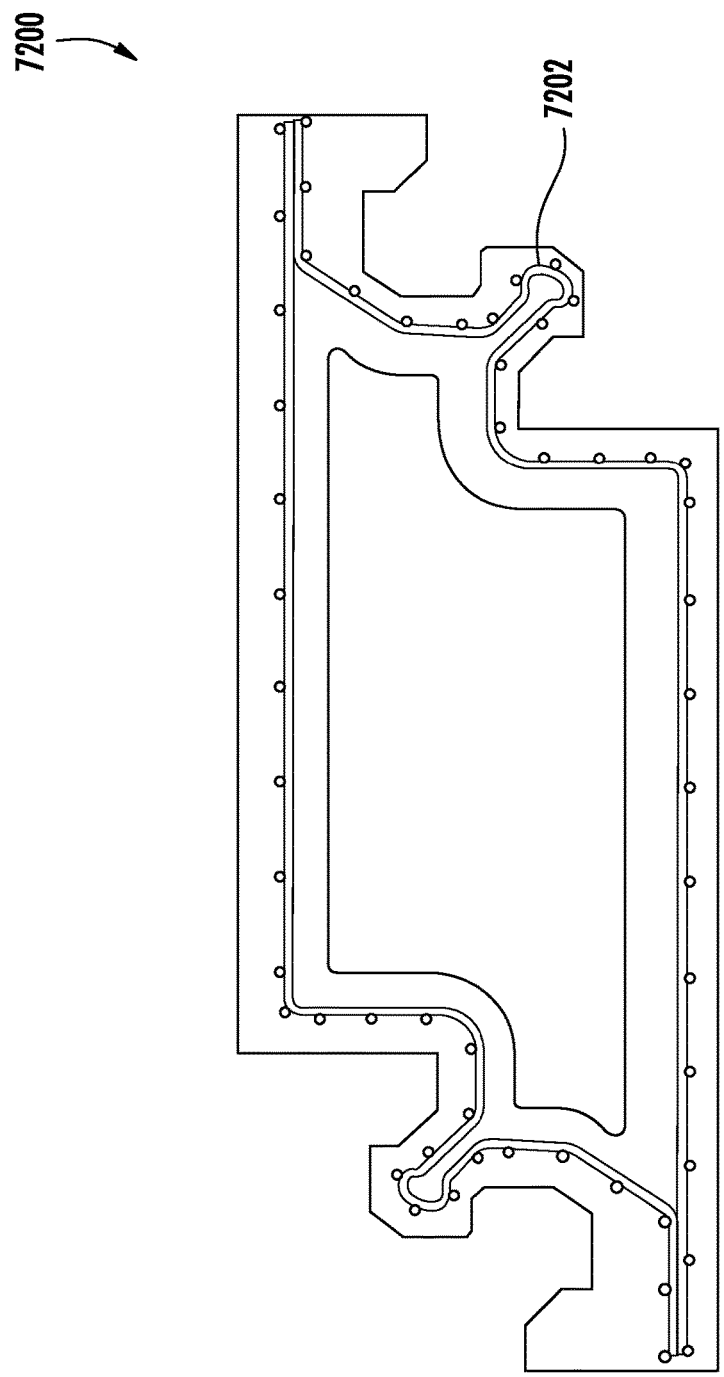
Figure 73:
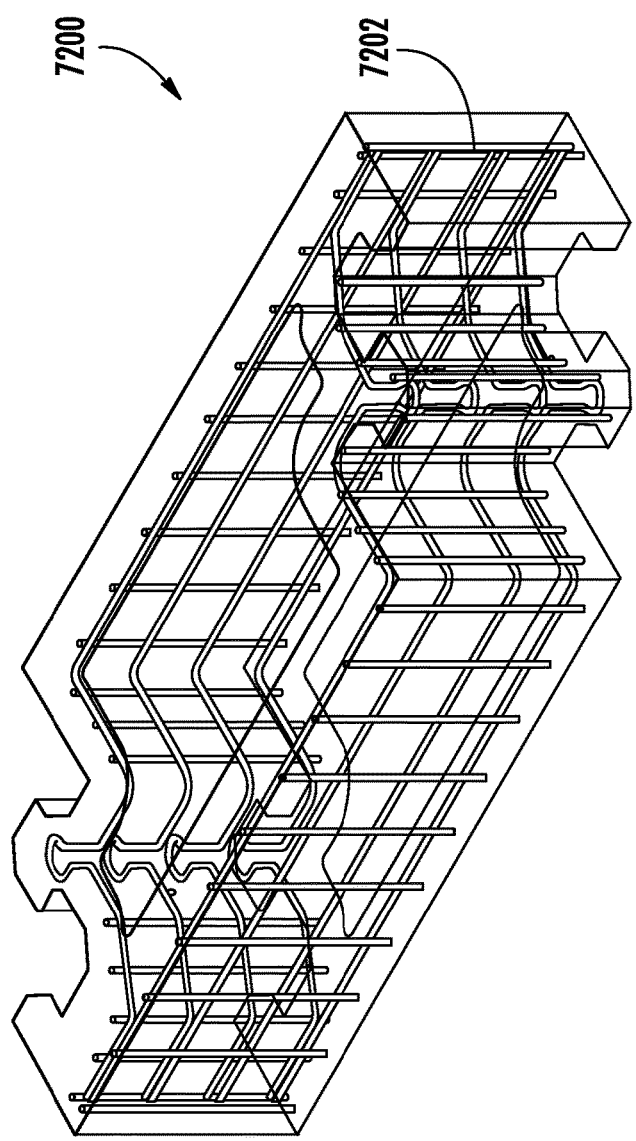
Figure 74:
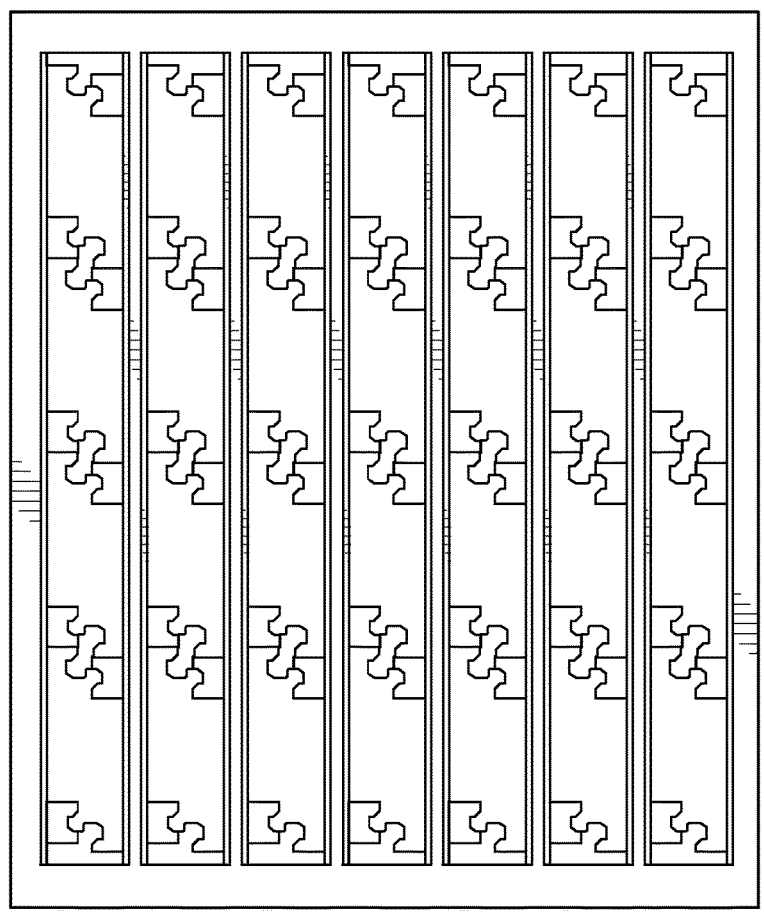
Figure 75:
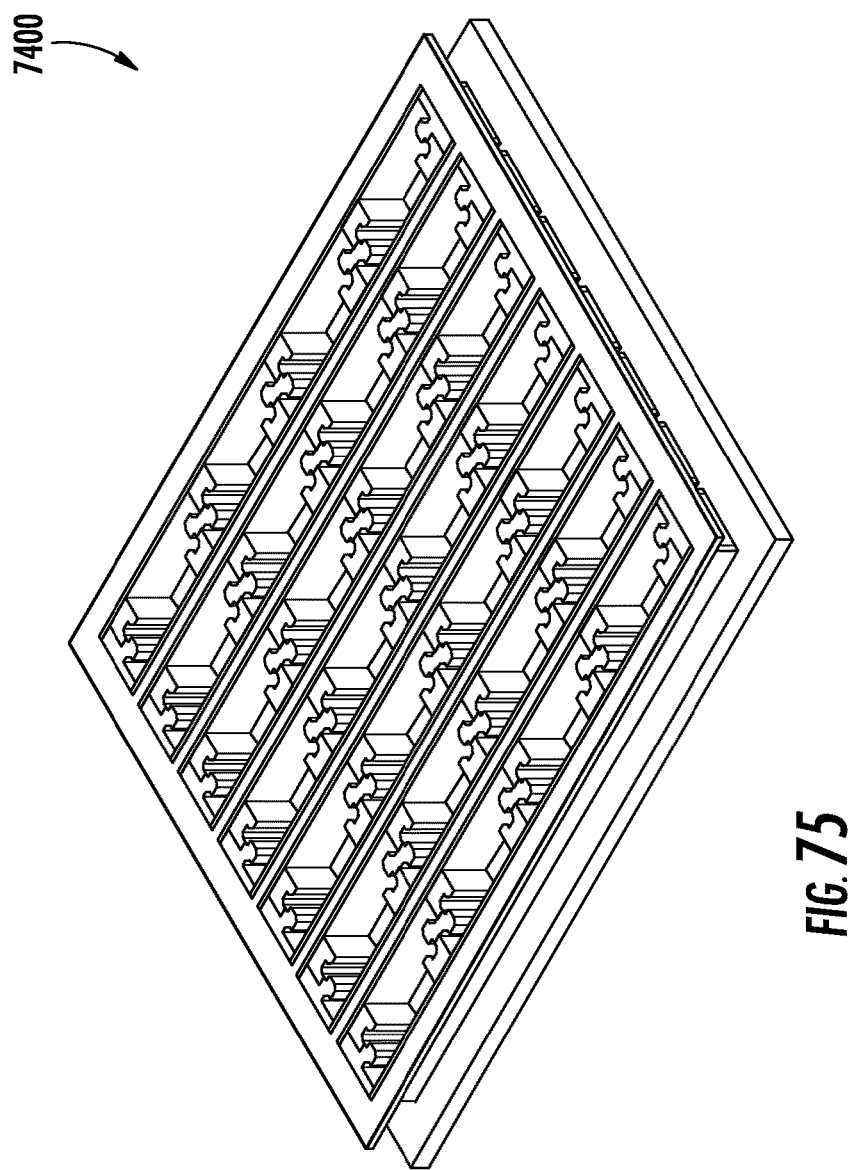
Figure 76:
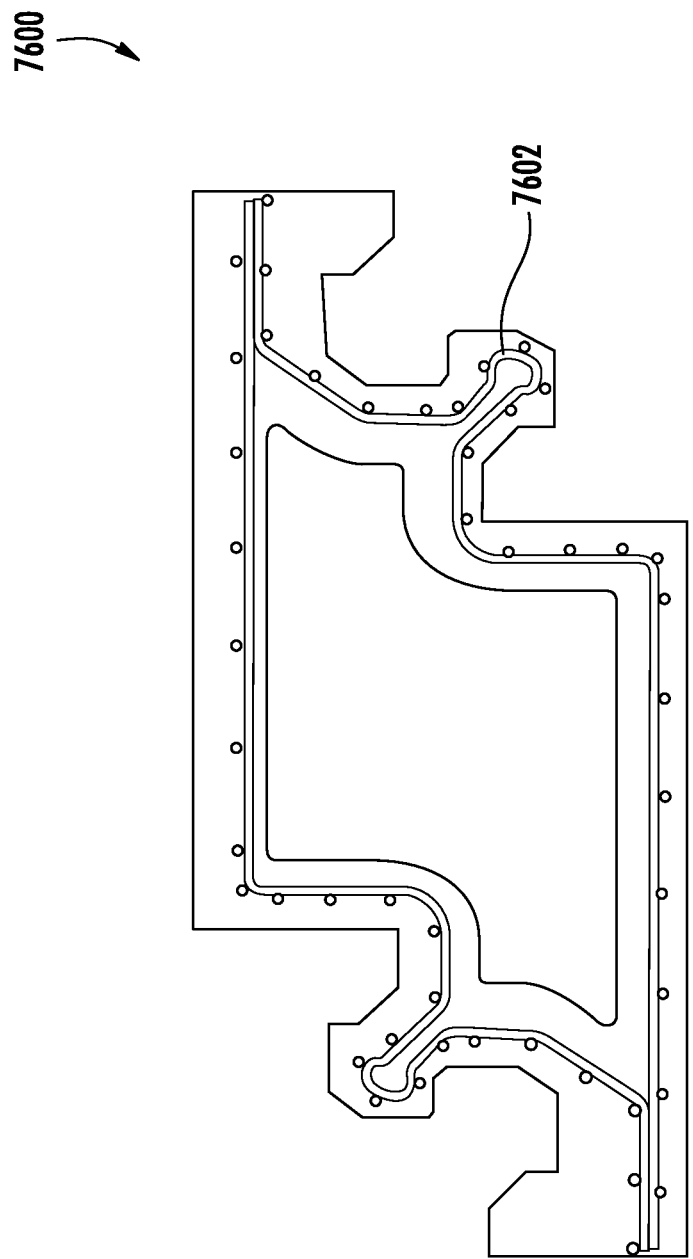
Figure 77:
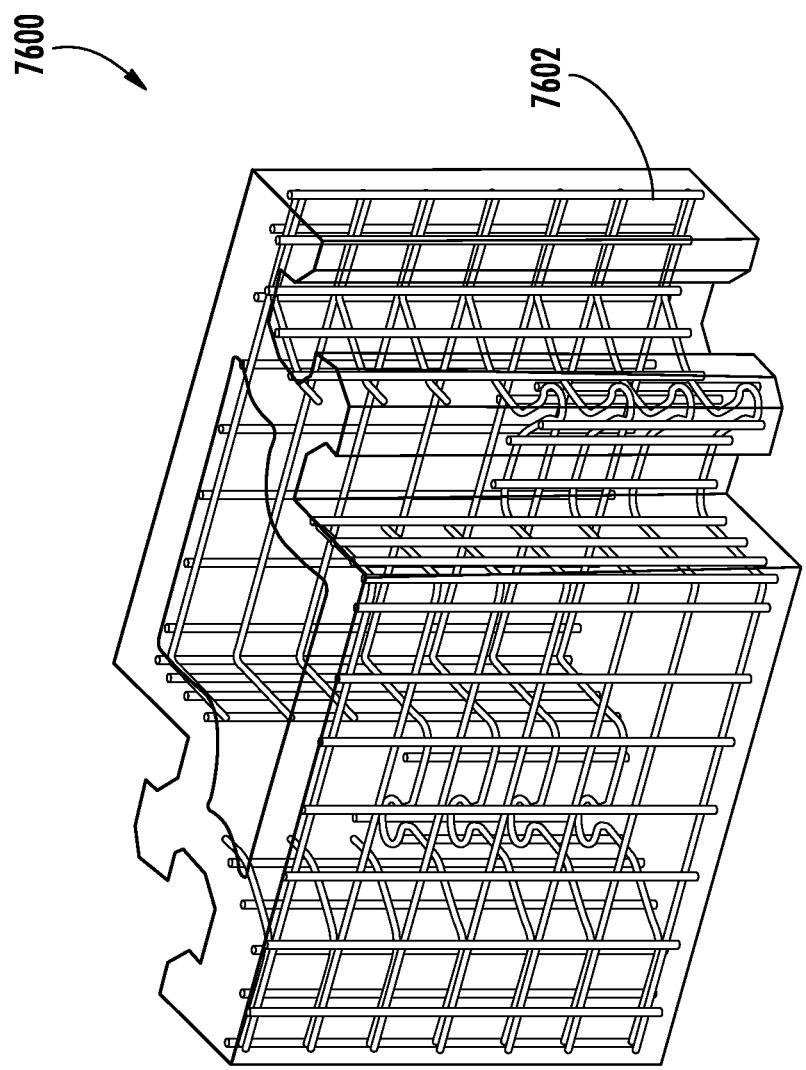
Figure 78:
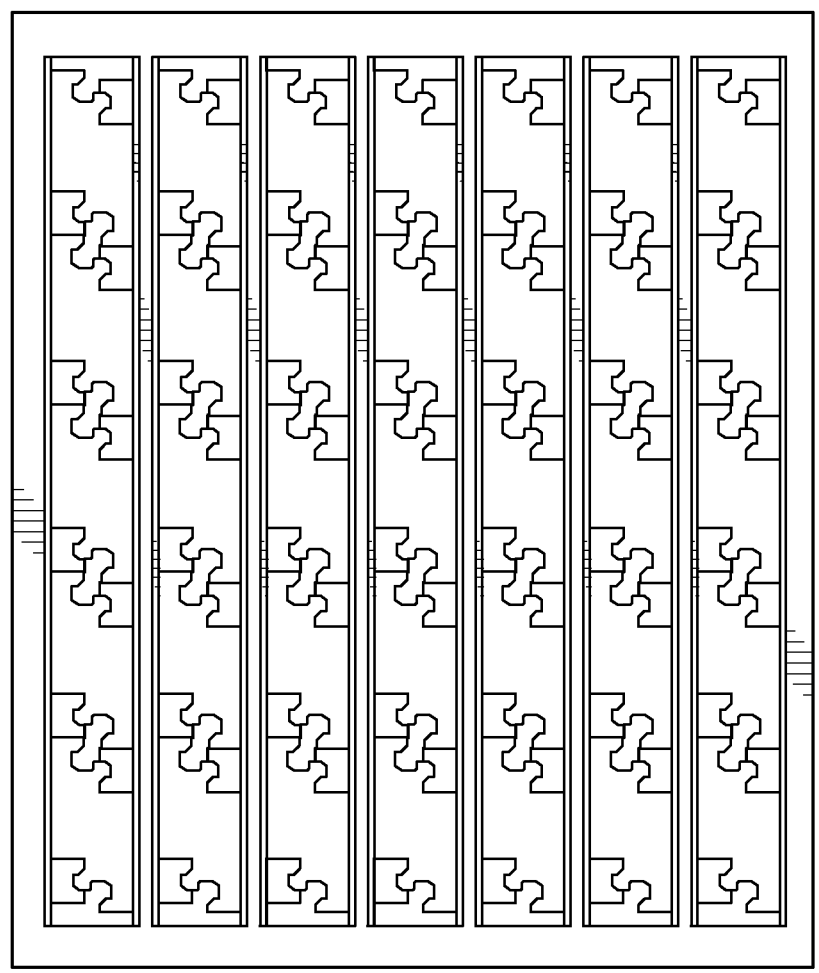
Figure 79:
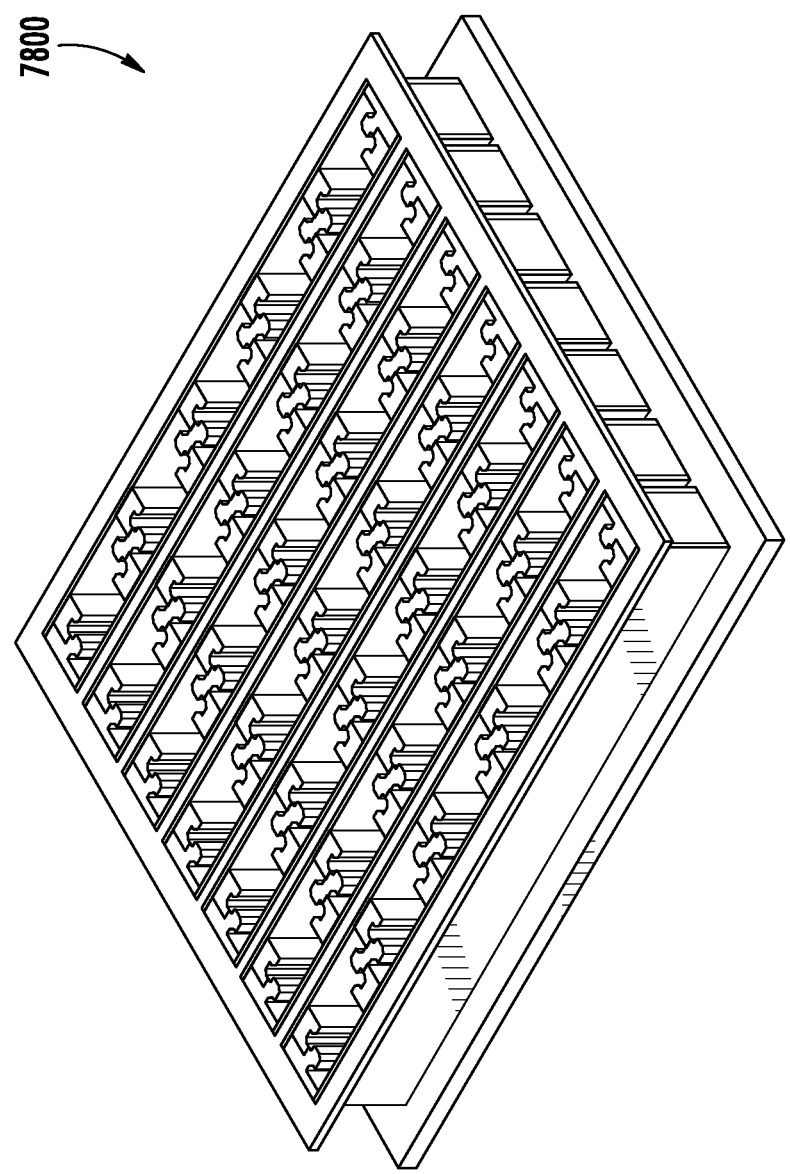
Figure 80:
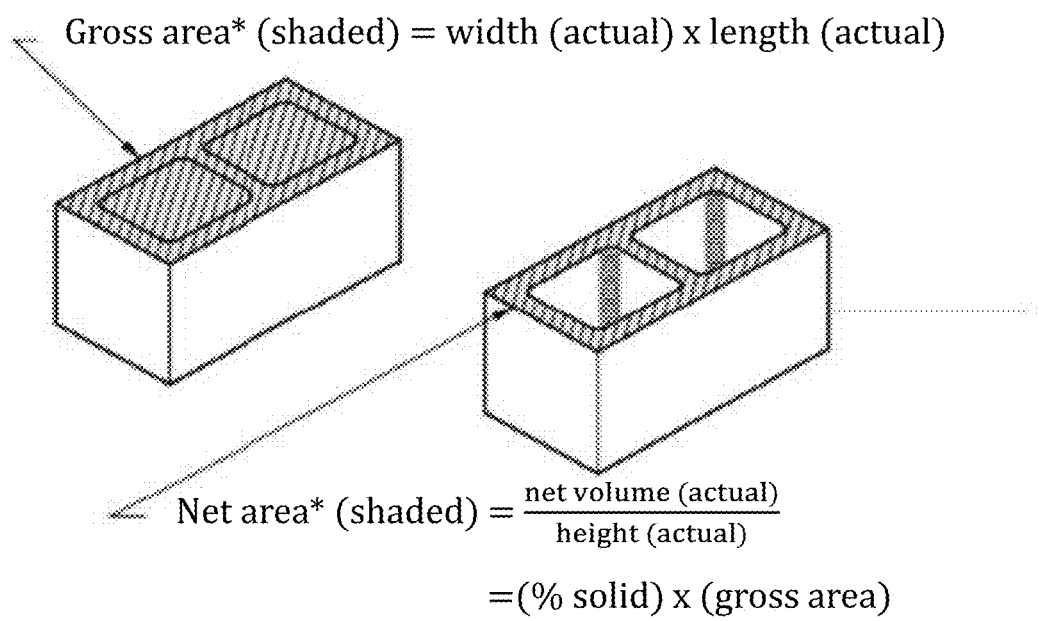
Figure 81:
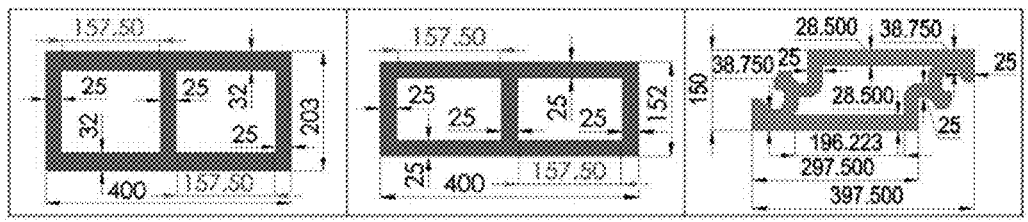

56, with the block's concrete material made transparent to show the internal mesh cage inside the block, in accordance with one embodiment of the present disclosure;

FIG. 58 depicts a top view of an assembled repeating female mold for a plurality of the interlocking cross-section construction blocks of FIG. 56, in accordance with one embodiment of the present disclosure;

FIG. 59 depicts a perspective view of the assembled repeating female mold of FIG. 58, in accordance with one embodiment of the present disclosure;

FIG. 60 depicts a top view of an interlocking reinforced concrete corner-section construction block with an internal mesh cage, in accordance with one embodiment of the present disclosure;

FIG. 61 depicts a perspective view of the interlocking reinforced concrete corner-section construction block of FIG. 60, with the block's concrete material made transparent to show the internal mesh cage inside the block, in accordance with one embodiment of the present disclosure;

FIG. 62 depicts a top view of an assembled repeating female mold for a plurality of the interlocking corner-section construction blocks of FIG. 60, in accordance with one embodiment of the present disclosure;

FIG. 63 depicts a perspective view of the assembled repeating female mold of FIG. 62, in accordance with one embodiment of the present disclosure;

FIG. 64 depicts a top view of an interlocking reinforced concrete end-section construction block with an internal mesh cage, in accordance with one embodiment of the present disclosure;

FIG. 65 depicts a perspective view of the interlocking reinforced concrete end-section construction block of FIG. 64, with the block's concrete material made transparent to show the internal mesh cage inside the block, in accordance with one embodiment of the present disclosure;

FIG. 66 depicts a top view of an assembled repeating female mold for a plurality of the interlocking end-section construction blocks of FIG. 64, in accordance with one embodiment of the present disclosure;

FIG. 67 depicts a perspective view of the assembled repeating female mold of FIG. 66, in accordance with one embodiment of the present disclosure;

FIG. 68 depicts a top view of an interlocking reinforced concrete stretcher construction block with an internal mesh cage, in accordance with one embodiment of the present disclosure;

FIG. 69 depicts a perspective view of the interlocking reinforced concrete stretcher construction block of FIG. 68, with the block's concrete material made transparent to show the internal mesh cage inside the block, in accordance with one embodiment of the present disclosure;

FIG. 70 depicts a top view of an assembled repeating female mold for a plurality of the interlocking stretcher construction blocks of FIG. 68, in accordance with one embodiment of the present disclosure;

FIG. 71 depicts a perspective view of the assembled repeating female mold of FIG. 70, in accordance with one embodiment of the present disclosure;

FIG. 72 depicts a top view of an interlocking reinforced concrete half-stretcher construction block with an internal mesh cage, in accordance with one embodiment of the present disclosure;

FIG. 73 depicts a perspective view of the interlocking reinforced concrete half-stretcher construction block of FIG. 72, with the block's concrete material made transparent to show the internal mesh cage inside the block, in accordance with one embodiment of the present disclosure;

FIG. 74 depicts a top view of an assembled repeating female mold for a plurality of the interlocking half-stretcher construction blocks of FIG. 72, in accordance with one embodiment of the present disclosure;

FIG. 75 depicts a perspective view of the assembled repeating female mold of FIG. 74, in accordance with one embodiment of the present disclosure;

FIG. 76 depicts a top view of an interlocking reinforced concrete 9" spacer construction block with an internal mesh cage, in accordance with one embodiment of the present disclosure;

FIG. 77 depicts a perspective view of the interlocking reinforced concrete 9" spacer construction block of FIG. 76, with the block's concrete material made transparent to show the internal mesh cage inside the block, in accordance with one embodiment of the present disclosure;

FIG. 78 depicts a top view of an assembled repeating female mold for a plurality of the interlocking stretcher construction blocks of FIG. 76, in accordance with one embodiment of the present disclosure;

FIG. 79 depicts a perspective view of the assembled repeating female mold of FIG. 78, in accordance with one embodiment of the present disclosures;

FIG. 80 depicts an illustration of how one goes about performing the ASTM C90 calculation; and FIG. 81 depicts an illustration of the data of the ASTM C90 blocks compared to the currently disclosed (GT) block embodiments.

DETAILED DESCRIPTION OF DRAWINGS

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the disclosure and do not limit the scope of the disclosure.

Interlocking Construction Blocks

Figure 1:
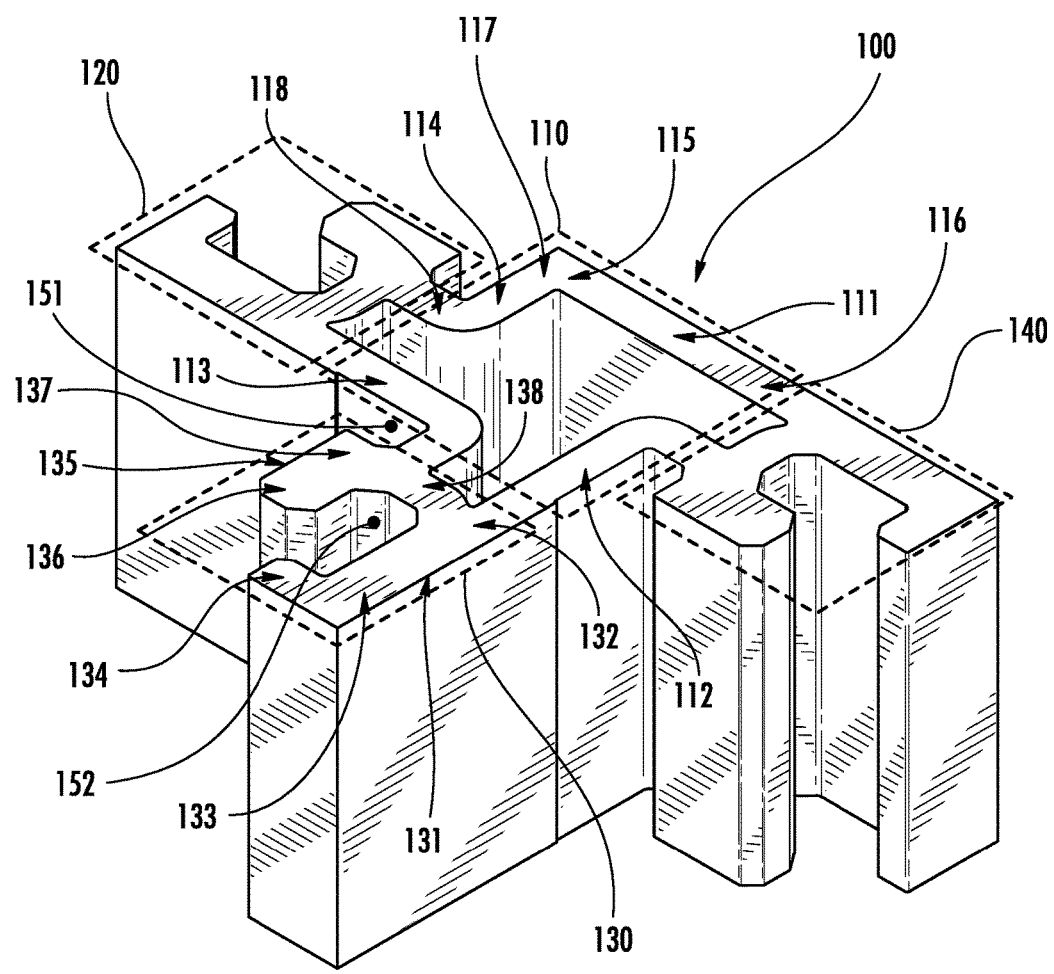
FIG. 1 depicts a perspective view of an interlocking T-section construction block, which is used to connect three walls, in accordance with one embodiment of the present disclosure.

FIG. 1 depicts a perspective view of an interlocking construction block 100. While the specific geometry of the block 100 is described below, it is to be understood that the blocks described in FIGS. 1-6, FIGS. 23-28, and FIGS. 52-79 are families of blocks utilizing interlocking geometry so that each of the disclosed construction blocks may interlock and self-align with each other without the use of a binding agent such as mortar during assembly. That is, the geometric sections described below in relation to FIG. 1 are also present in the blocks depicted in FIGS. 2-6, FIGS. 23-28, and FIGS. 52-79 so that various blocks within a family of blocks may interlock with each other without the use of a binding agent such as mortar during assembly.

The block 100 depicted in FIG. 1 is a T-section block that comprises four sections: a core section 110 and three interlocking sections 120, 130, and 140, each being of a preferable material, thickness, and height. The T-section block 100 may be an interlocking construction block suitable for connecting three walls. In an embodiment, the three interlocking sections 120, 130, and 140 may be spaced 90 degrees from each other about the core section 110, although the interlocking sections may be spaced apart from each other in any orientation.

The core section 110 may comprise a flat wall side 111 and three interlocking section attachments 112, 113, and 114, each of which may be used to connect the interlocking sections 120, 130, and 140 to the core section 110. Geometrically, the interlocking sections 120, 130, and 140 may be sized and shaped such that the sections form repeating patterns of negative and positive space that may interlock with similar interlocking sections in the next interlocking block formed in a structure.

The wall side 111 may preferably be a vertical and rectangular plane of material extending from a first wall side end 115 to a second wall side end 116 and may generally define part of an outer surface of a structure manufactured from blocks 100 and/or other embodiments described herein.

From the wall side 111, the attachment section 114 may make a 90-degree corner with the first wall side end 115 but may also be a continuous extension of the first wall side end 115. The interlocking section attachment 114 may be extend from a first interlocking attachment side end 117 to a second interlocking attachment side end 118. The first interlocking attachment side end 117 may extend from the wall side 111 proximate to the first wall side end 115 at a right angle to form an adjacent side of the core section 110. The second interlocking section attachment end 118 may curve away from the core section 110 at a right angle and may serve as a connection point between the interlocking section 120 and the core section 110.

As shown in FIG. 1, the interlocking attachment sides 113 and 112 may function similarly to the interlocking attachment side 114 discussed above and may facilitate connection of the interlocking sections 130 and 140, respectively, to the core section 110, thereby giving core section 110 its rectangular T-section shape comprising three interlocking sections and one core section.

While the features of the interlocking section 130 are described below, it is to be understood that with the repeating geometry of the interlocking blocks, the features of the interlocking sections 120 and 140 would be similar. The interlocking section 130 may be comprised of a first interlocking portion 131 and a second interlocking portion 135, each defining a positive space and creating a negative space therebetween.

The first interlocking portion 131 may comprise a wall extending from the core section 110 at a first interlocking portion attachment end 132, extending along a first interlocking portion catch end 133, and ending at a first interlocking portion catch 134. The first interlocking portion attachment end 132 connects the first interlocking portion 131 to the core section 110 by connecting to the interlocking attachment side 112 and may additionally connect the first interlocking portion 131 to the second interlocking portion 135 via an interlocking section bridge 138. The first interlocking catch end 133 may be opposite first interlocking portion attachment end 132 and may extend away from the core section 110. The first interlocking portion catch 134 may protrude at a right angle from first interlocking portion catch end 133 and may function as part of the interlocking construction block system described below.

The second interlocking portion 135 may be comprised of a second interlocking portion attachment end 137 and a second interlocking portion key 136. The second interlocking portion attachment end 137 may be connected to the interlocking section 120 at the interlocking attachment side 113 and to the first interlocking portion 131 via the interlocking formation bridge 138. Extending away from the second interlocking portion attachment end 137 may be the second interlocking portion key 136, which may also function as part of the interlocking construction block system described below.

As depicted in FIG. 1, and with reference to the interlocking block 100, it should be understood that the interlocking sections 120, 130, and 140 may be identical in shape and function and that the description of one of these sections is analogous to the others, though this may not necessarily be the case for other embodiments.

A negative space gap 152 may be formed between the first and second interlocking portions 131 and 135. The gap 152 may serve as a slot into which a second interlocking portion key of an interlocking section of a separate block may interlock. Additionally, the second interlocking portion key 136 may be placed into a gap of an adjacent block in order to facilitate interlocking of the two blocks.

In a similar manner, a negative space gap 151 may be formed between the second interlocking portion 135 and the interlocking section attachment side 113. The gap 151 may serve as a slot into which the first interlocking portion catch belonging to another block may fit. Additionally, the first interlocking portion catch 134 may be placed into a gap of an adjacent block to interlock the blocks.

Combined with the geometry of the first interlocking portion 131 and the second interlocking portion 135, the geometry of the gaps 151 and 152 may create repeating geometric patterns that allow adjacent interlocking blocks to interlock with each other without the use of a binding agent such as mortar during assembly. In any particular interlocking block, the first interlocking portion catch and the second interlocking portion key, with the defined positive spaces creating negative gaps, results in a strong interlocking formation which may allow adjacent interlocking blocks to be secured to one another, while preventing independent movement, when interlocked.

Each of the elements described above in relation to the block 100 may be present in one or more of the following embodiments. These elements may include core sections, interlocking sections, wall sides, interlocking section attachment sides, first wall side ends, second wall side ends, interlocking attachment sides, first and second interlocking attachment side ends, first and second interlocking portions, first and second interlocking portion catch ends, interlocking section bridges, first and second interlocking portion catches, interlocking portion keys, interlocking formation bridges, and gaps. The geometry of each of the elements of the blocks described below are such that various blocks can be interlocked to create any size or shape of structure desired.

Figure 2:
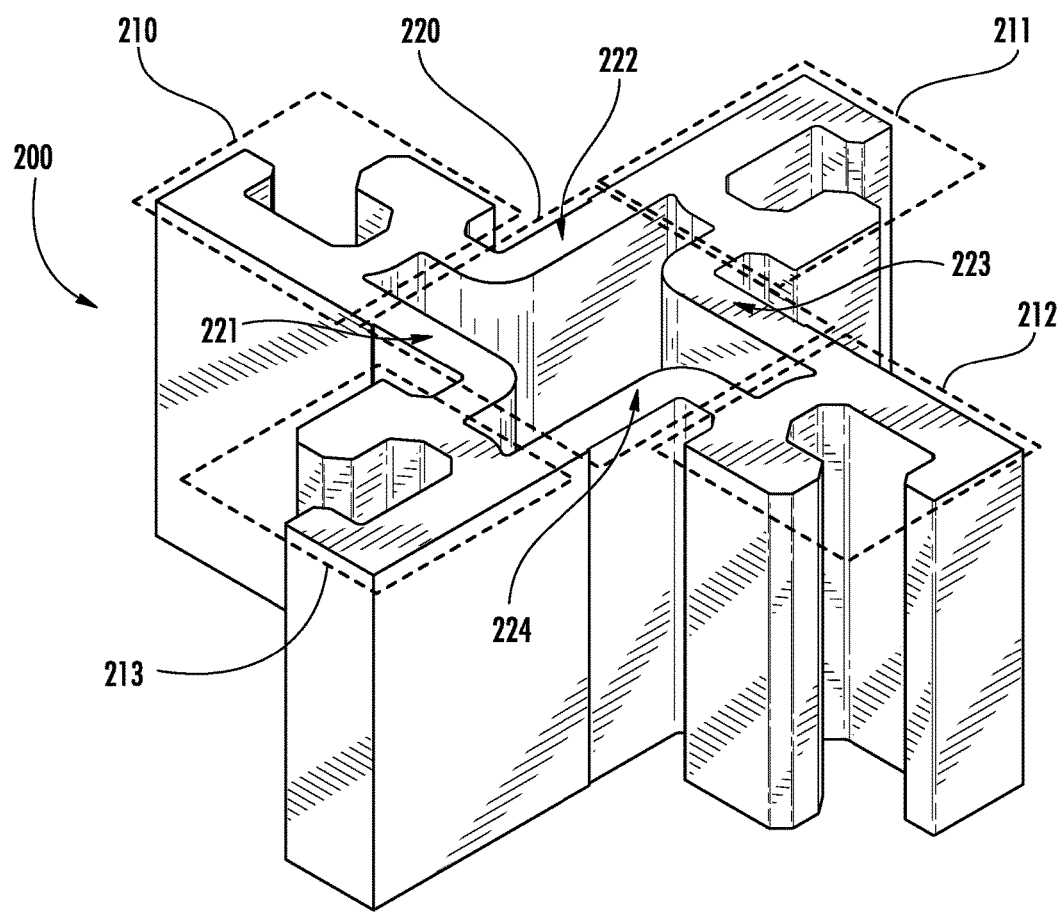
FIG. 2 depicts a perspective view of an interlocking cross-section construction block, which is used to connect four walls, in accordance with one embodiment of the present disclosure.

FIG. 2 depicts a perspective view of an interlocking cross-section construction block 200, which is used to connect four walls, in accordance with one embodiment of the present disclosure. The block 200 may be similar in design and functionality to the block 100 from FIG. 1, but may contain four interlocking sections rather than three and no wall sides. The block 200 may be suitable for joining four walls. In an embodiment, the four interlocking sections may be spaced 90 degrees from each other about the core section.

As such, block 200 is comprised of a core section 220 which is adjoined to four interlocking sections 210, 211, 212, and 213. The core section 220 may be defined by four interlocking section attachment sides 221, 222, 223, and 224, which are disposed in a cross-shaped configuration. The interlocking section attachment sides as well as the interlocking sections interact and function identically as described above in reference to block 100. The design of block 200 allows one to extend an interlocking construction block structure in four orthogonal directions, for example at the intersection of internal partition walls within a structure.

Figure 3:
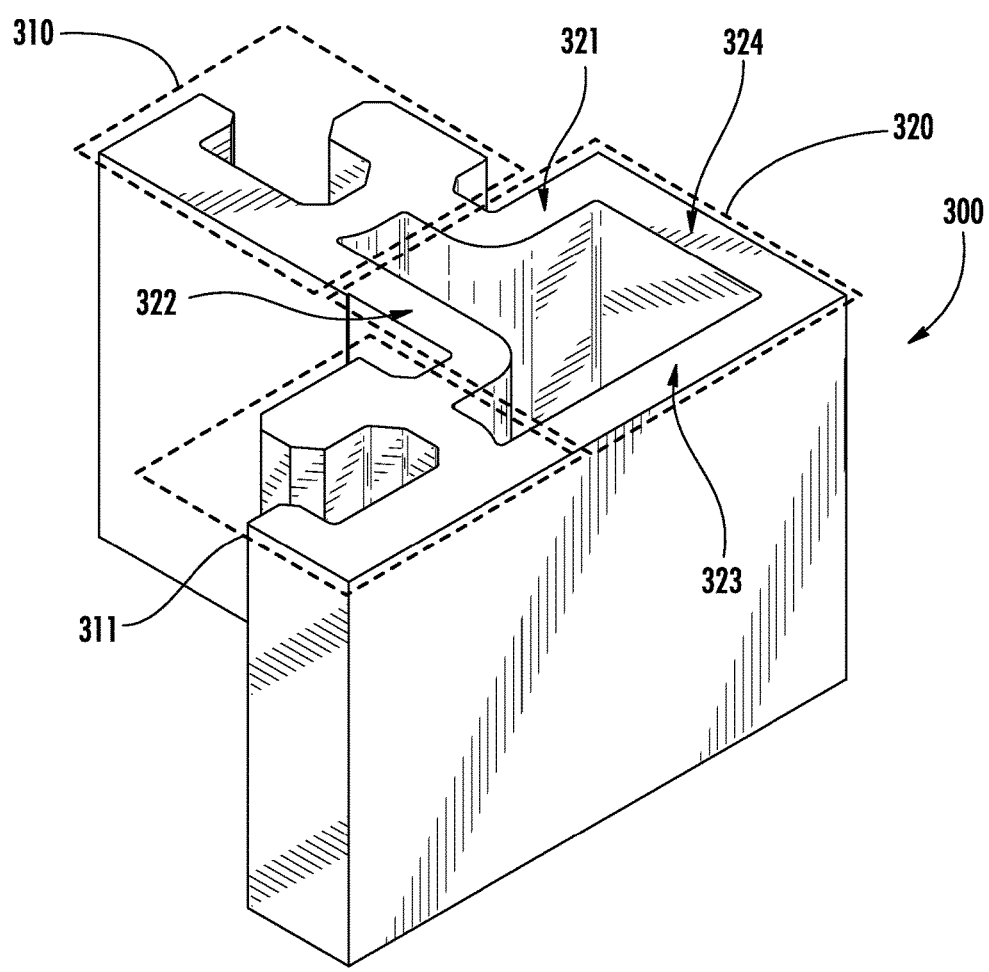
FIG. 3 depicts a perspective view of an interlocking corner-section construction block, which is used to connect two walls at a corner, in accordance with one embodiment of the present disclosure.

FIG. 3 depicts a perspective view of an interlocking corner-section construction block 300, which is used to connect two walls at a corner, in accordance with one embodiment of the present disclosure. The block 300 may comprise a core section 320 as well as two interlocking sections 310 and 311. The two interlocking sections 310 and 311 may be spaced 90 degrees from each other about the core section to form a corner.

The core section 320 may comprise two interlocking section attachment sides 321 and 322 disposed adjacent to one another, as well as two wall sides 323 and 324, which are also disposed adjacent to one another, such that the two interlocking sections 310 and 311 and the interlocking section attachment sides 321 and 322 form a right angle to one another. The configuration of block 300 may be used, for example, at the intersection of two walls to form a connection corner of a structure.

Figure 4:
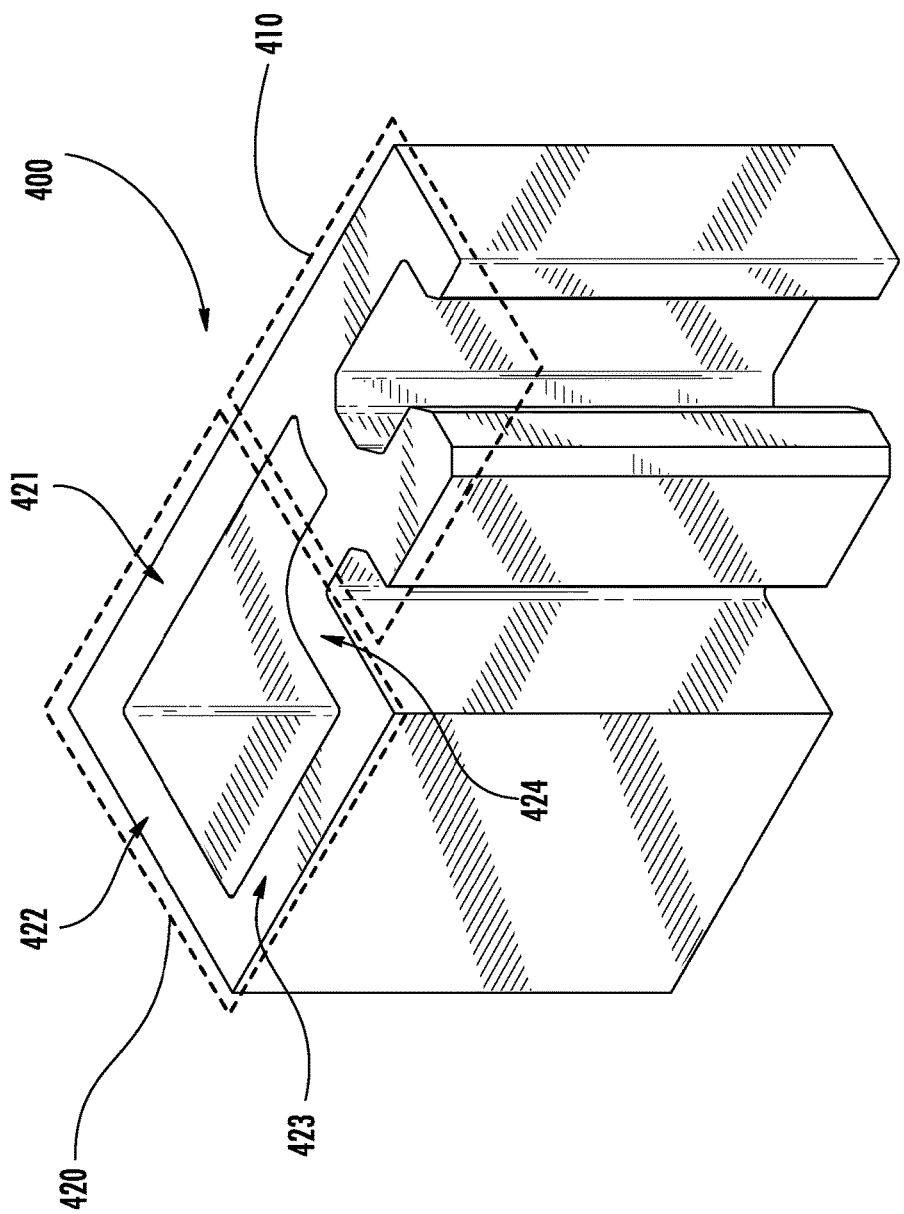
FIG. 4 depicts a perspective view of an interlocking end-piece construction block, which is used to create wall ends, doors and window frames, in accordance with one embodiment of the present disclosure.

FIG. 4 depicts a perspective view of an interlocking end-piece construction block 400, which is used to create wall ends, doors and window frames, in accordance with one embodiment of the present disclosure. The block 400 may comprise a core section 420 and an interlocking section 410. The core section 420 may further comprise an interlocking section attachment side 424 as well as three wall sides 421, 422, and 423. The configuration of the block 400 facilitates an end-piece interlocking construction block 400 which may be used, for example, as wall ends as well as for window and door frames.

Figure 5:
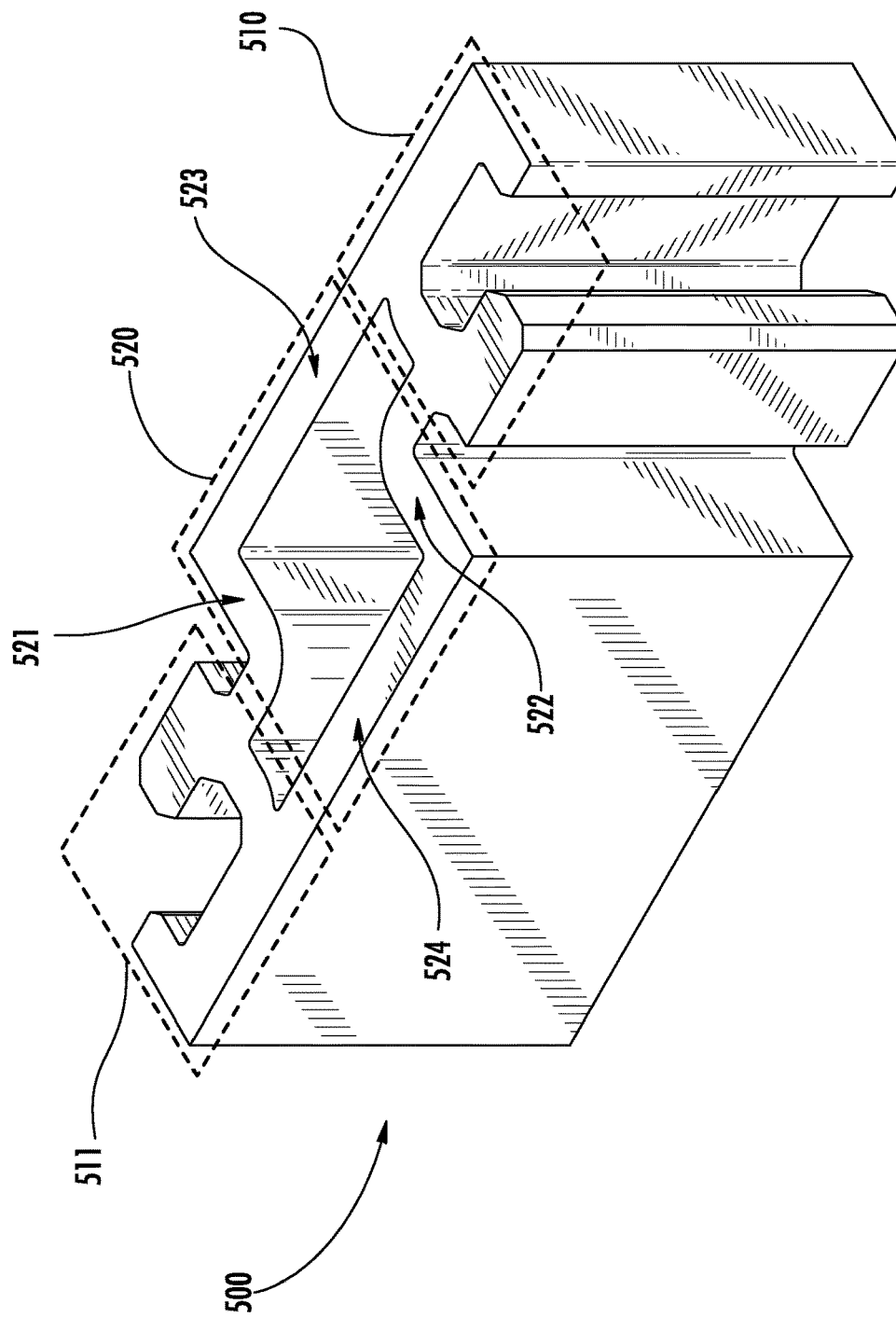
FIG. 5 depicts a perspective view of an interlocking stretcher construction block, which is the main element of a wall, in accordance with one embodiment of the present disclosure.

FIG. 5 depicts a perspective view of an interlocking stretcher construction block 500, which is the main element of a wall, in accordance with one embodiment of the present disclosure. The block 500 may comprise a core section 520 as well as two interlocking sections 510 and 511 that are disposed opposite one another. The core section 520 may further comprise interlocking section attachment sides 521 and 522 as well as wall sides 523 and 524. Interlocking section attachment sides 521 and 522 may also disposed opposite one another and adjacent to the wall sides 523 and 524.

The configuration of block 500 facilitates a stretcher interlocking construction block which may be preferably used, for example, to extend a wall of a structure in a chosen length and/or direction. In an embodiment, the block 500 may measure 12" in length and 8" in height.

Figure 6:
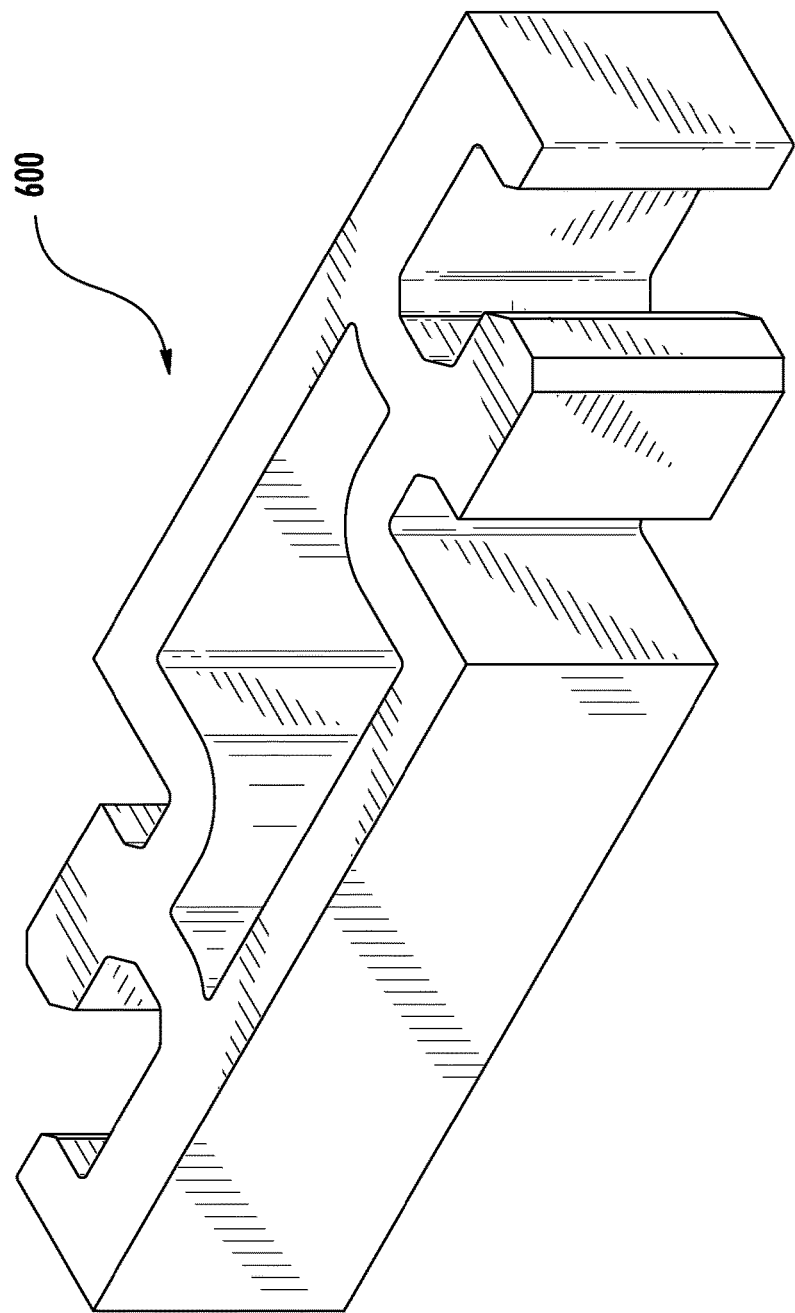
FIG. 6 depicts a perspective view of an interlocking half-stretcher construction block, which is an element to connect wall blocks vertically, in accordance with one embodiment of the present disclosure.

FIG. 6 depicts a perspective view of an interlocking half-stretcher construction block 600, which is an element to connect wall blocks vertically, in accordance with one embodiment of the present disclosure. The configuration of the block 600 may be the same as that of the block 500, with a core section and two interlocking sections, except that the block 600 may half the height of the block 500. In an embodiment, the block 600 may measure 12" in length and 4" in height.

Figure 7:
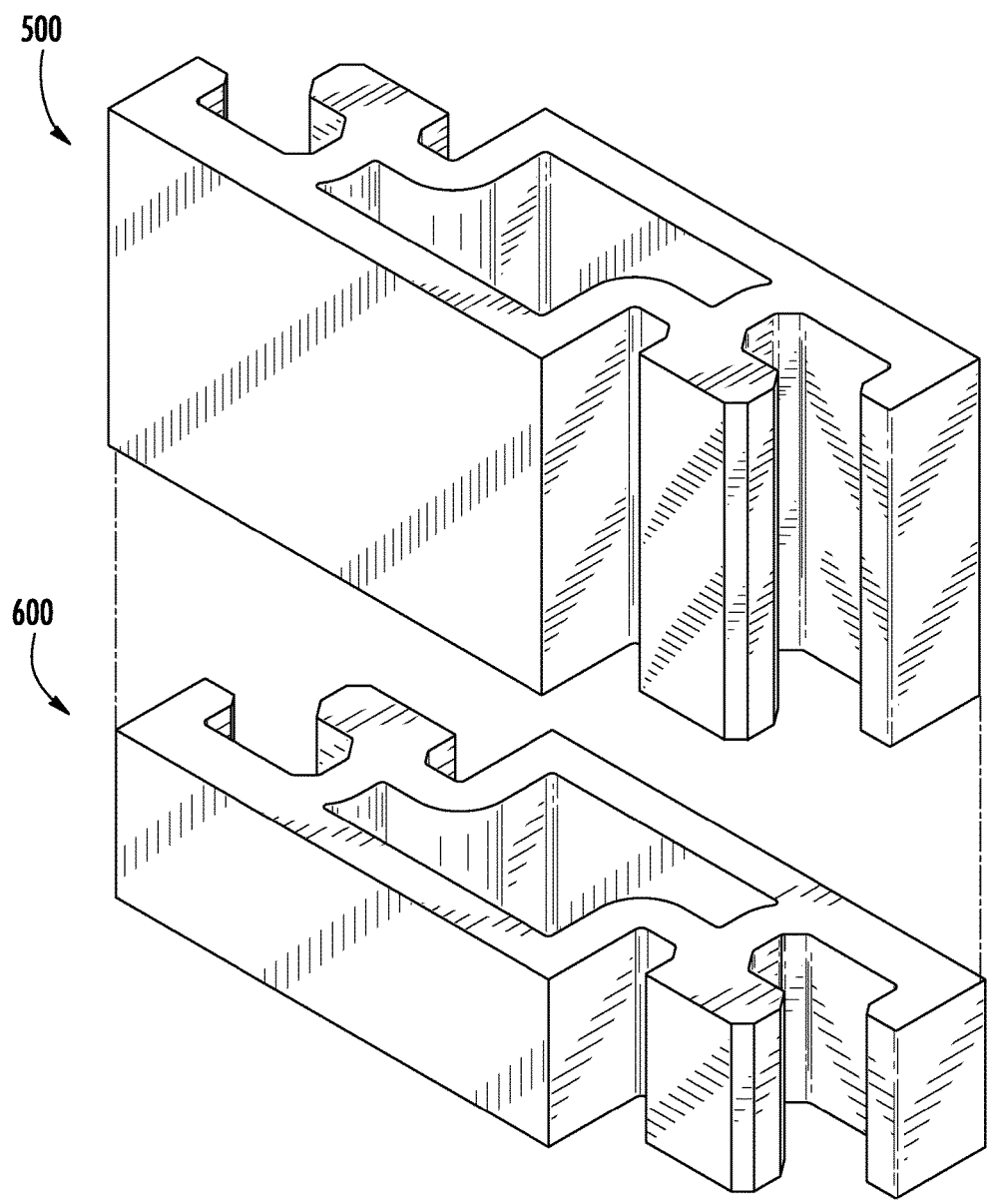
FIG. 7 depicts a perspective view comparing an interlocking stretcher and a half-stretcher construction blocks, in accordance with one embodiment of the present disclosure.

A perspective view comparing the heights of the stretcher block 500 and the half-stretcher block 600 can be seen in FIG. 7. In an embodiment, the stretcher block 500 may be 8" tall while the half-stretcher block 600 may be 4" tall. While the half-stretcher blocks 600 are disclosed, it is to be understood that any of the blocks depicted in FIGS. 1-5 may be manufactured in regular height or half height.

Figure 8:
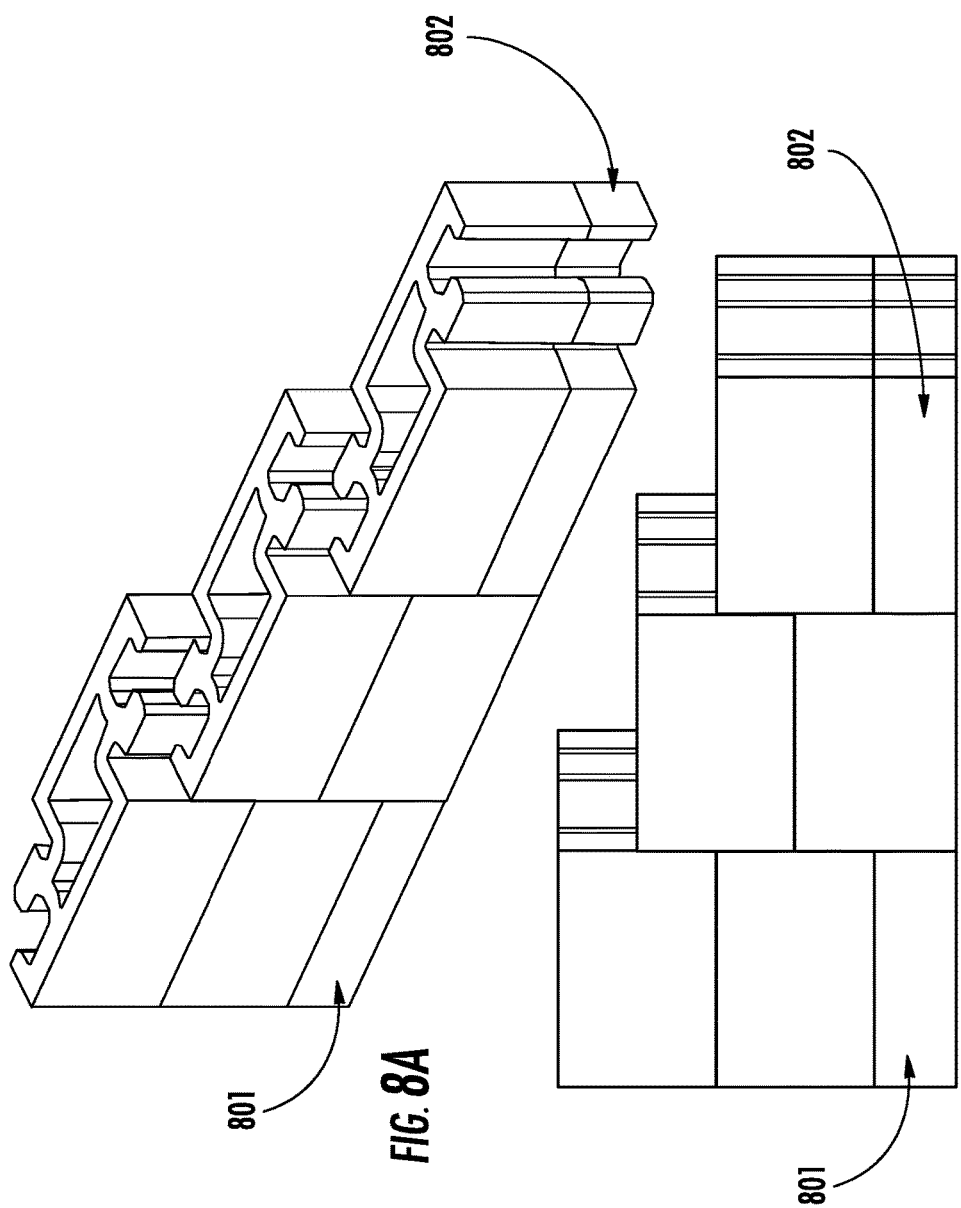
FIG. 8 depicts a perspective and side view demonstrating horizontal and vertical interlocking of staggering stretcher and half-stretcher blocks, in accordance with one embodiment of the present disclosure.

By using a combination of stretcher blocks 500 and half-stretcher blocks 600, one may stagger multiple interlocking construction blocks within a wall to interlock them along three axes: left/right, front/back, and up/down. An exemplary embodiment depicting this process can be seen in FIG. 8, wherein blocks 801 and 802 are half-stretcher blocks but the remaining blocks depicted are stretcher blocks. By utilizing the depicted alternating interlocking pattern between the seams of the blocks in the wall, a "woven" effect is created, both vertically and horizontally. This allows the blocks to lock in place and allows even distribution of structural weights and stresses, even during seismic or wind events.

Figure 9:
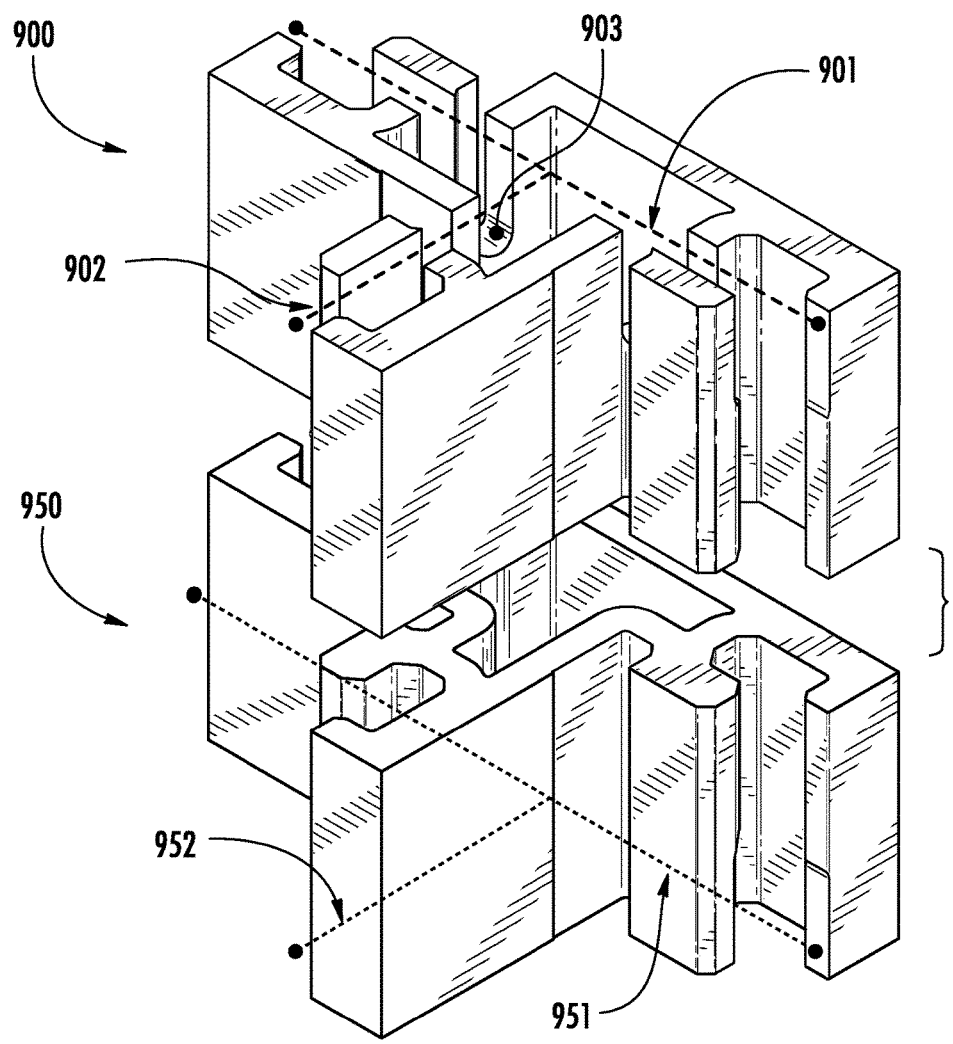
FIG. 9 depicts a perspective view of an interlocking T-section construction block with an internal channel spanning the central horizontal axes of the block, in accordance with one embodiment of the present disclosure.

FIG. 9 depicts a perspective view of interlocking T-section construction blocks 900 and 950 with internal channels spanning the central horizontal axes of the blocks, in accordance with one embodiment of the present disclosure. Blocks 900 and 950 are similar in configuration and function to the T-section block 100 depicted in FIG. 1, but with the addition of internal channels 901 and 902 added along the central horizontal longitudinal and lateral axis of the blocks, respectively. Channels 901 and 902 are defined by U-shaped grooves 903 extending from the vertical center of the block outward towards the top or bottom surfaces of the blocks 900 and 950. An internal channel may be added to either the top (block 900) or bottom (block 950) half of an interlocking construction block, depending on the needs of the end user and on local building code requirements. Block 900 has internal channels 901 and 902 extending from its vertical center to its top surface, while block 950 has internal channels 951 and 952 extending from its vertical center down to its bottom surface. These channels may be used, for example, to accommodate horizontal plumbing, electrical tubing and/or horizontal steel rebar reinforcement within a structure, or any other material preferable to the user depending upon local building code requirements.

Figure 10:
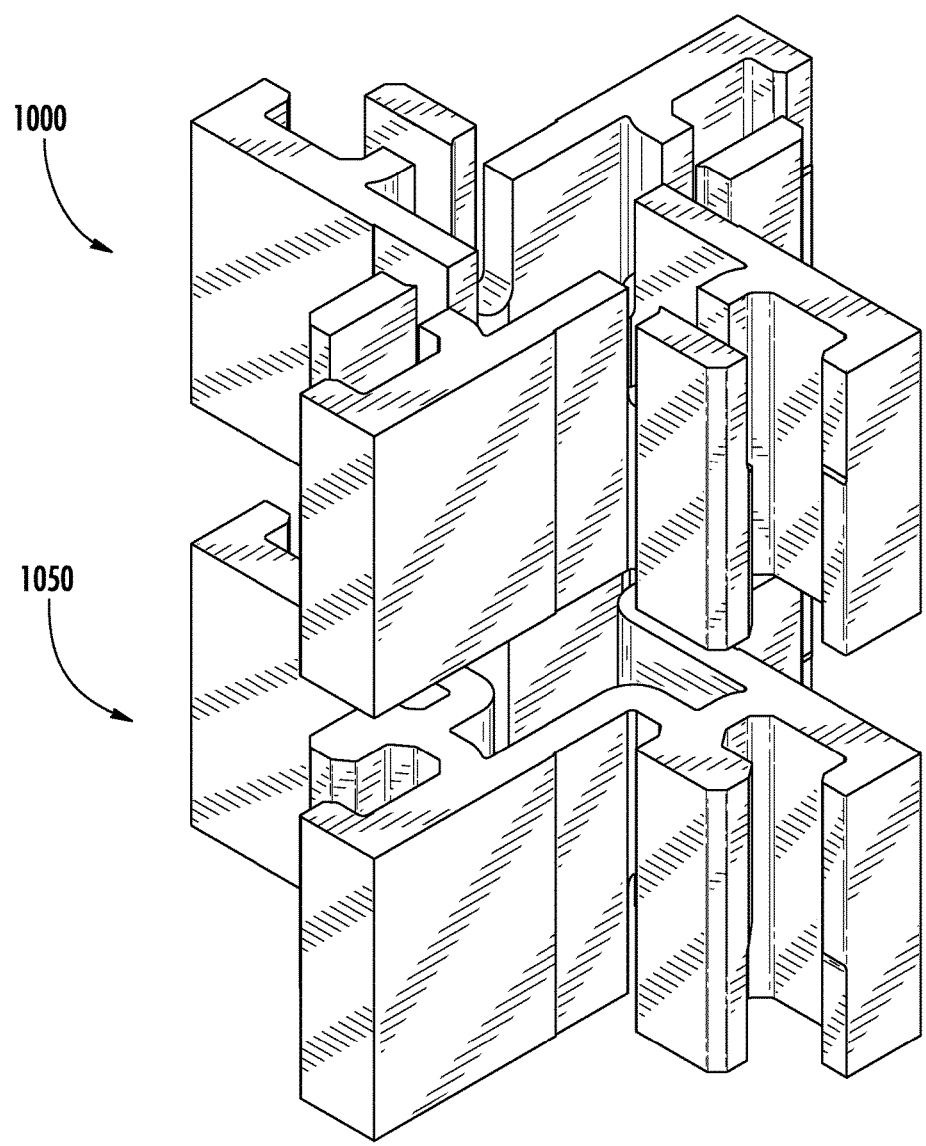
FIG. 10 depicts a perspective view of an interlocking cross-section construction block with an internal channel spanning the central horizontal axes of the block, in accordance with one embodiment of the present disclosure.
Figure 11:
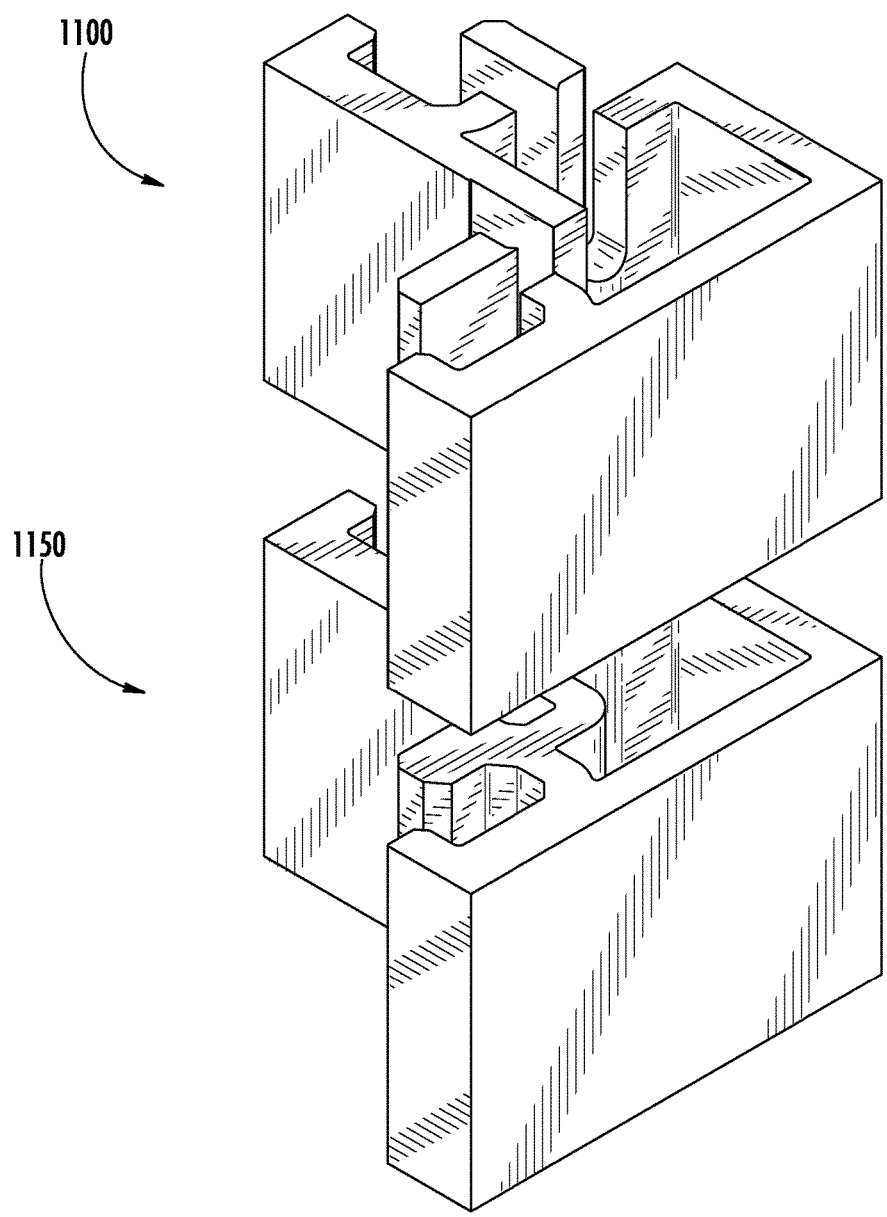
FIG. 11 depicts a perspective view of an interlocking corner-section construction block with an internal channel spanning the central horizontal axes of the block, in accordance with one embodiment of the present disclosure.
Figure 12:
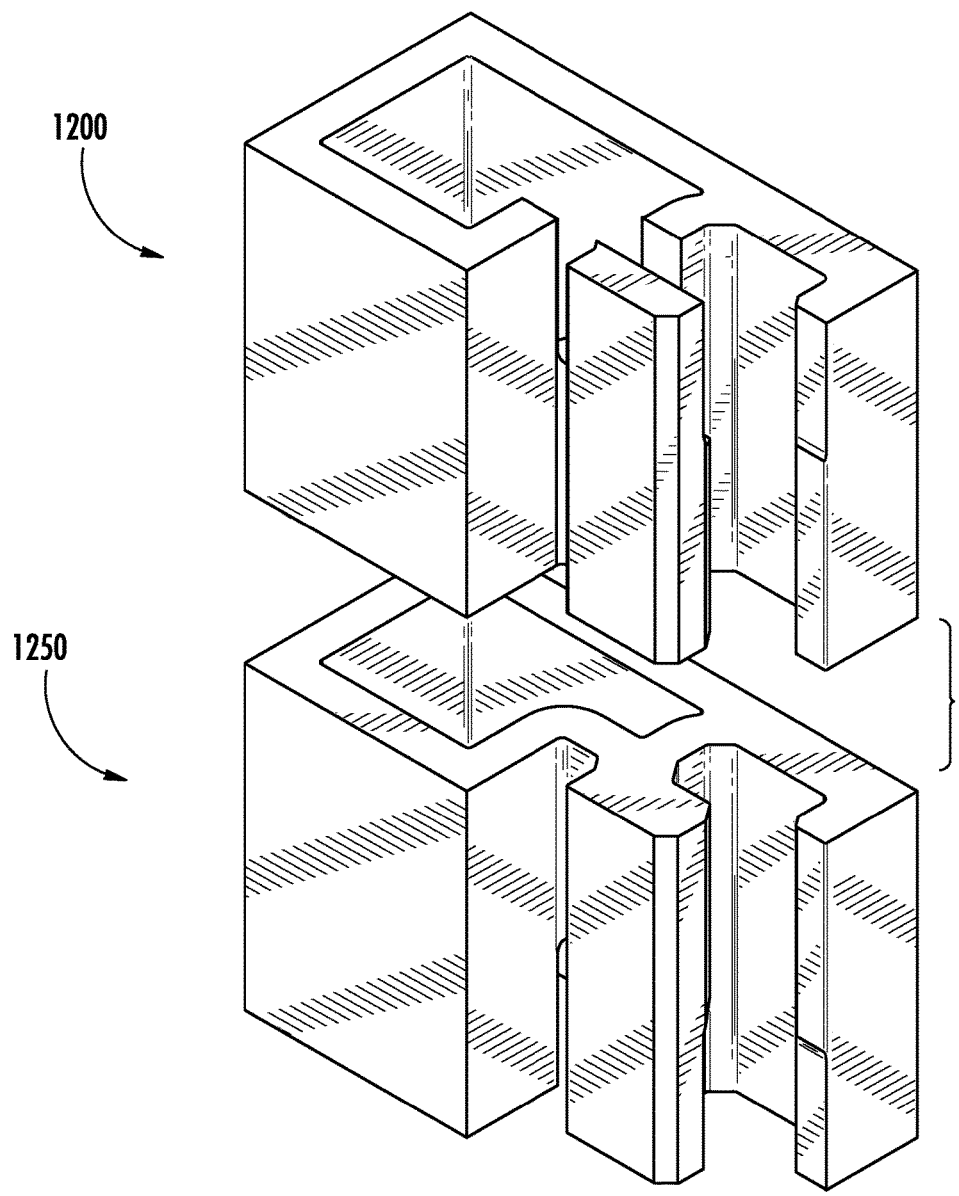
FIG. 12 depicts a perspective view of an interlocking end-piece construction block with an internal channel spanning the central longitudinal axis of the block, in accordance with one embodiment of the present disclosure.
Figure 13:
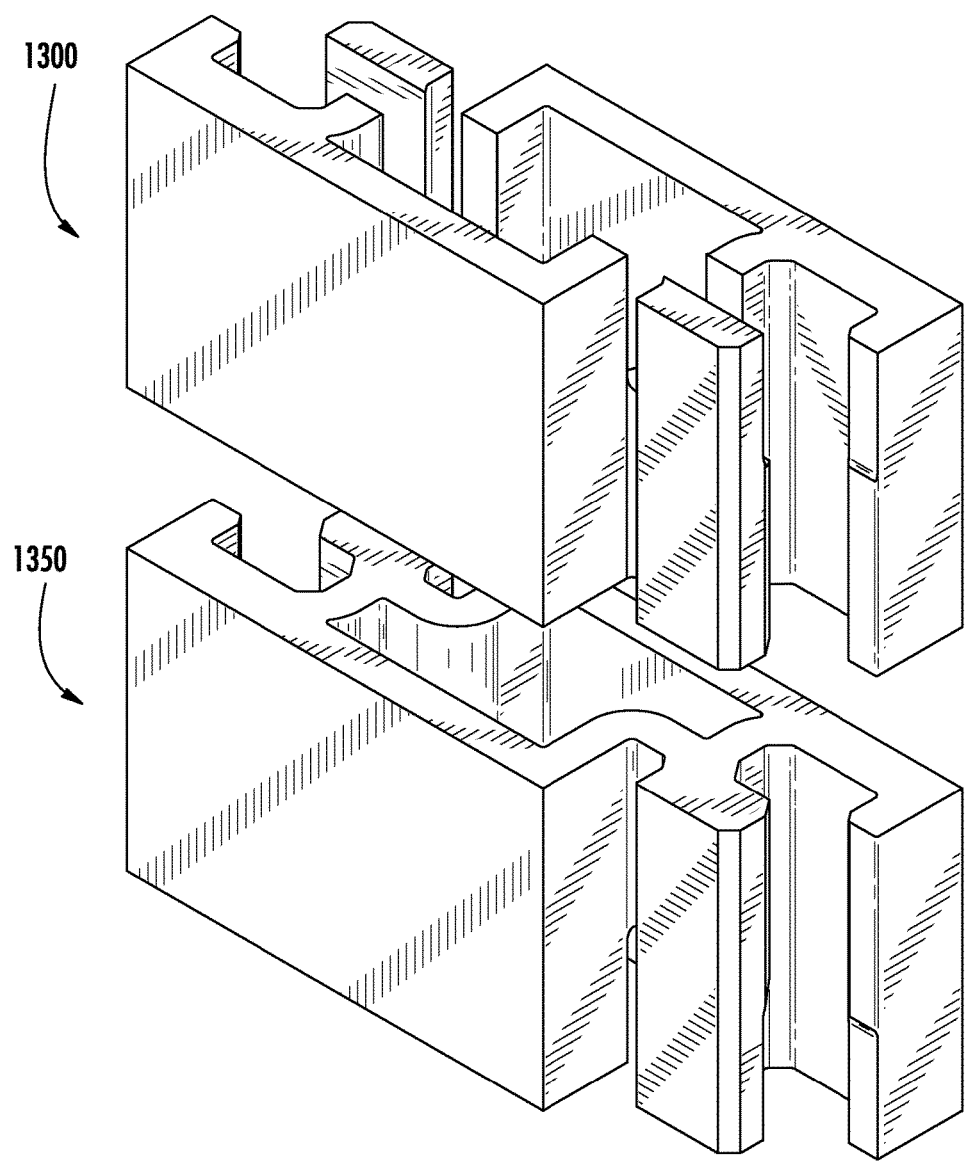
FIG. 13 depicts a perspective view of an interlocking stretcher construction block with an internal channel spanning the central longitudinal axis of the block, in accordance with one embodiment of the present disclosure.

FIGS. 10-13 depict perspective views of previously presented interlocking construction blocks with additional internal channels similar to those described in FIG. 9 added. FIG. 10 depicts two embodiments of cross-section interlocking construction blocks 1000 and 1050 each with internal channels running along its central longitudinal and lateral axes, disposed on either the top or bottom half of the blocks. FIG. 11 depicts two embodiments of corner-section interlocking construction blocks 1100 and 1150 each with internal channels running along its central longitudinal and lateral axes, disposed on either the top (block 1100) or bottom (block 1150) half of the blocks. FIG. 12 depicts two embodiments of end-piece interlocking construction blocks 1200 and 1250 each with an internal channel running along its central longitudinal axis, disposed on either the top (block 1200) or bottom (block 1250) half of the blocks. FIG. 13 depicts two embodiments of stretcher interlocking construction blocks each with an internal channel running along its central longitudinal axis, disposed on either the top or bottom half of the blocks.

FIG. 14 depicts an alternate perspective view of the interlocking stretcher construction block 1300 depicted in FIG. 13 with an internal channel spanning the top half of central longitudinal axis of the block 1300. As seen in FIG. 14, the U-shaped internal channel running longitudinally through the top half of the block is more readily apparent and is operable to accommodate horizontal plumbing, electrical tubing and/or horizontal steel rebar reinforcement within a structure, or any other material preferable to the user depending upon local building code requirements.

FIG. 15 depicts a top view of the interlocking stretcher construction blocks 1300 and 1350 with internal channels spanning the central longitudinal axis of the block, in accordance with one embodiment of the present disclosure. As seen in FIG. 15, internal channels can be manufactured to coordinate with any orientation of a proposed or existing structure. Block 1300 may comprise a top channel, while block 1350 may comprise a bottom channel.

FIG. 16 depicts a side view providing comparison between channeled and non-channeled embodiments of interlocking construction blocks 500, 1300, and 1350, in accordance with one embodiment of the present disclosure. Looking down the longitudinal axis of interlocking stretcher construction blocks to offer a comparison between various channeled embodiments and non-channeled embodiments (500) of the disclosed interlocking construction blocks. Block 1300 may comprise a top channel, while block 1350 may comprise a bottom channel.

Figure 17:
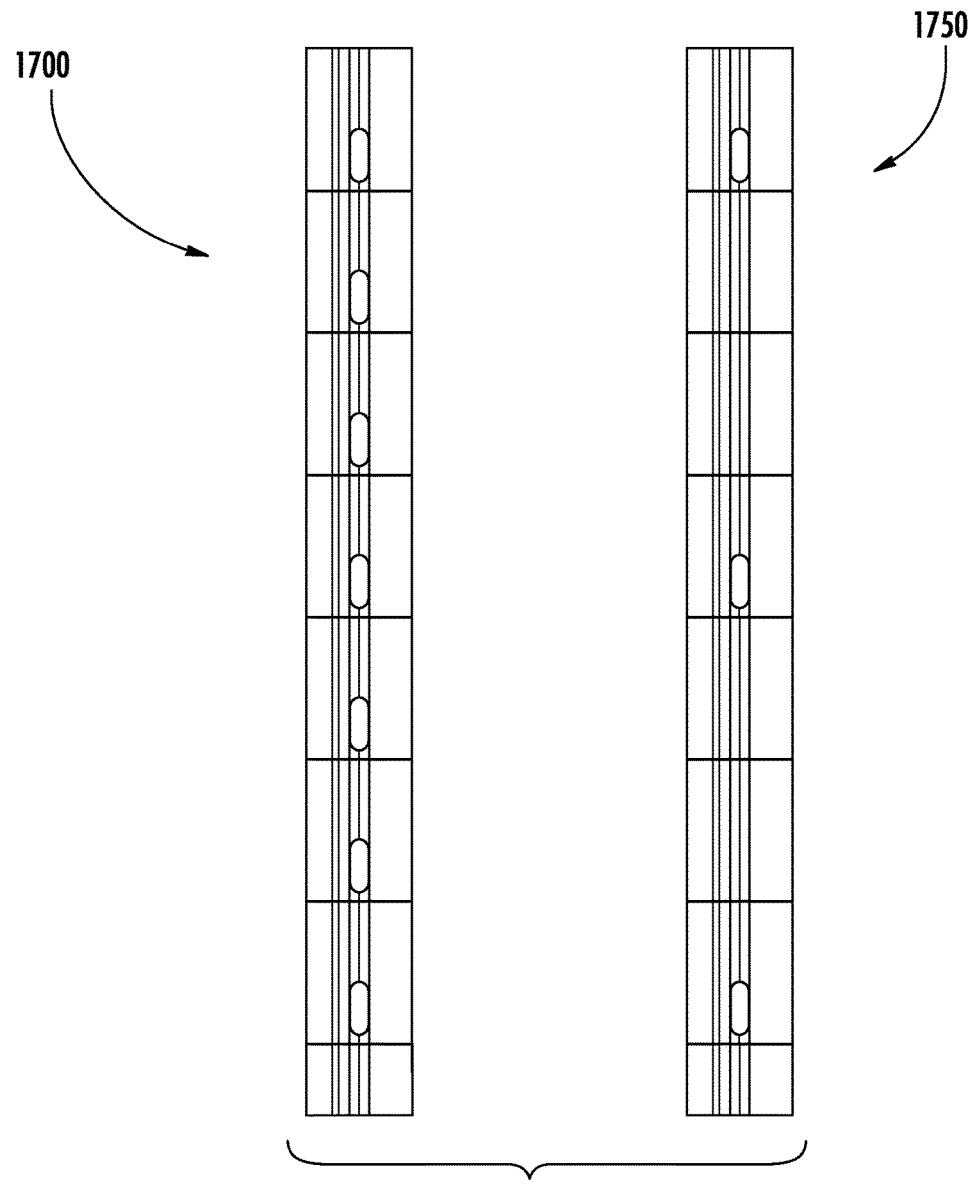
FIG. 17 depicts a side view of a structure composed of different configurations of channeled and non-channeled interlocking construction blocks, in accordance with one embodiment of the present disclosure.

FIG. 17 depicts a side view of a structure composed of different configurations of channeled and non-channeled interlocking construction blocks, in accordance with one embodiment of the present disclosure. A structure 1700 is composed exclusively with channeled interlocking construction blocks, while a structure 1750 is composed of a combination of channeled and non-channeled blocks, and serves to illustrate that any preferable combination of channeled and non-channeled blocks may be utilized depending on the needs of the user and on local building code requirements.

Figure 19:
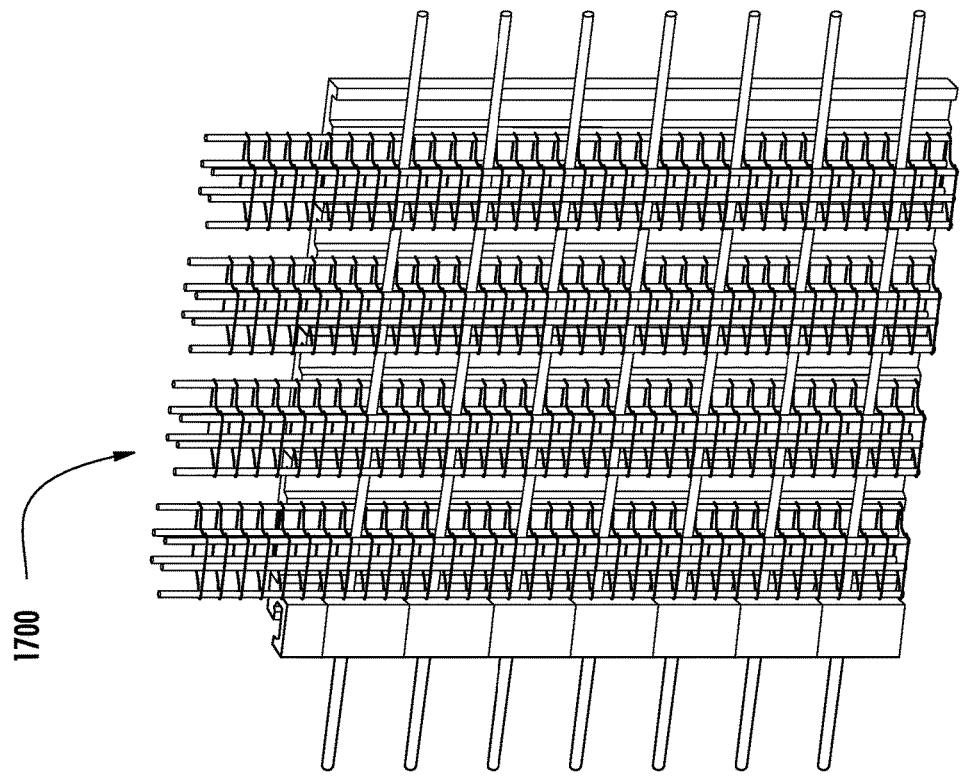
FIG. 19 depicts a perspective cross-sectional view of the structure and full reinforced steel rebar materials from FIG. 18, in accordance with one embodiment of the present disclosure.
Figure 18:
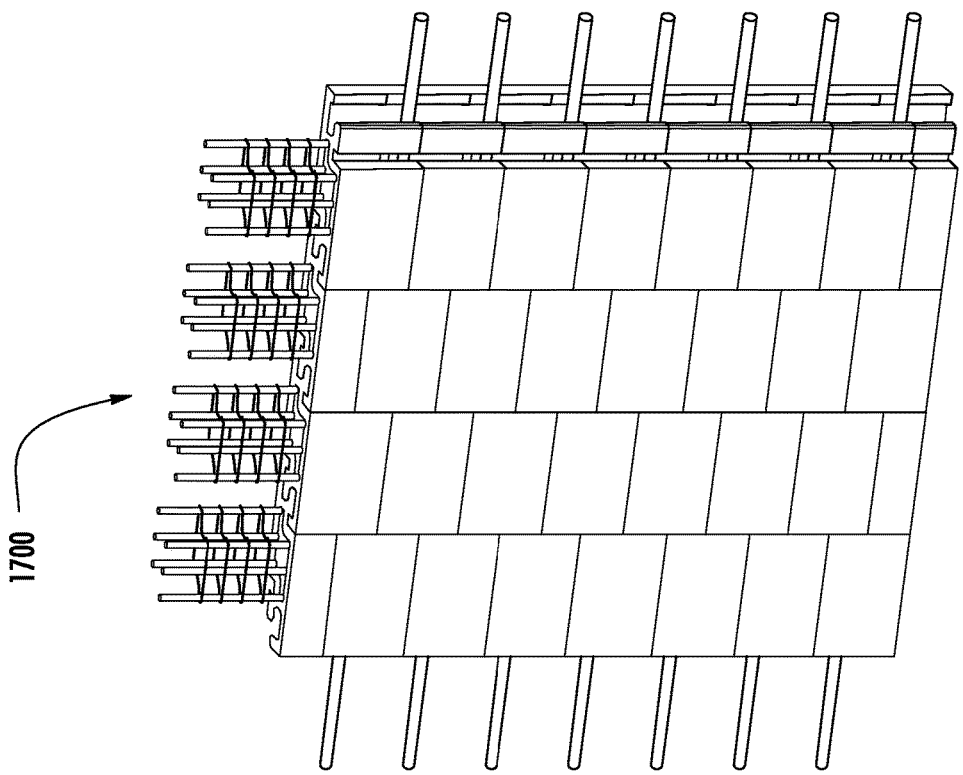
FIG. 18 depicts a perspective view of the structure from FIG. 17 with full reinforcement steel rebar material placed within the internal channels of the blocks, in accordance with one embodiment of the present disclosure.

FIG. 18 depicts a perspective view of the structure 1700 from FIG. 17 with full reinforcement steel rebar material placed within the internal channels of the blocks, while FIG. 19 depicts a perspective cross-sectional view of the structure and full reinforced steel rebar materials from FIG. 18, in accordance with one embodiment of the present disclosure. In both FIGS. 18 and 19, reinforcing steel bars are placed within the internal channels of the structure and run longitudinally along the structure while scaffolding is placed within the hollow core sections of the blocks and runs vertically up through the structure 1700. These additional materials serve to provide added strength to the structure 1700.

Figure 21:
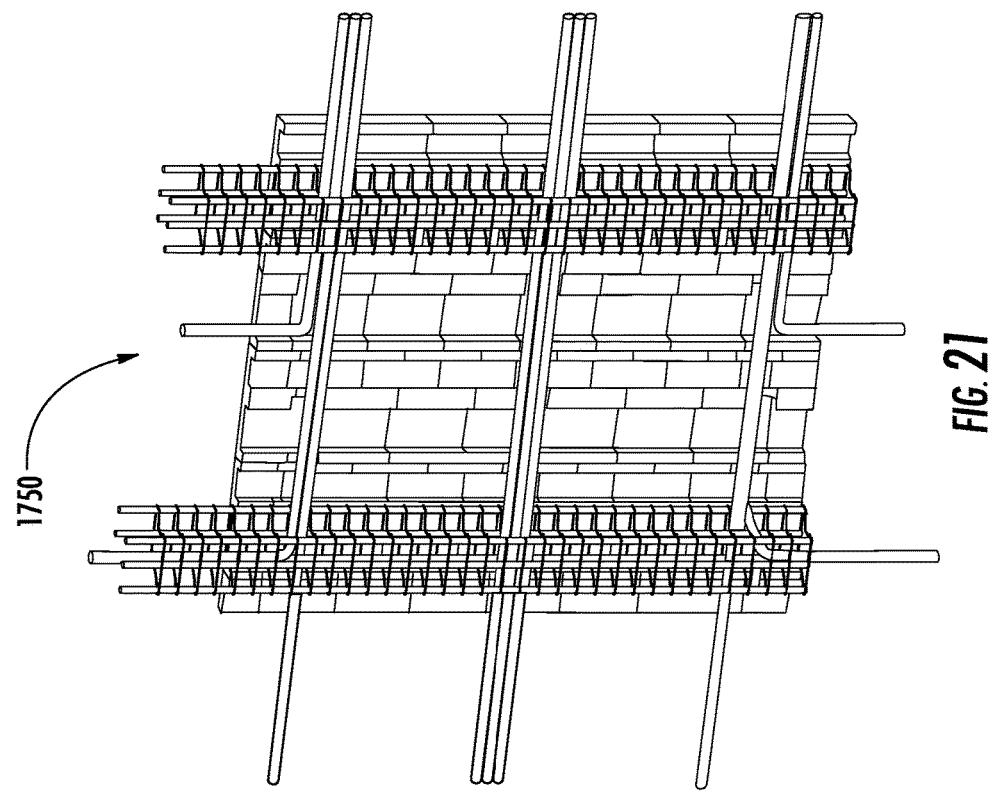
FIG. 21 depicts a perspective cross-sectional view of the structure and partial steel rebar materials from FIG. 20, in accordance with one embodiment of the present disclosure.
Figure 20:
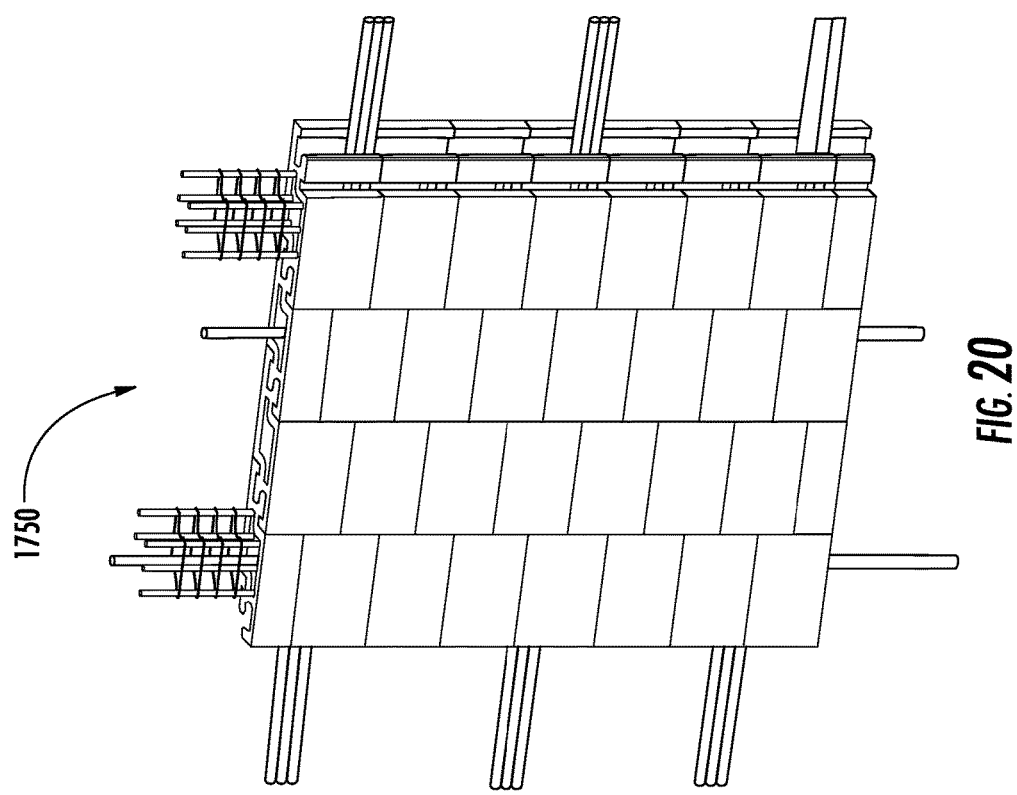
FIG. 20 depicts a perspective view of another structure from FIG. 17 with partial reinforced steel rebar materials placed within the internal channels of the blocks, in accordance with one embodiment of the present disclosure.

FIG. 20 depicts a perspective view of the structure 1750 from FIG. 17 with partial reinforced steel rebar reinforcement materials placed within the internal channels of the blocks, while FIG. 21 depicts a perspective cross-sectional view of the structure and partial steel rebar materials from FIG. 20, in accordance with one embodiment of the present disclosure. In both FIGS. 20 and 21, plumbing and electrical tubing have been placed within the internal channels of the structure, providing demonstration of the array of possible combinations and uses of interlocking construction blocks with or without internal channels, depending on the preference of the user and local building code requirements.

Figure 47:
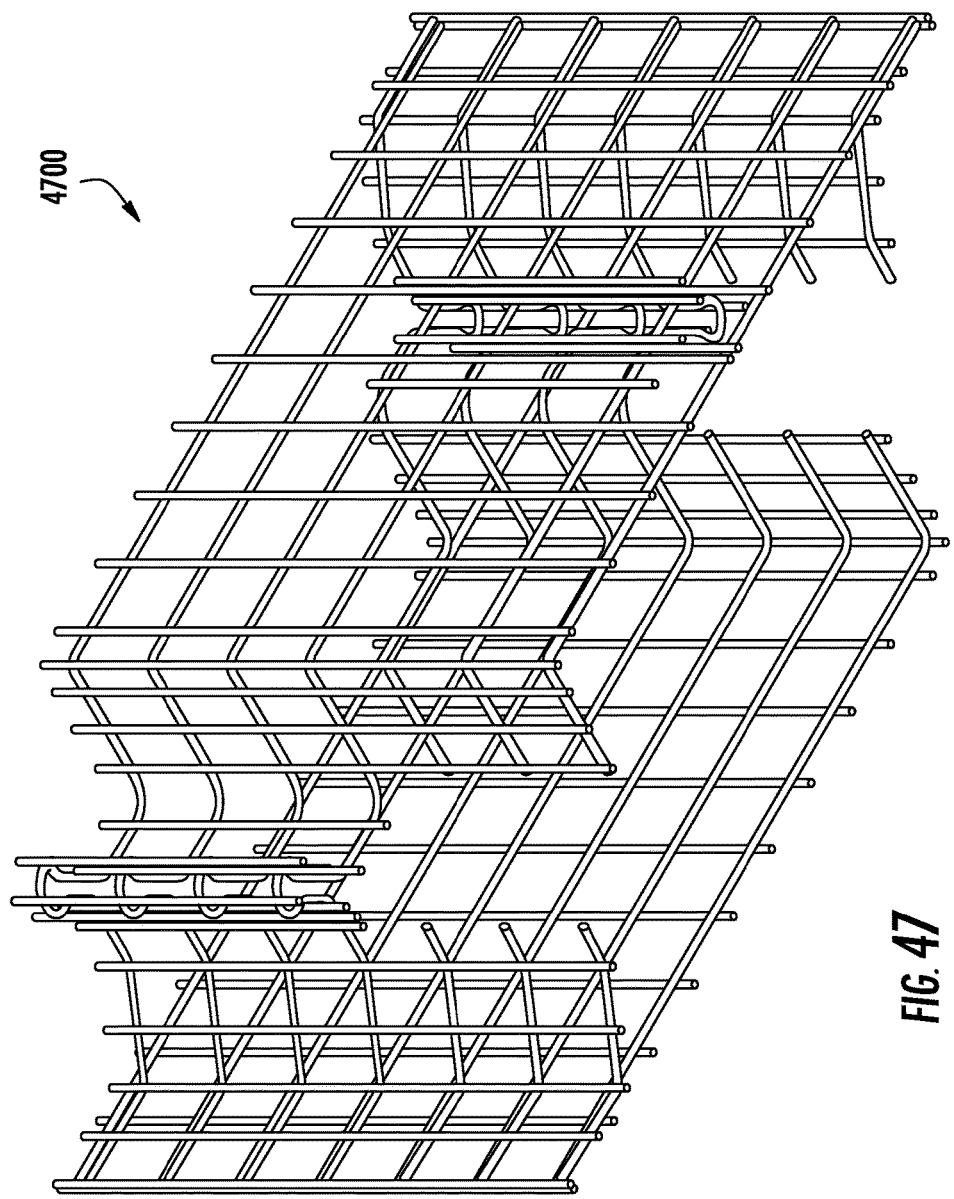
FIG. 47 depicts a perspective view of an optional internal mesh cage used to produce reinforced concrete blocks, in accordance with one embodiment of the present disclosure.

In addition to providing reinforcing material within channels that span between multiple interlocking construction blocks to reinforce a structure such as a wall, each individual block may also be reinforced. FIG. 47 depicts a perspective view of an optional internal mesh cage 4700, in accordance with one embodiment of the present disclosure. The internal mesh cage 4700 may be added to the interlocking block during the mold process (discussed below), and may be shaped and sized to reinforce substantially all of the interlocking block. In an embodiment, the internal mesh cage 4700 may be shaped and placed proximate to the outer perimeter of the interlocking block, although it other embodiments, it may be shaped and placed anywhere within the interlocking block. The internal mesh cage 4700 may be made from steel mesh, carbon fiber, or any other material suitable for providing reinforcement to the interlocking block.

Figure 48A:
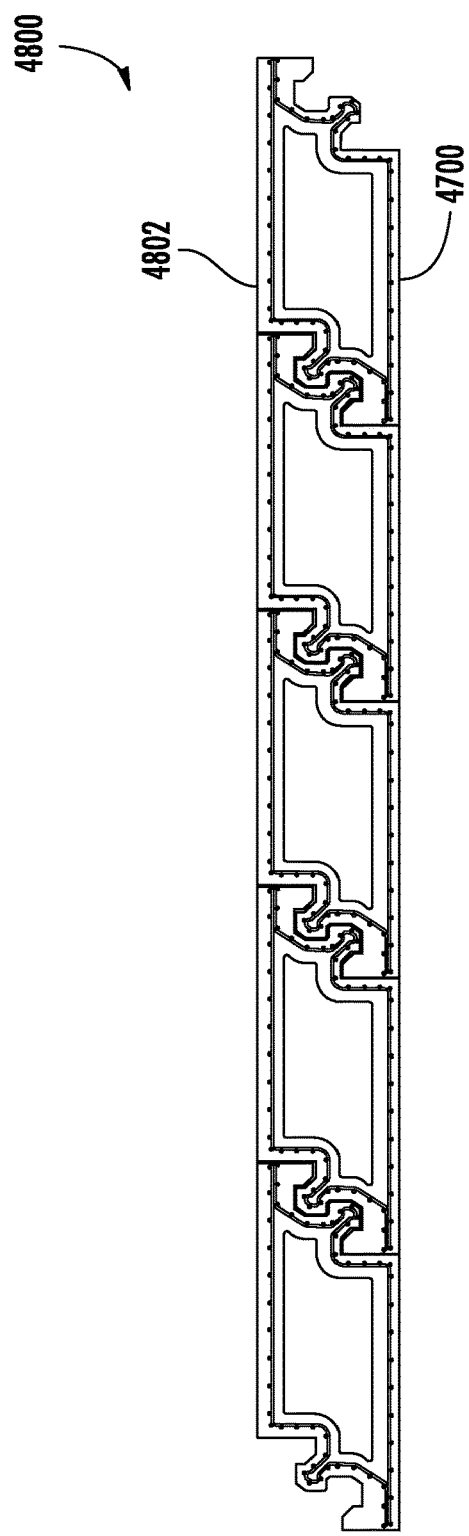
FIG. 48A depicts a top view of an interlocking wall structure with reinforced concrete blocks using the internal mesh cages inside the block's concrete material of FIG. 47, in accordance with one embodiment of the present disclosure.
Figure 48B:
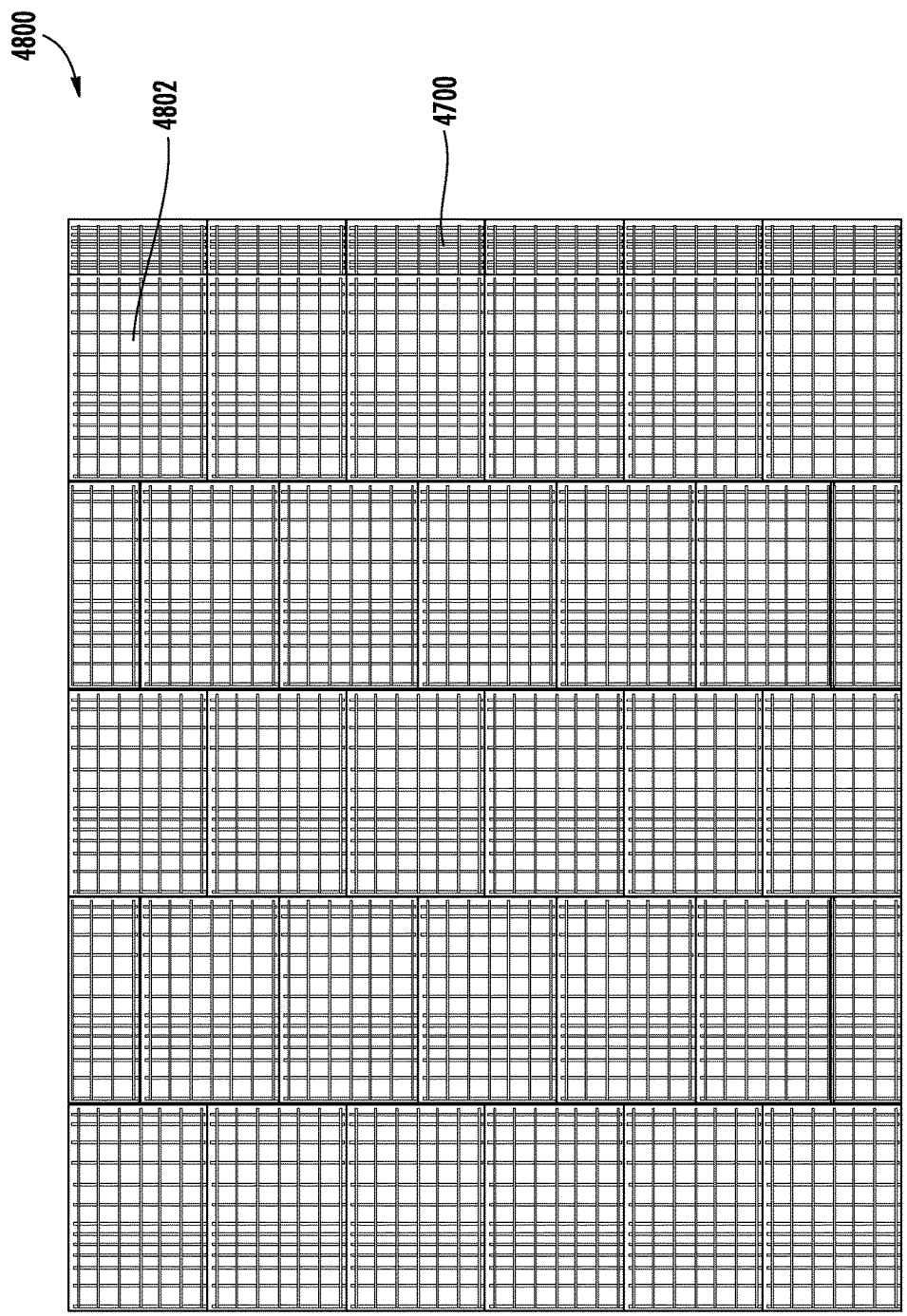
FIG. 48B depicts a front view of the interlocking wall structure with reinforced concrete blocks without reinforcing the wall of FIG. 48A, in accordance with one embodiment of the present disclosure.
Figure 48C:
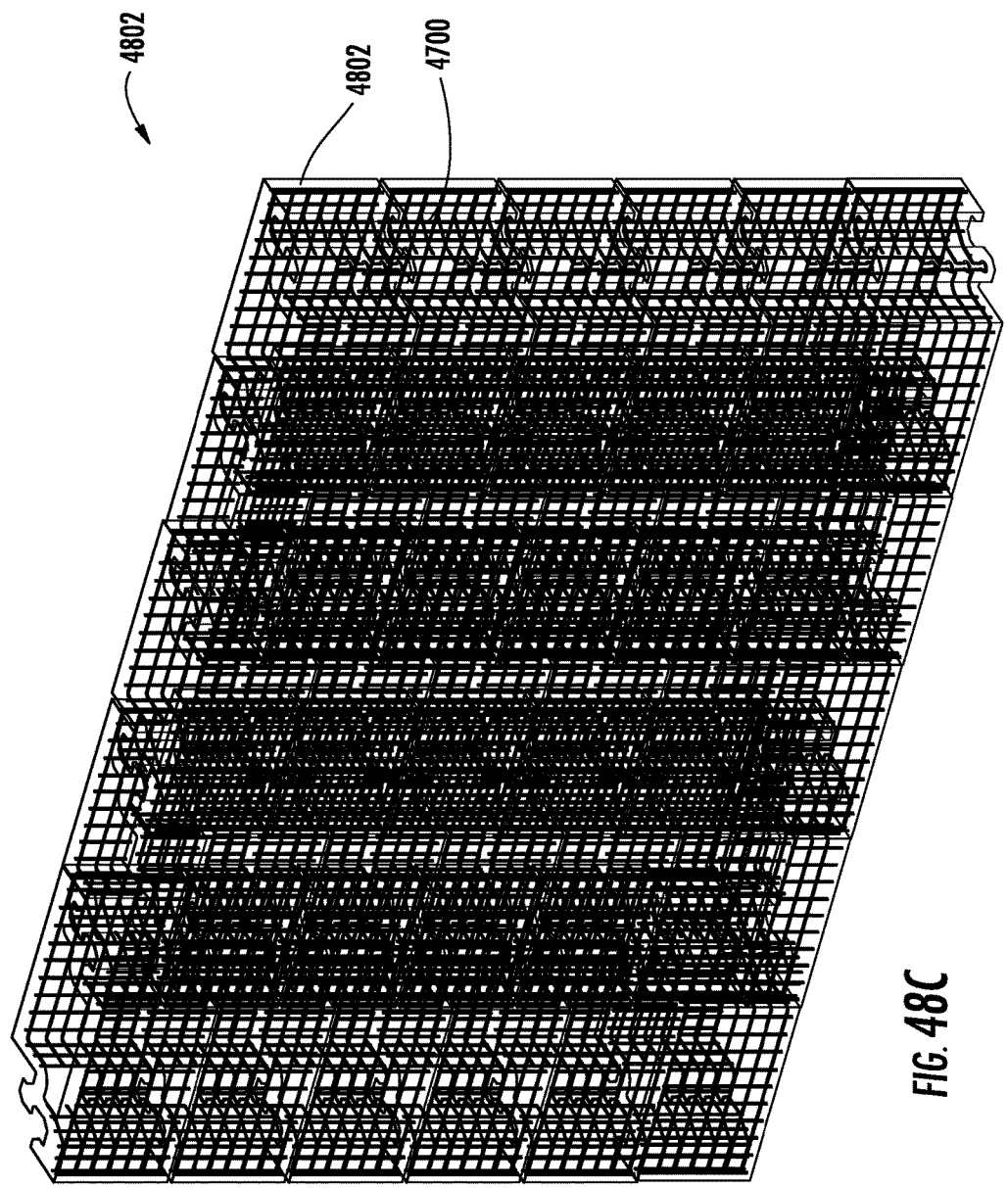
FIG. 48C depicts a perspective view of the interlocking wall structure with reinforced concrete blocks without reinforcing the wall of FIG. 48A, in accordance with one embodiment of the present disclosure.

FIGS. 48A, 48B, and 48C depict top, front, and perspective views, respectively, of an interlocking wall structure 4800 with internal mesh cages 4700 of FIG. 47, in accordance with one embodiment of the present disclosure. As shown in FIG. 48A-C, five columns of interlocking stretcher and half-stretcher construction blocks 4802 are interlocked, forming the wall structure 4800. Each of the interlocking construction blocks 4802 have internal mesh cages 4700, reinforcing the structure of each individual block 4802.

Figure 22:
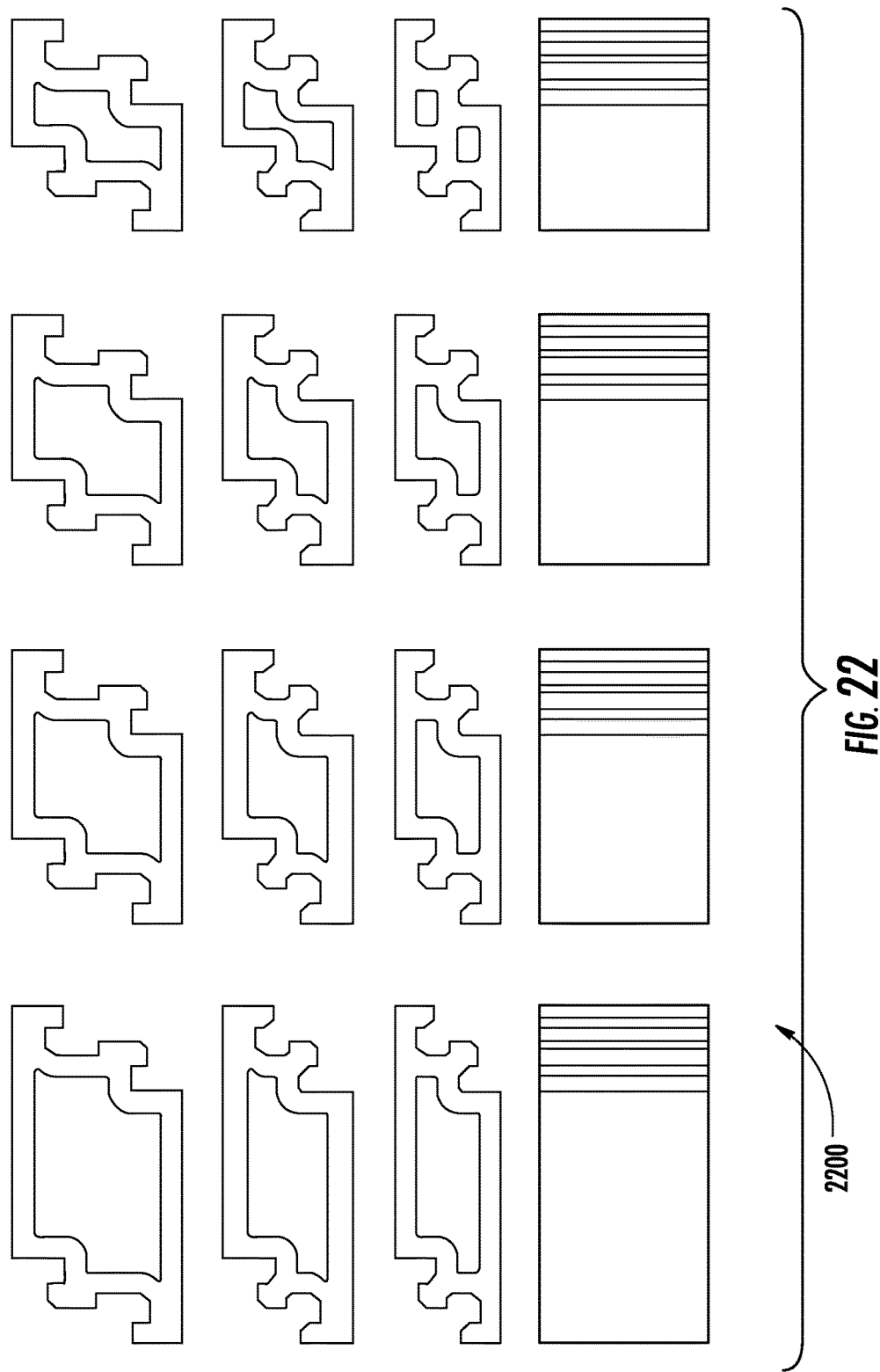
FIG. 22 depicts top and side views of several embodiments of interlocking stretcher construction blocks, in accordance with one embodiment of the present disclosure.

FIG. 22 depicts top and side views of several embodiments of interlocking stretcher construction blocks 2200, in accordance with one embodiment of the present disclosure. These exemplary embodiments of interlocking stretcher construction blocks comprise a variety of different total lengths and widths. These embodiments serve to demonstrate that the interlocking construction blocks previously presented herein are not exhaustive of the possible configurations and embodiments and that interlocking construction blocks can be manufactured to any specifications desired by the user and on local building code requirements. Any number of repeating geometric patterns may be used to create interlocking construction blocks as long as the positive spaces defining negative spaces repeat in each interlocking section. For example, specific geometries of interlocking sections are depicted in FIGS. 23-28, below. The geometries of FIGS. 23-28, while different than those depicted in FIGS. 1-6, are similarly repeating and allow to the disclosed blocks to interlock with adjacent blocks.

Figure 23:
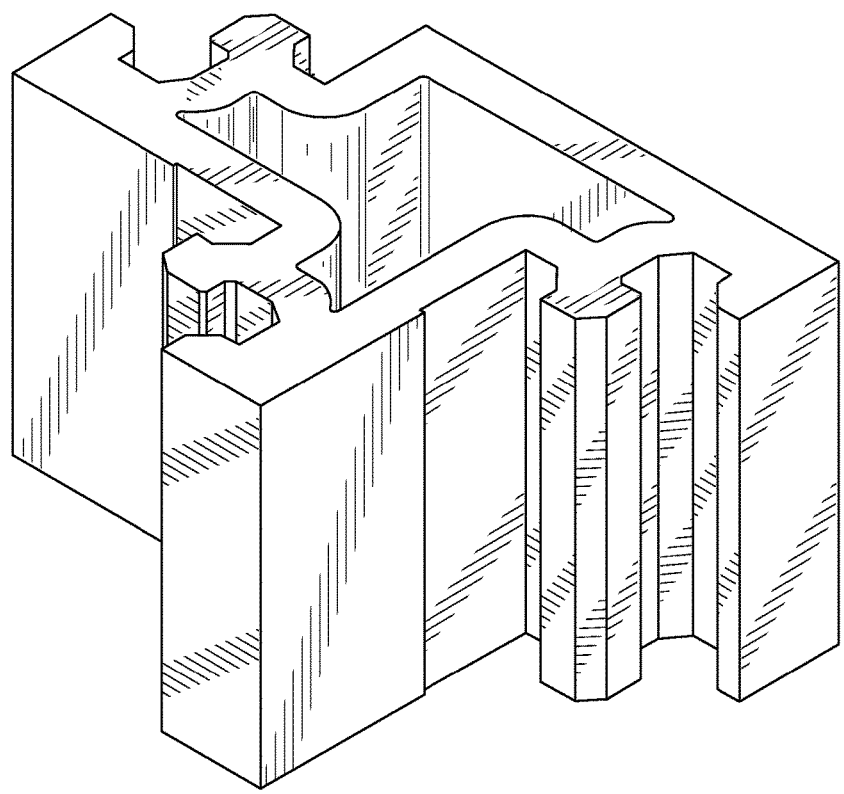
FIG. 23 depicts a perspective view of an interlocking T-section construction block, which is used to connect three walls, in accordance with one embodiment of the present disclosure.
Figure 24:
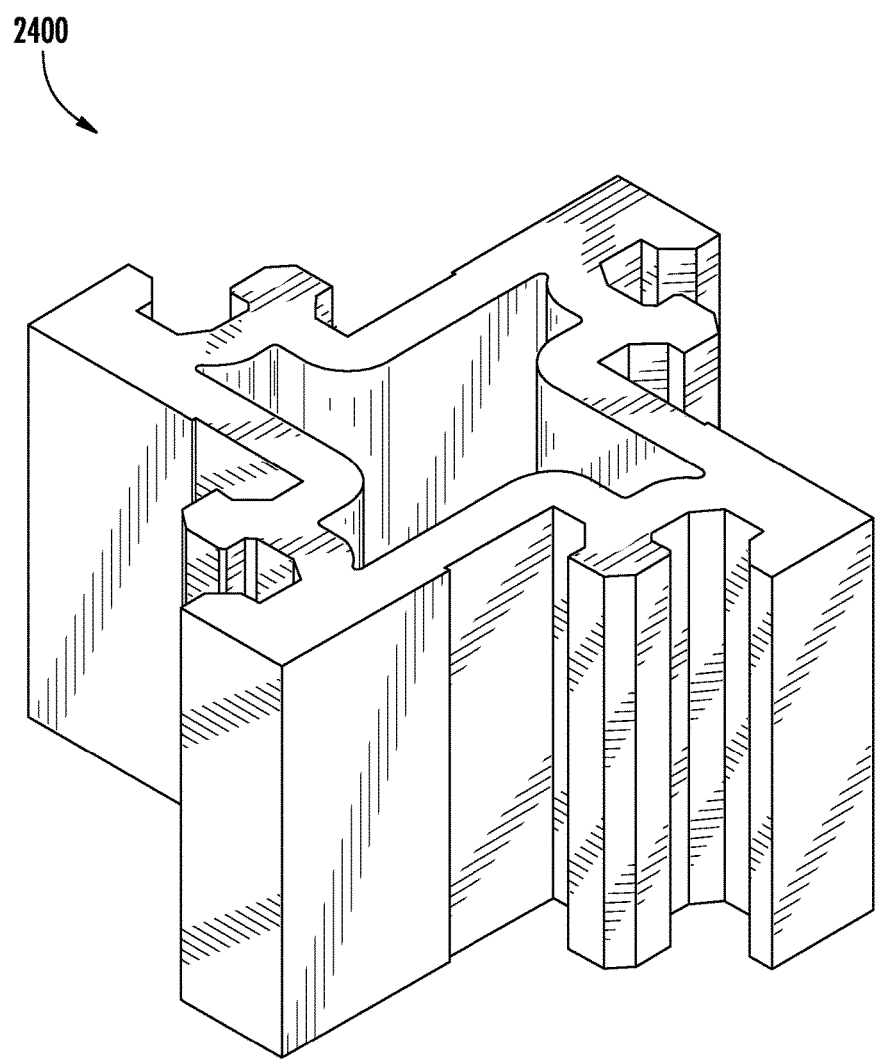
FIG. 24 depicts a perspective view of an interlocking cross-section construction block, which is used to connect four walls, in accordance with one embodiment of the present disclosure.
Figure 25:
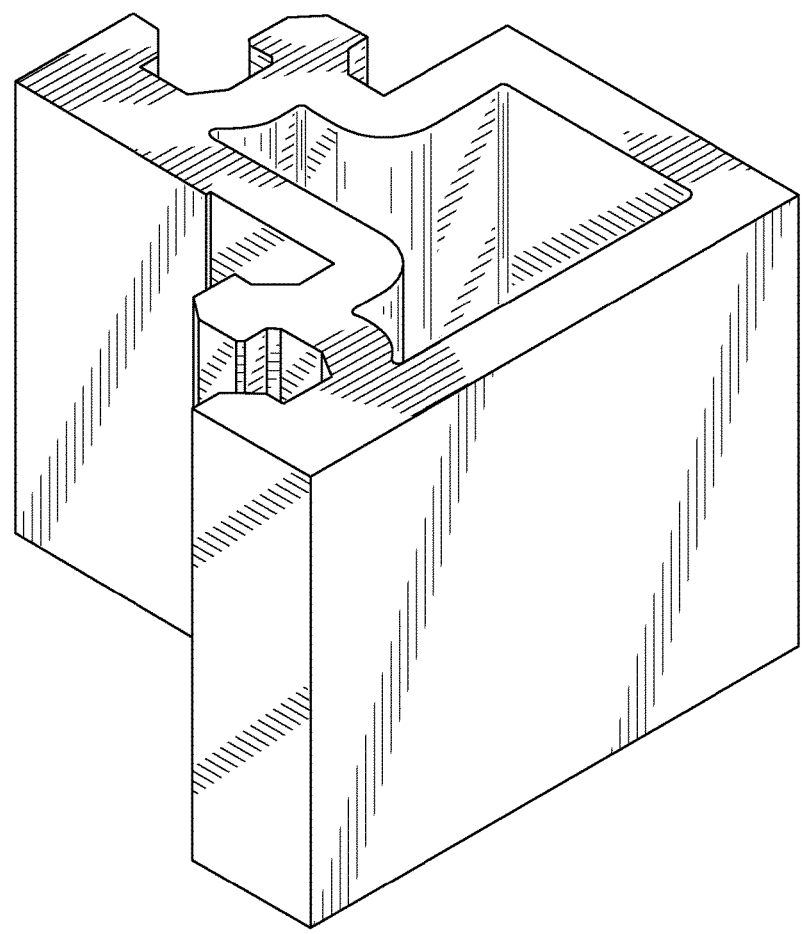
FIG. 25 depicts a perspective view of an interlocking corner-section construction block, which is used to connect two walls at a corner, in accordance with one embodiment of the present disclosure.
Figure 26:
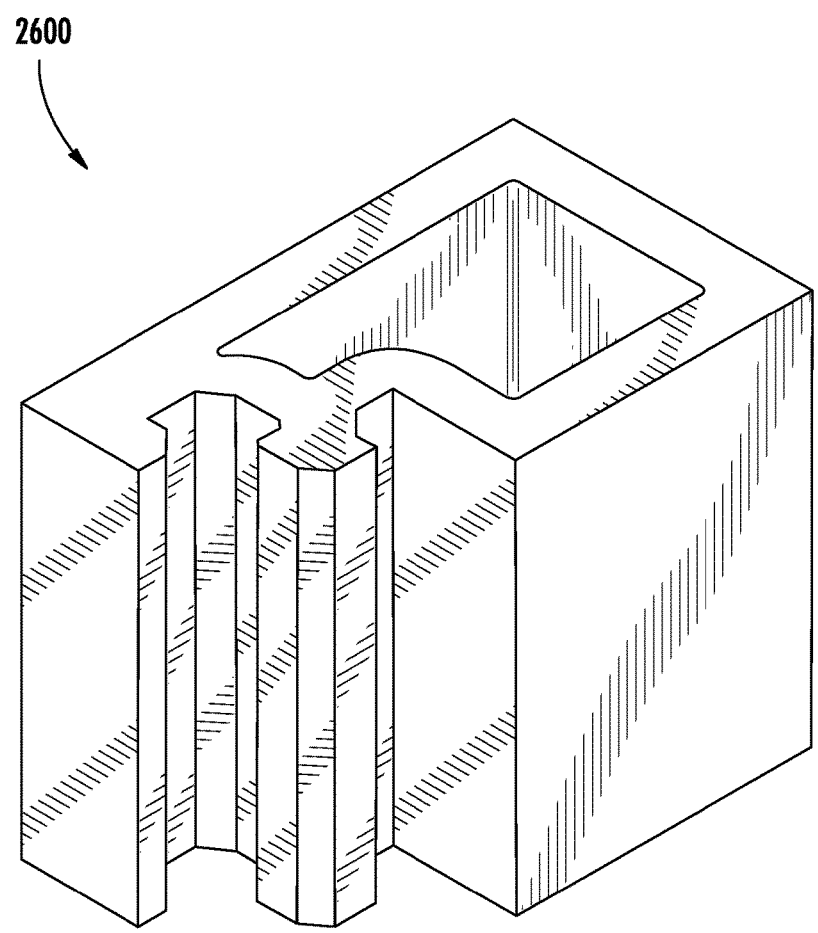
FIG. 26 depicts a perspective view of an interlocking end-piece construction block, which is used to create wall ends, doors and window frames, in accordance with one embodiment of the present disclosure.
Figure 27:
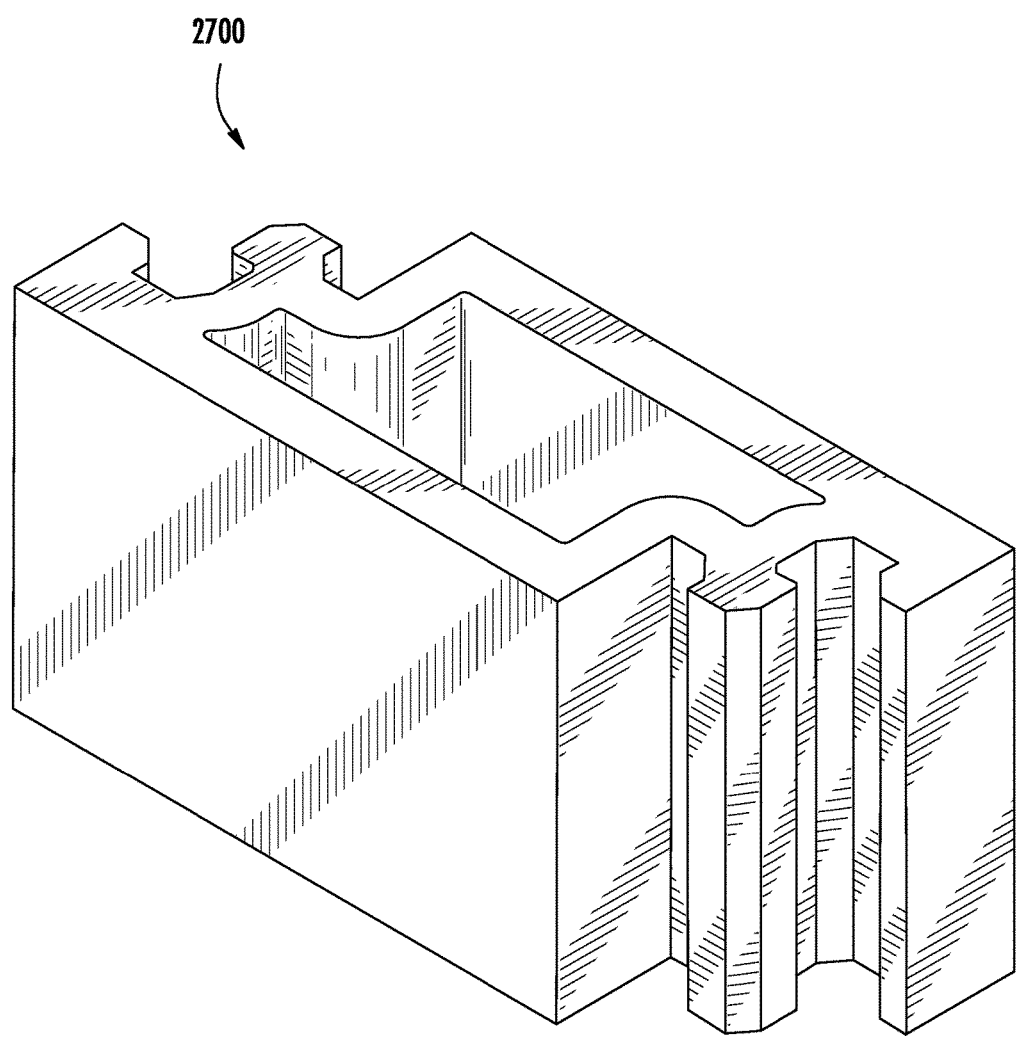
FIG. 27 depicts a perspective view of an interlocking stretcher construction block, which is the main element of a wall, in accordance with one embodiment of the present disclosure.
Figure 28:
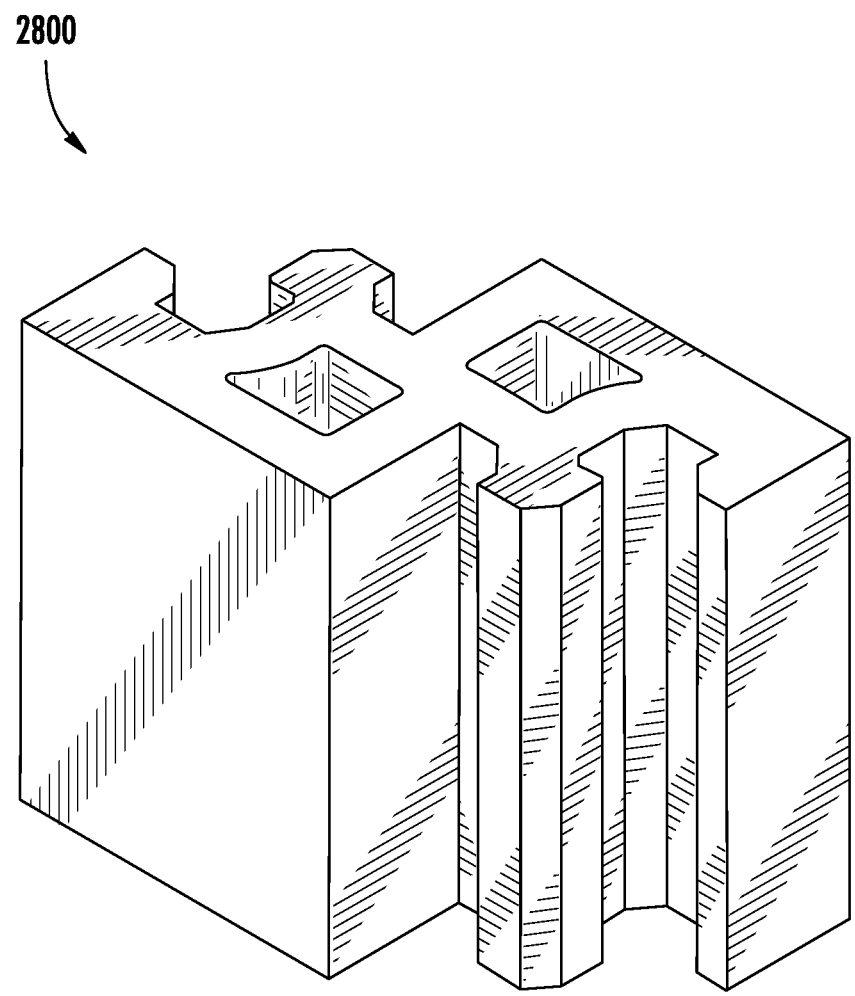
FIG. 28 depicts a perspective view of an interlocking spacer construction block, which is an element to connect wall blocks vertically, in accordance with one embodiment of the present disclosure.

FIG. 23 depicts a perspective view of an interlocking T-section construction block 2300, which is used to connect three walls, in accordance with one embodiment of the present disclosure. FIG. 24 depicts a perspective view of an interlocking cross-section construction block 2400, which is used to connect four walls, in accordance with one embodiment of the present disclosure. FIG. 25 depicts a perspective view of an interlocking corner-section construction block 2500, which is used to connect two walls at a corner, in accordance with one embodiment of the present disclosure. FIG. 26 depicts a perspective view of an interlocking end-piece construction block 2600, which is used to create wall ends, doors and window frames, in accordance with one embodiment of the present disclosure. FIG. 27 depicts a perspective view of an interlocking stretcher construction block 2700, which is the main element of a wall, in accordance with one embodiment of the present disclosure. FIG. 28 depicts a perspective view of an interlocking spacer construction block 2800, in accordance with one embodiment of the present disclosure.

The interlocking construction blocks of FIGS. 23-28, described below, may be similar to the interlocking construction blocks depicted in FIGS. 1-6, but may include different geometries of interlocking features in each of the interlocking sections. Specifically, the geometry of each interlocking sections may utilize less building material by reducing the size of the interlocking portion catch ends, the interlocking portion keys, and the interlocking portion attachment ends, thereby making the interlocking construction blocks cheaper to make and more lightweight. The remaining disclosure of FIGS. 1-6 is herein incorporated by reference in relation to FIGS. 23-28.

It is to be understood that in order to interlock and self-align properly, different blocks within a family of an interlocking construction block system will utilize the same geometry of interlocking portions. That is, the interlocking construction blocks of FIGS. 1-6 may interlock and self-align with each other without the use of a binding agent such as mortar during assembly, while the interlocking construction blocks of FIGS. 23-28 may interlock and self-align with each other without the use of a binding agent such as mortar during assembly. But blocks with different interlocking section geometries may not interlock and self-align with each other without the use of a binding agent such as mortar during assembly.

In each of the embodiments described in relation to FIGS. 1-28, the interlocking constructions blocks are operable to interlock with each other in at least three directions. The blocks may interlock along three axes: a left/right axis, a front/back axis, and an up/down axis. Each of the various configurations of blocks can be manufactured in different widths to conform to building code requirements around the world.

The interlocking construction blocks, such as the stretcher block 500 and the half-stretcher block 600, can be manufactured in the standard 12" length, but can also be manufactured in special 6" lengths or in 8" and 9" extension lengths. By configuring the blocks in 6", 8", 9", and 12" lengths, a combination of blocks can be used to create any length of wall in one inch increments. For example, a 3' section may be created with three 12" blocks. A 3'1" section may be created with one 12" block, one 9" block, and three 8" blocks. A 3'2" section may be created with one 12" block, two 9" blocks, and two 8" blocks. A 3'2" section may be created with one 12" block and three 9" blocks. A 3'4" section may be created with two 12" blocks and two 8" sections. Any other length of section may be created in this manner in one inch increments. By allowing any length of wall to be created, the interlocking construction blocks advantageously may be used for both infill and retrofitting in addition to new construction. In addition, the interlocking construction blocks can advantageously be used for infrastructure such as building a roadway over a streambed.

Similarly, any width of wall structure can be made using various shapes and sizes of the disclosed interlocking construction blocks, as well as any size and shape of structure. For example, the disclosed interlocking construction blocks may be used to create either reinforced or non-reinforced walls of a house or office or other structure.

The standard thickness of an interlocking construction block may be 6", which surpasses the strength requirements for six-inch and eight-inch standard ASTM C90 concrete masonry units (CMU), but in other embodiments, the block may be 5" or 8" thick or any other thickness desired. The blocks may also be manufactured with different material densities for structural and non-structural walls. In addition to manufacturing individual blocks of various widths, the interlocking construction blocks can be interlocked together to create a wall of any thickness by allowing one or more rows of blocks to interlock together.

The disclosed interlocking construction blocks may be constructed from a cement mixture, aggregate, sand, and/or water and may meet or exceed ASTM C90 requirements while requiring less material to construct. In order to calculate the ASTM C90 requirements, the following calculation is performed as shown in FIG. 80.

And the ASTM C90 requirements for the minimum thickness of face shells and webs for hollow units are listed in Table 1 below:

TABLE 1

ASTM C90 Minimum Thickness of Face Shells and Webs for Hollow Units.

| Nominal width of units in. (mm) | Face shell Thickness B, C, minimum, in. (mm) | Web thickness Webs B, C, D in. (mm) | Equivalent web thickness, in./linear ft E (mm/linear m) |
|---|---|---|---|
| 3 (76.2) & 4 (102) | 3/4 (19) | 3/4 (19) | 15/8 (136) |
| 6 (152) | 1 (25)D | 1 (25) | 21/4 (188) |
| 8 (203) | 11/4 (32)D | 1 (25) | 21/4 (188) |
| 10 (254) and greater | 11/4 (32) | 11/8 (29) | 21/2 (209) |

A. Average of measurements on a minimum of 3 units when measured as described in Test Methods C 140.
B. When this standard is used for units having split surfaces, a maximum of 10% of the splits surface is permitted to have thickness less than those shown, but not less than 3/4 in. (19.1 mm). When the units are to be solid grouted, the 10% limit does not apply and Footnote C establishes a thickness requirement for the entire face shell.
C. When the units are to be solid grouted, minimum face shell and web thickness shall be not less than 5/8 in. (16 mm).
D. The minimum web thickness for units with webs closer than 1 in. (25.4 mm) apart shall be 3/4 in. (19.1 mm).
E. Equivalent web thickness does not apply to the portion of the unit to be filled with grout. The length of that portion shall be deducted from the overall length of the unit for the calculation of the equivalent web thickness.

Comparing ASTM C90 blocks and the disclosed interlocking construction blocks for a 1.2 m wall structure, four of the disclosed blocks have a larger cross-section area than three regular ASTM C90 blocks, which results in the disclosed blocks providing more than 10% more compression strength with the same mix and density. In addition, the four disclosed blocks would have more material than the three ASTM C90 blocks, but the amount of mortar needed to affix the ASTM C90 blocks would be greater than the material difference. As such, the disclosed blocks would require less overall material and would be lighter weight. A comparison of ASTM C90 blocks to the disclosed (GT) blocks is shown in shown in FIG. 81.

As shown above, the ground area that a 1.2 m wall structure comprising four of the disclosed blocks cover would be 0.18 m² (1.2 m long×0.15 m wide), while the area covered for the ASTM C90 blocks would be 0.2436 m² (1.2 m long×0.203 m wide). This results in more than 25% savings of ground area necessary to build a stronger wall structure.

In addition to the block configurations depicted in FIGS. 1-28, a wide range of auxiliary blocks can be manufactured in different lengths, widths, and densities depending on developer needs and local building code requirements.

Advantageously, the disclosed interlocking block system is a complete, integrated family of blocks that allow for a full connection for any wall in any direction. In addition, specialty blocks can be integrated depending on a builder's unique desires or needs. The disclosed block system use less overall material to manufacture and requires less total material in the wall because mortar is not required during assembly. The disclosed blocks are also lighter than traditional concrete blocks with mortar, which results in the entire wall being lighter, requiring less soil preparation and a less costly foundation. Because the disclosed blocks are self-aligning and interlocked in three axes, not only is mortar not required during assembly, but no adjustment of the blocks is required. Thus, the disclosed blocks do not require skilled labor, which reduces the number of labor hours and cost per man hour. And because the disclosed blocks are faster to construct and self-align, projects can be finished up to 75% more quickly. And compared to standard ASTM C90 CMU construction, structures made with the disclosed blocks are stronger and less costly to reinforce.

Modular Mold Sets for Manufacturing Interlocking Construction Blocks

The modular mold sets described in relation to FIGS. 29-47 below may be used to manufacture one or more of the interlocking construction blocks described in relations to FIGS. 1-28. In some embodiments, a mold set generally includes male mold part(s) and female mold part(s). In other words, the male mold and the female mold are parts or portions of the mold set. For example, the male mold may also be referring to the male part or the male portion of the mold set while the female mold may also be referring to the female part or the female portion of the mold set. Each of the male mold and the female mold can be modular in nature and collectively form the modular mold set.

Figure 29:
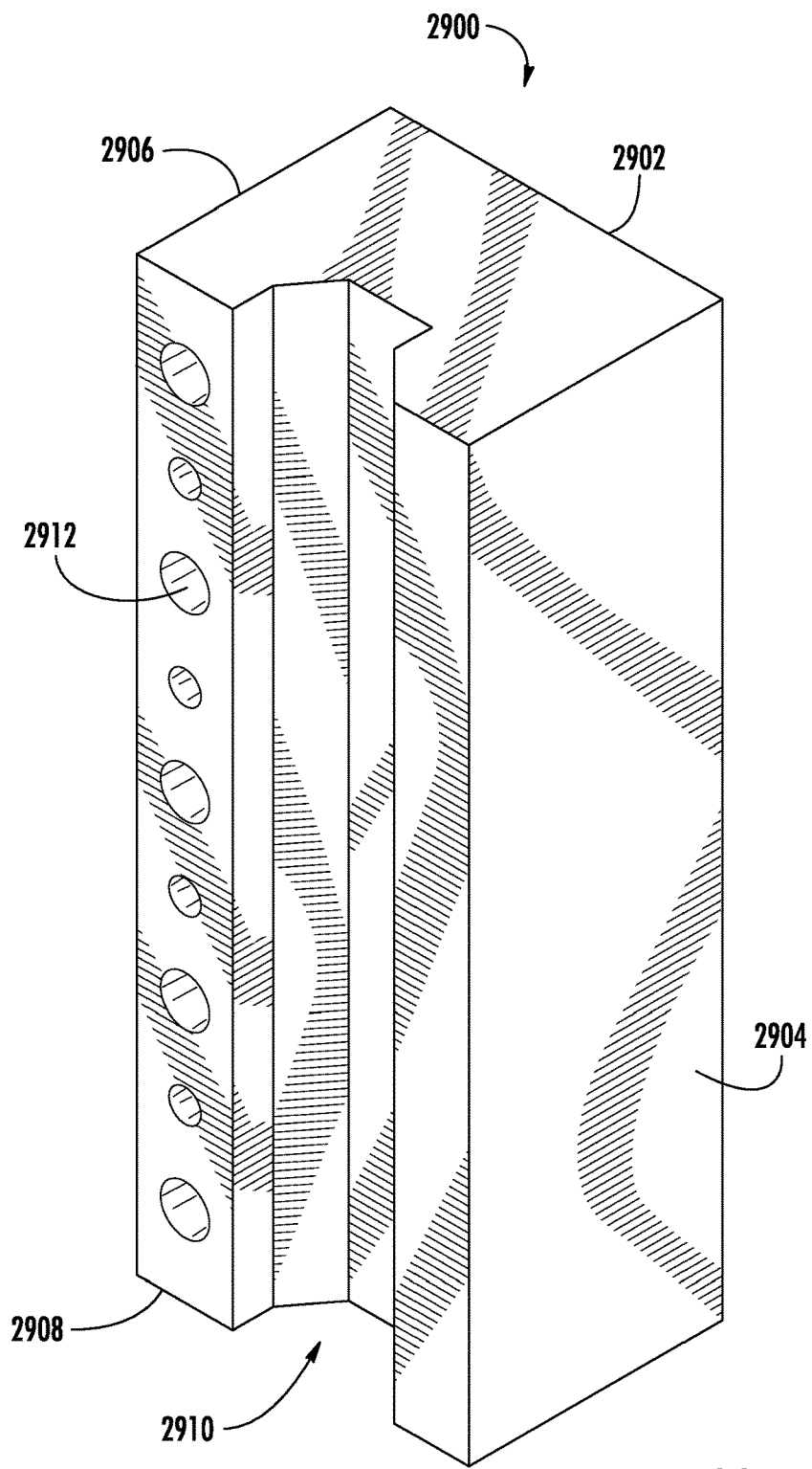
FIG. 29 depicts a perspective view of a first interlocking mold component, in accordance with one embodiment of the present disclosure.
Figure 30:
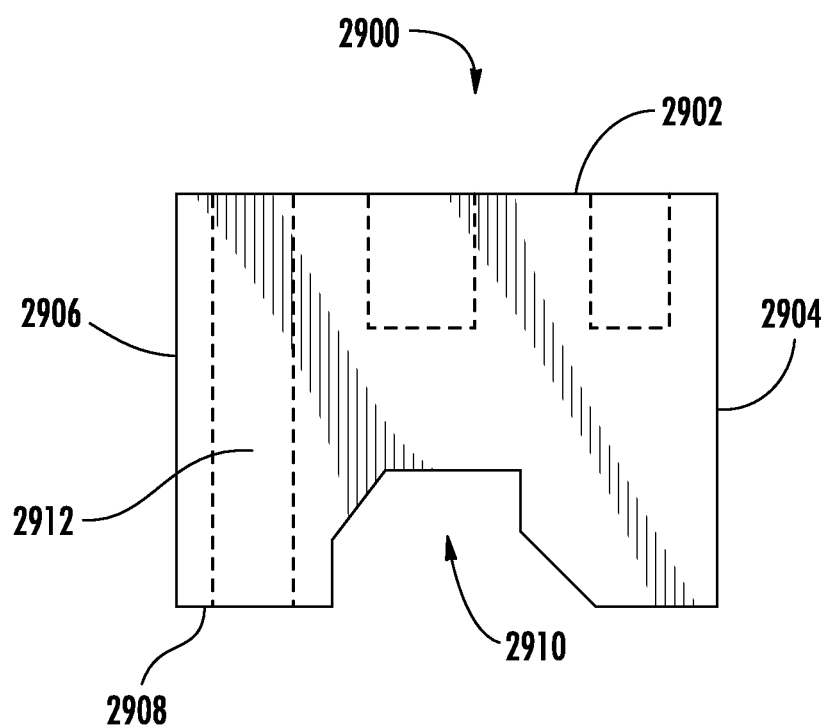
FIG. 30 depicts a top view of the first interlocking mold component of FIG. 29, in accordance with one embodiment of the present disclosure.

FIG. 29 depicts a perspective view and FIG. 30 depicts a top view of a first interlocking mold component 2900, in accordance with one embodiment of the present disclosure. For ease of reference, in several subsequent figures, the first interlocking mold component 2900 may also be labeled as "1."

As seen in FIG. 29, the first interlocking mold component 2900 may be a generally vertical mold and may comprise a rear wall 2902, opposing side walls 2904 and 2906, and a front wall 2908. The rear wall 2902 may define a flat surface that is operable to connect to a side connection wall of the female mold, as described below. The opposing side walls 2904 and 2906 may define flat surfaces parallel to each other and at right angles to the rear wall 2902. The front wall 2908 may also define a flat surface parallel to the rear wall 2902 and a geometric recess 2910 created within the front wall 2908. The geometric recess 2910 may be sized and shaped to form at least a portion of the second interlocking portion of an interlocking block that is created with the mold set.

The rear wall 2902 may comprise a plurality of apertures (not shown) spaced across the flat surface of the rear wall 2902. One or more of these apertures may extend across the first interlocking mold component 2900 from the rear wall 2902 to the front wall 2908, creating apertures 2912 as shown in FIG. 29. The plurality of apertures may be used to connect the first interlocking mold component 2900 to a second interlocking mold component and to a side connection wall of the female mold, as described below.

In an embodiment, the mold 2900 may have outer dimensions of approximately 80 mm by 65 mm, and more specifically, may have outer dimensions of approximately 82.5 mm by 63 mm. In an embodiment, the mold 2900 may weigh between 5 and 8 kilograms, and more specifically, may weigh approximately 7.34 kilograms.

Figure 31:
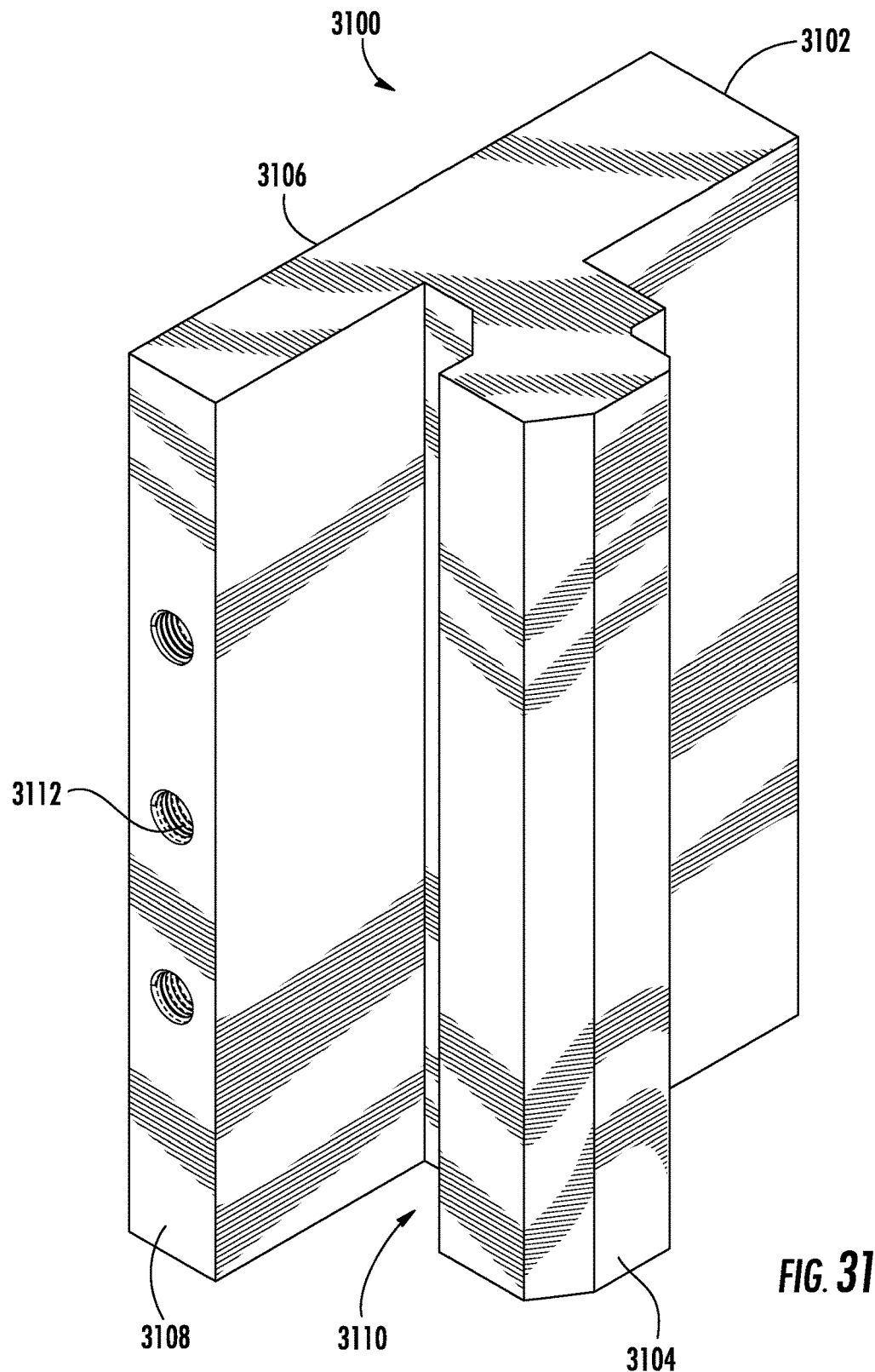
FIG. 31 depicts a perspective view of a second interlocking mold component, in accordance with one embodiment of the present disclosure.
Figure 32:
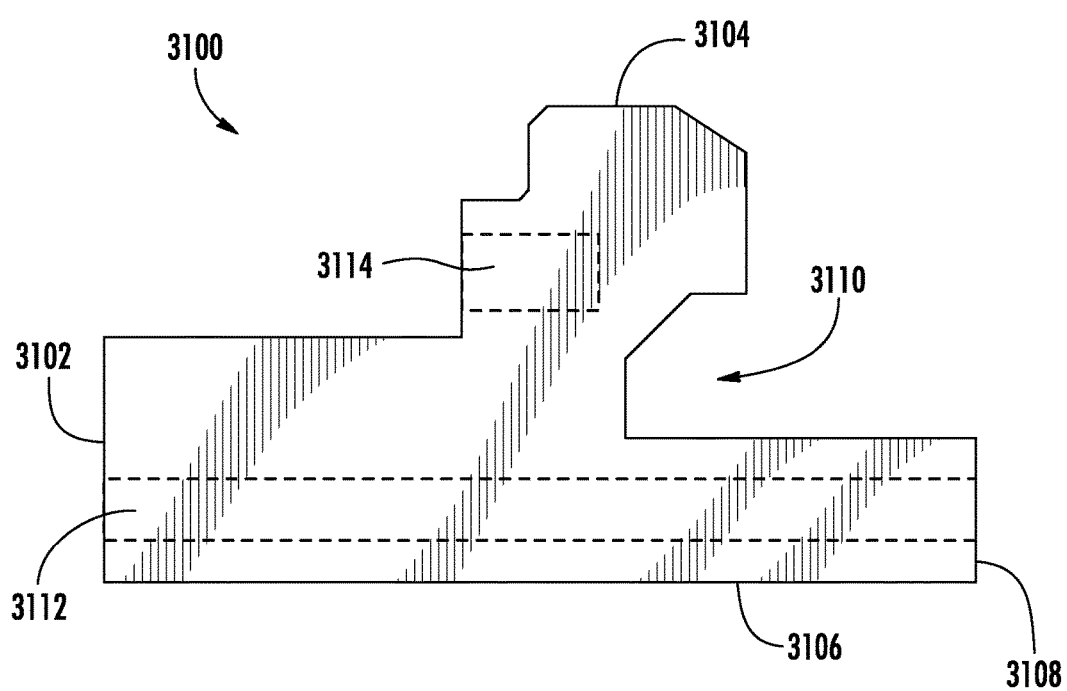
FIG. 32 depicts a top view of the second interlocking mold component of FIG. 31, in accordance with one embodiment of the present disclosure.

FIG. 31 depicts a perspective view and FIG. 32 depicts a top view of a second interlocking mold component 3100, in accordance with one embodiment of the present disclosure. For ease of reference, in several subsequent figures, the second interlocking mold component 3100 may also be labeled as "2." In addition, because the first interlocking mold component 2900 and the second interlocking mold component 3100 combine to create an interlocking section of an interlocking construction block, the relative terms of front, rear, and side walls will describe walls in the same orientation when the first interlocking mold component 2900 and the second interlocking mold component 3100 are connected to each other.

As seen in FIG. 31, the second interlocking mold component 3100 may be a generally vertical mold and may comprise a rear wall 3102, a side wall 3106, and a front wall 3108. The rear wall 3102 may define a flat surface that is operable to connect to a side connection wall of the female mold, as described below. The side wall 3106 may define a flat surface at a right angle to the rear wall 3102 and may be operable to form an end of the female mold, as described below. The front wall 2908 may also define a flat surface parallel to the rear wall 3102. The second interlocking mold component 3100 may further comprise a geometric protrusion 3104. The geometric protrusion 3104 may be sized and shaped to form a gap between the first and second interlocking portions of an interlocking block that is created with the mold set. A geometric recess 3110 may be sized and shaped to form a first interlocking portion catch of an interlocking block that is created with the mold set.

The rear wall 3102 may comprise a plurality of apertures 3112 that may extend across the second interlocking mold component 3100 from the rear wall 3102 to the front wall 3108, as shown in FIG. 31. The plurality of apertures 3112 may be used to connect the second interlocking mold component 3100 to a side connection wall of the female mold, as described below. Further, the geometric protrusion 3104 may comprise a plurality of apertures 3114 opposite the geometric recess 3110 that may extend within, but not through, the geometric protrusion 3104. These apertures 3114 may be used to connect the first interlocking mold component 2900 to the second interlocking mold component 3100.

In an embodiment, the mold 3100 may have outer dimensions of approximately 150 mm by 80 mm, and more specifically, may have outer dimensions of approximately 151 mm by 82.5 mm. In an embodiment, the mold 3100 may weigh between 10 and 12 kilograms, and more specifically, may weigh approximately 11.64 kilograms.

Figure 33A:
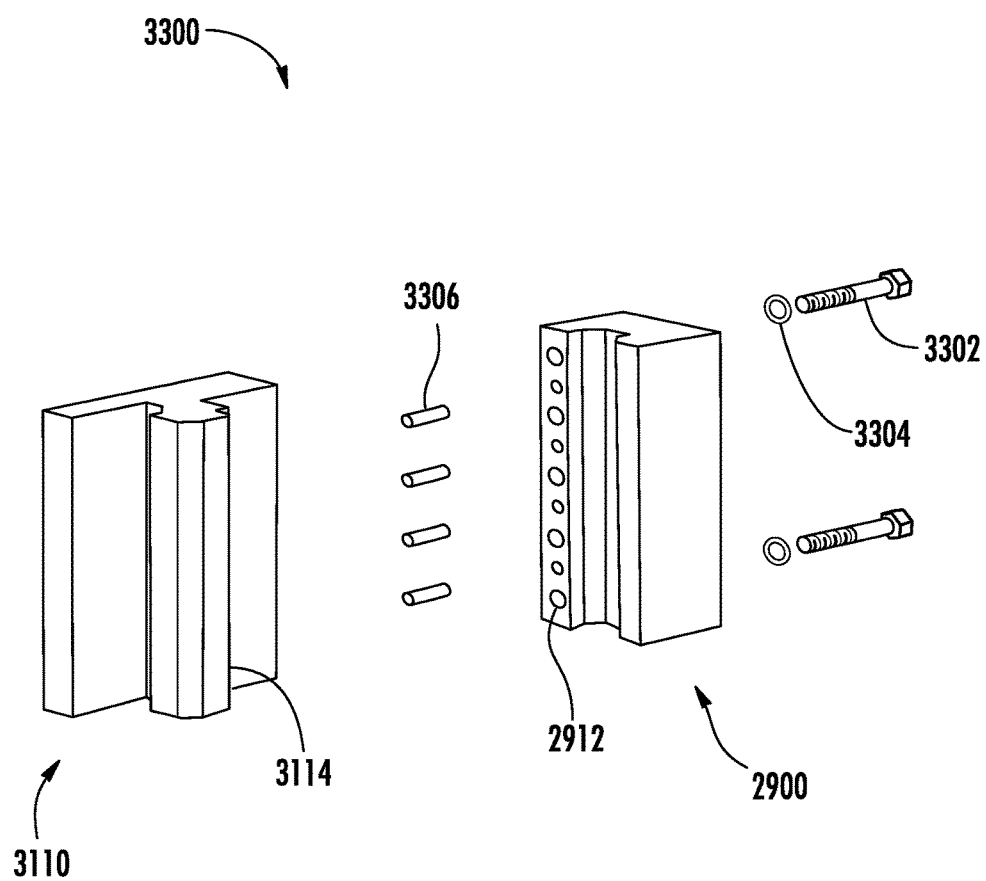
FIG. 33A depicts a breakaway perspective view of the first interlocking mold component of FIG. 29 connected to the second interlocking mold component of FIG. 31 to create a two-part interlocking section mold, in accordance with one embodiment of the present disclosure.
Figure 33B:
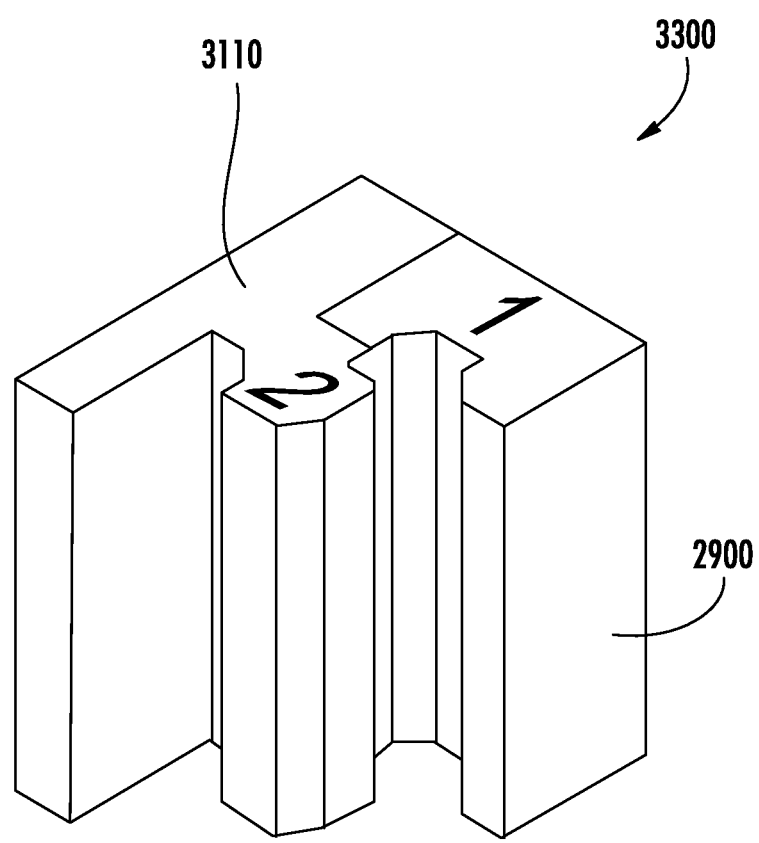
FIG. 33B depicts a connected view of the first interlocking mold component of FIG. 29 connected to the second interlocking mold component of FIG. 31 to create a two-part interlocking section mold, in accordance with one embodiment of the present disclosure.

FIG. 33A depicts a breakaway perspective view and FIG. 33B depicts a connected view of the first interlocking mold component of FIG. 29 connected to the second interlocking mold component of FIG. 31 to create a two-part interlocking section mold 3300, in accordance with one embodiment of the present disclosure.

When the apertures 2912 of the first interlocking mold component 2900 and the apertures 3114 of the second interlocking mold component 3100 are aligned, threaded bolts 3302 may be inserted through washers 3304 and threaded into the apertures 2912 of the first interlocking mold component 2900 and then threaded into the apertures 3114 of the second interlocking mold component 3100. Once connected, the two-part mold 3300 may be used to create an interlocking section of an interlocking construction block. This two-part mold 3300 using molds 1 and 2 may be used to create the interlocking section for molds for any shape and size of interlocking construction block by using a combination of two-part molds, connecting side walls, and connecting end walls.

Figure 34:
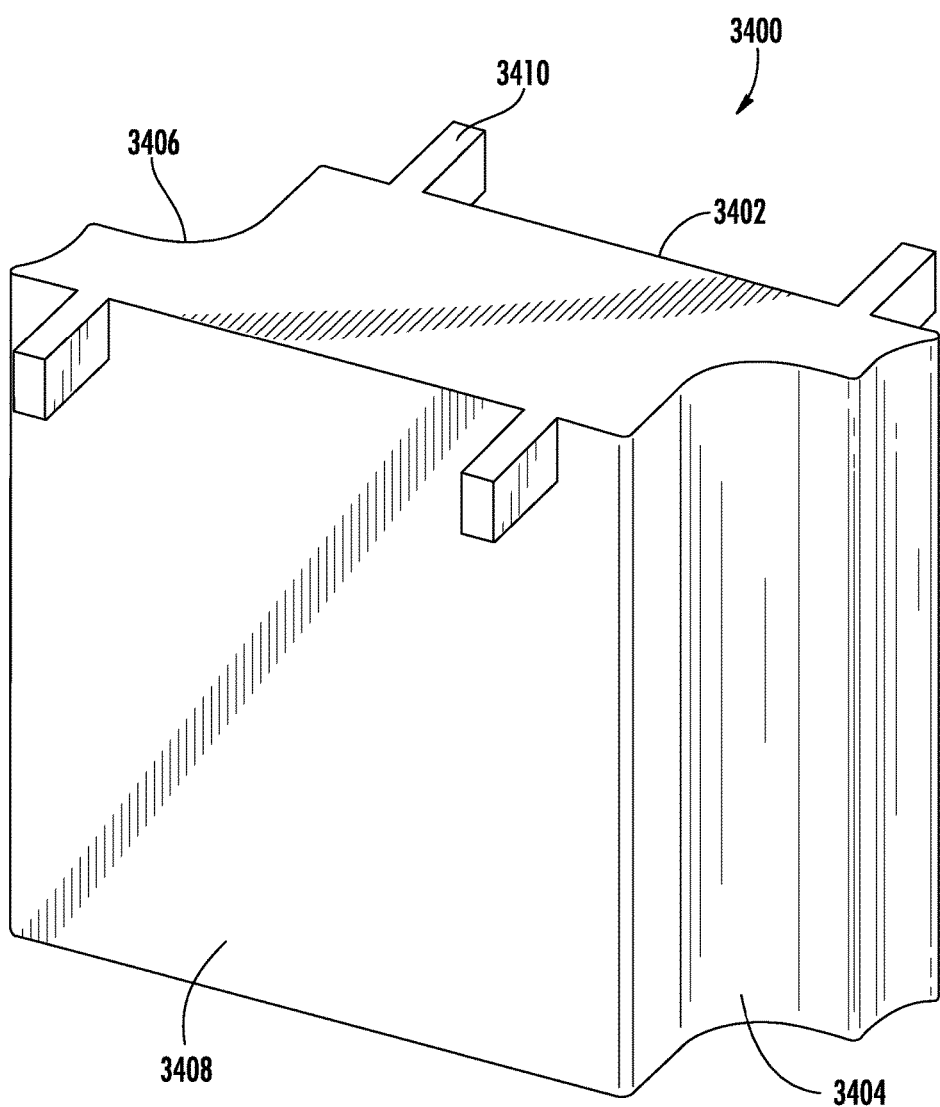
FIG. 34 depicts a perspective view of a central core of mold cavity defining mold component, in accordance with one embodiment of the present disclosure.

FIG. 34 depicts a perspective view of a central core of mold cavity defining mold component 3400, in accordance with one embodiment of the present disclosure. In some embodiments, a central core of mold cavity defining mold component 3400 may be desired in order to create a negative space in the center of an interlocking construction block, which decreases the weight of and the overall material necessary to form the interlocking construction block. The central core of mold cavity defining mold component 3400 may be made in any shape that is the desired shape of the central cavity of the interlocking construction block. The central core of mold cavity defining mold component 3400 may comprise a rear wall 3402, geometric side walls 3404 and 3406, and a front wall 3408. The rear wall 3402 and the front wall 3408 may be flat surfaces, while the geometric side walls 3404 and 3406 may be shaped to generally mirror the shape of the interlocking section features of the two-part mold 3300 of FIG. 33. In an embodiment, the central core of mold cavity defining mold component 3400 may be shaped to additionally include sections that correspond to the shape of the two-part mold 3300 of FIG. 33B. The central core of mold cavity defining mold component 3400 may further comprise one or more tabs 3410 extending from an upper surface of the rear wall 3402 and the front wall 3408. The one or more tab 3410 may be used to hold the central core of mold cavity defining mold component 3400 relative to connecting side walls of the female mold, as described below.

Figure 35:
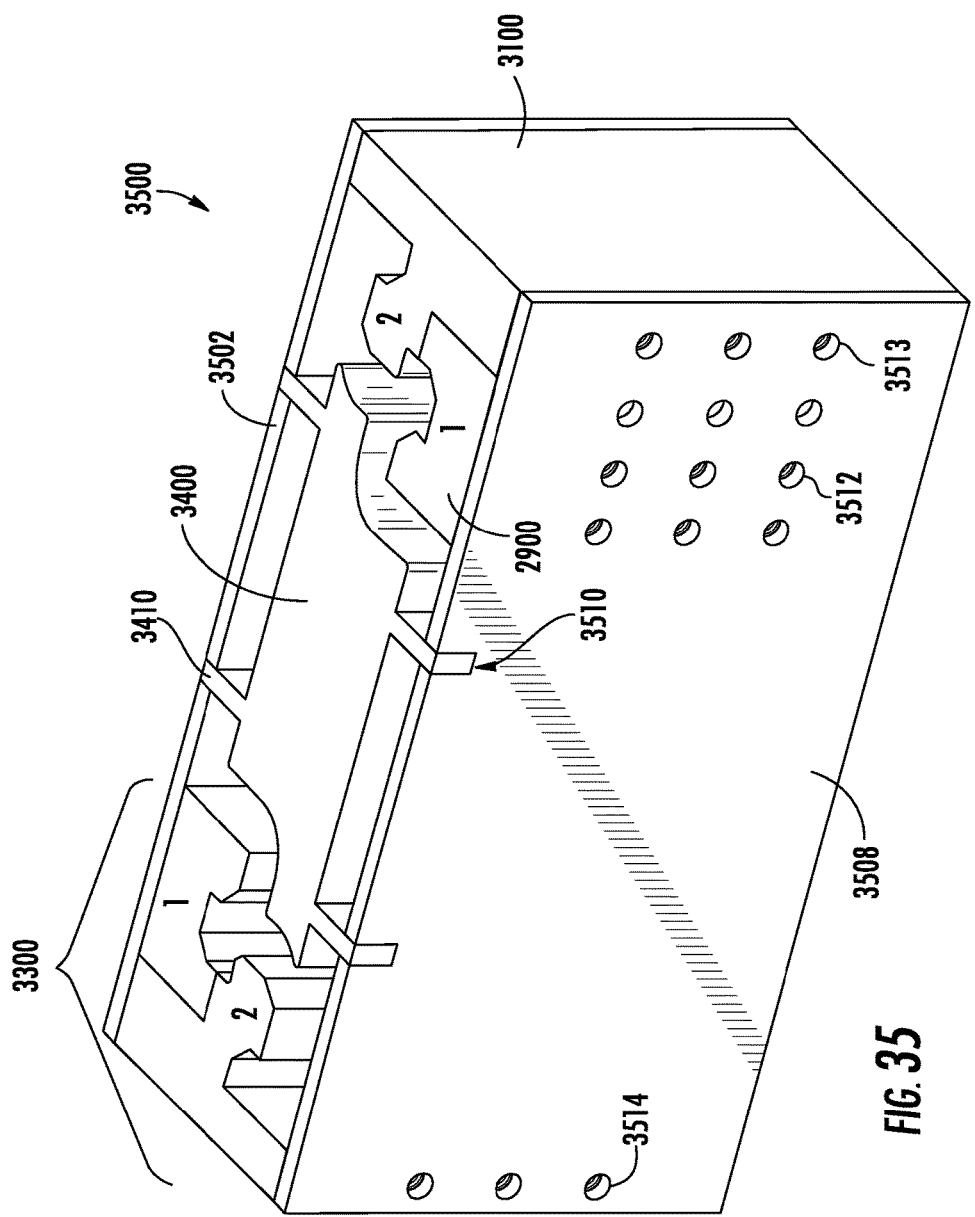
FIG. 35 depicts a perspective view of an assembled female mold with central core, in accordance with one embodiment of the present disclosure.

FIG. 35 depicts a perspective view of an assembled female mold 3500, in accordance with one embodiment of the present disclosure. The depicted female mold 3500 may be use to form an interlocking stretcher construction block, but as seen in FIGS. 38-41 below, various shapes and sizes of female molds may be used to form different sizes and shapes of interlocking construction blocks.

The assembled female mold 3500 comprises two of the two-part molds 3300 of FIG. 33, each comprising a first interlocking mold component 2900 and a second interlocking mold component 3100. The two two-part molds 3300 may be connected to each other with rear connecting side wall 3502 and front connecting side wall 2508. The side walls of the second interlocking mold components 3100 may form the end walls of the assembled female mold 3500 while the end walls of the first interlocking mold components 2900 and second interlocking mold components 3100 may be connected to the first and second connecting side walls 2502 and 2508 with threaded bolts (not shown) through apertures 3512, 3513, and 3514.

Apertures 3513 and 3514 may be a plurality of apertures each aligned in a vertical orientation along the vertical edges of the first and second connecting side walls 2502 and 2508, while apertures 3512 may be a plurality of apertures in a grid-like pattern proximate to the vertical apertures 3513. The location of each of the apertures allows the connecting side walls 2502 and 2508 to be used to make a wide variety of shapes and sizes of interlocking construction blocks without requiring specific connecting sides, thereby increasing the modularity of the mold sets.

For example, threaded bolts may be threaded through apertures 3512 in the connecting side walls 2502 and 2508, threaded into the apertures 2912 of the first interlocking mold component 2900 and then threaded into the apertures 3114 of the second interlocking mold component 3100, as described in FIG. 33, connecting the connecting side walls 2502 and 2508 to the first interlocking mold components 2900 and the second interlocking mold components 3100. To further strengthen the assembled female mold 3500, threaded bolts (not shown) may also be threaded through apertures 3513 and 3514 and into apertures 3112 of the second interlocking mold components 3100.

The connecting side walls 2502 and 2508 may further comprise one or more notches 3510 along upper horizontal edges of the connecting side walls. These notches 3510 may be sized and shaped to interact with the tabs 3410 of the central core of mold cavity defining mold component 3400.

If a central cavity is desired in the resulting manufactured interlocking construction block, the central core of mold cavity defining mold component 3400 may be used. In an embodiment, the central core of mold cavity defining mold component 3400 is removable and may be inserted into the center cavity of the female mold 3500. The one or more tabs 3410 of the central core of mold cavity defining mold component 3400 may rest in the one or more notches 3510 of the connecting side walls 3502 and 3508. In a different embodiment, the central core of mold cavity defining mold component 3400 may be a unitary part of the female mold 3500 and the one or more tabs 3410 of the central core of mold cavity defining mold component 3400 may rest in the one or more notches 3510 of the connecting side walls 3502 and 3508, if necessary.

Because the tabs 3410 may be necessary to connect the central core of mold cavity defining mold component 3400 to the connecting side walls 3502 and 3508, the overall height of the female mold 3500 may be greater than the desired finished height of the interlocking construction block to account for the height of the tabs 3410, preventing any indentations from the tabs 3410 from being molded into the interlocking construction block.

When assembled, the female mold 3500 comprises both positive space comprising each of the elements of the female mold 3500 and negative space comprising open areas, allowing material to be poured into the negative spaces of the female mold 3500 in order to manufacture an interlocking construction block within the female mold 3500.

Figure 36:
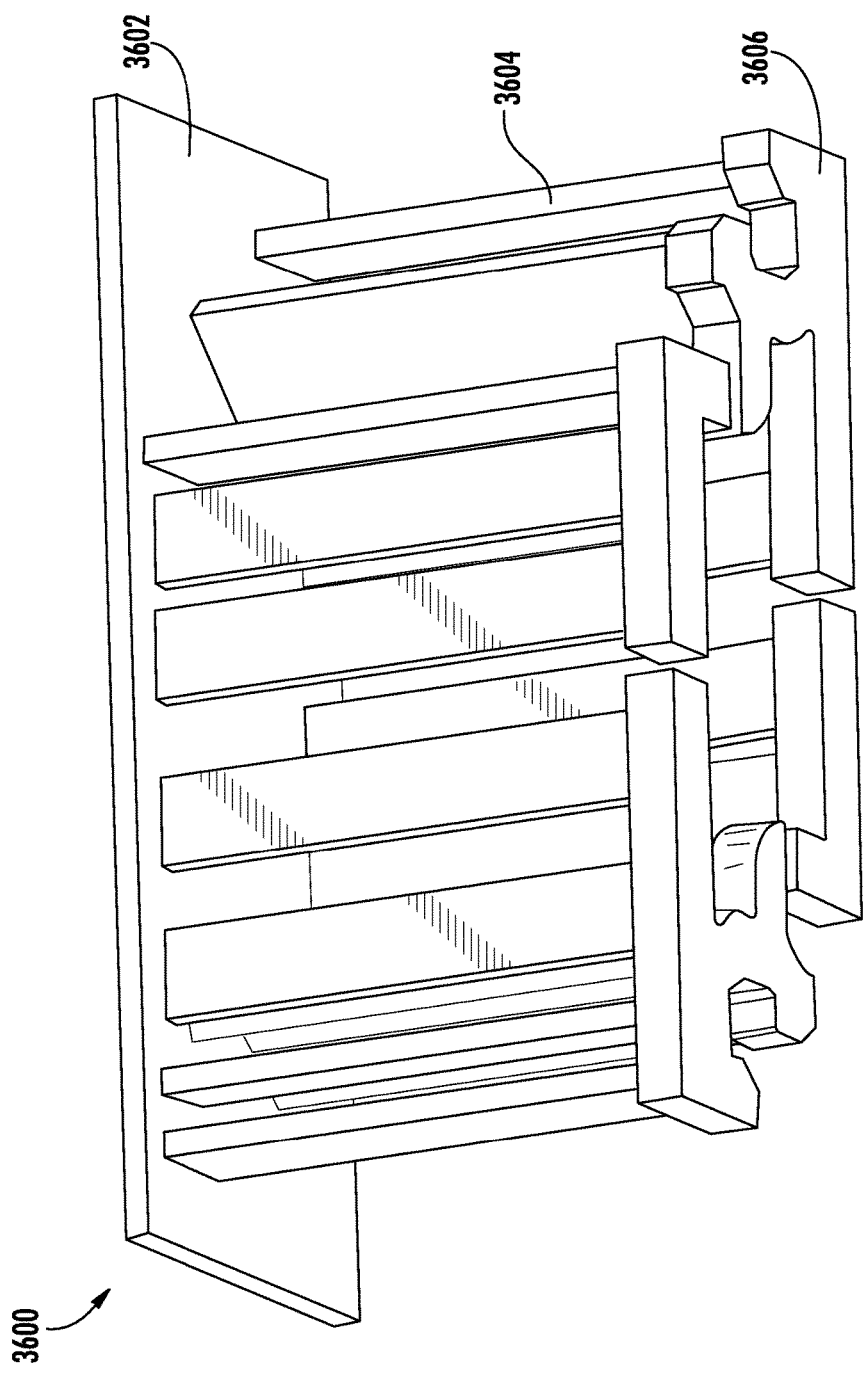
FIG. 36 depicts a perspective view of a male mold corresponding to the assembled female mold of FIG. 35, in accordance with one embodiment of the present disclosure.

FIG. 36 depicts a perspective view of a male mold 3600 corresponding to the assembled female mold 3500 of FIG. 35, in accordance with one embodiment of the present disclosure. The male mold 3600 may comprise a flat top 3602 and a plurality of vertical pillars 3604 extending downwards from the underside of the flat top 3602. The pillars may end opposite the flat top 3602 with a plurality of plungers 3606. The plurality of plungers 3606 may be sized and shaped to correspond to the negative space of the female mold 3500. The plurality of plungers 3606 may be arranged to slide around the tabs 3410 if the central core of mold cavity defining mold component 3400 is desired in order to decrease the overall weight of the interlocking construction block.

Figure 49:
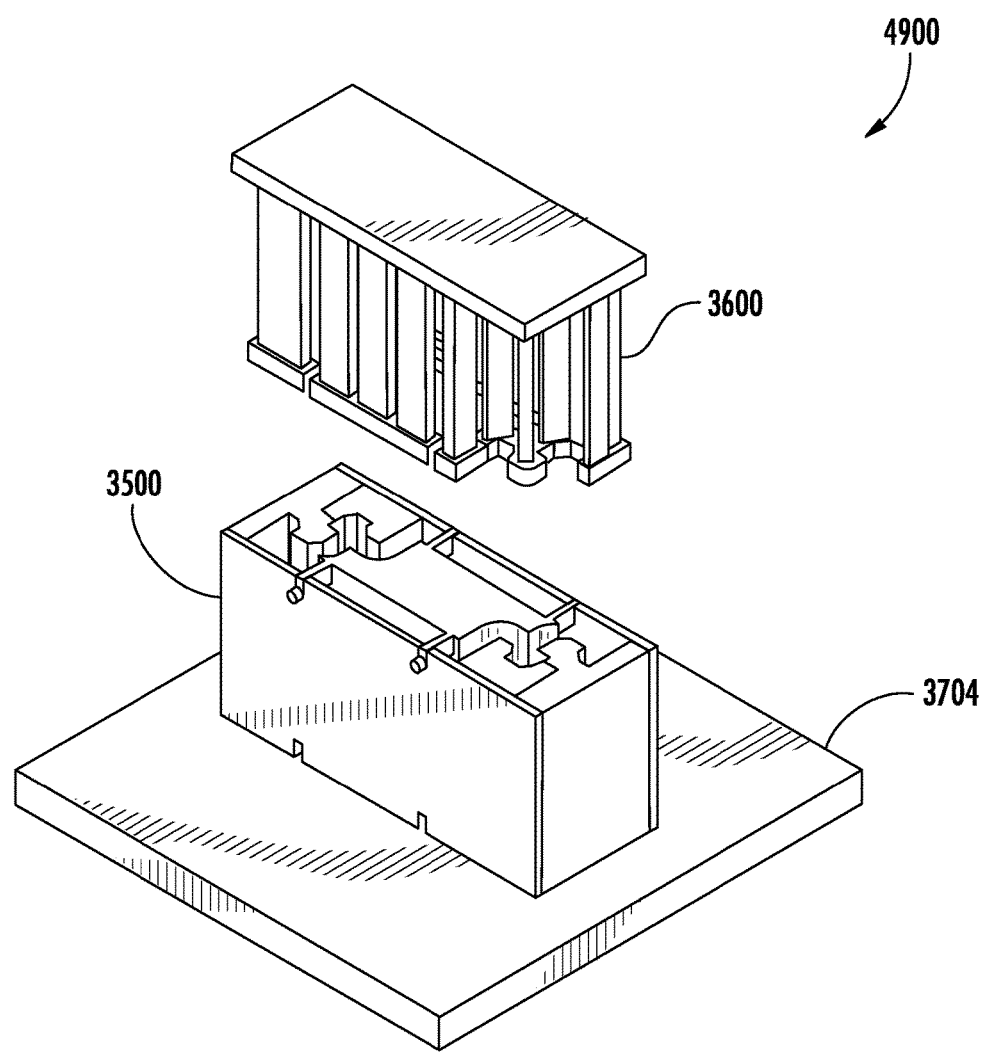
FIG. 49 depicts an exploded view of the female mold of FIG. 35 and the male mold of FIG. 36, in accordance with one embodiment of the present disclosure.
Figure 50:
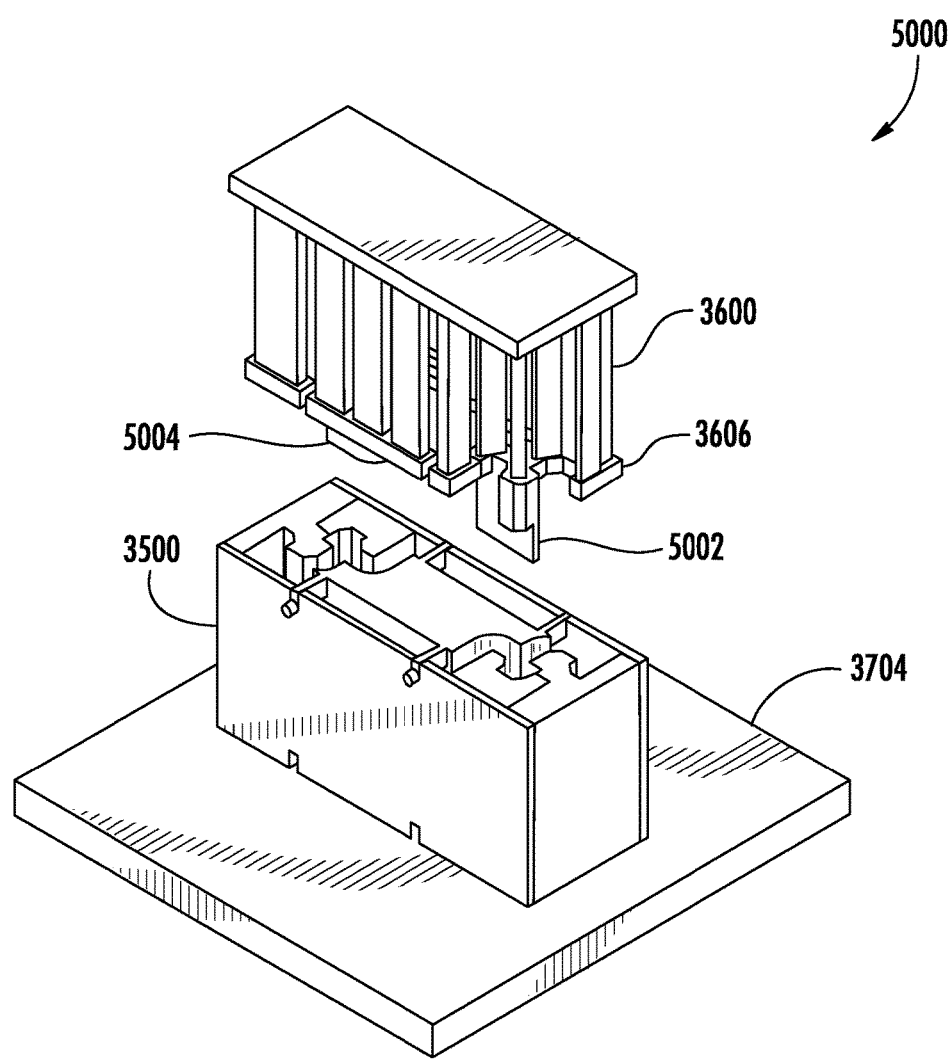
FIG. 50 depicts an exploded view of the female mold of FIG. 35 and the male mold of FIG. 36 for manufacturing an interlocking construction block with a top channel, in accordance with one embodiment of the present disclosure.
Figure 51:
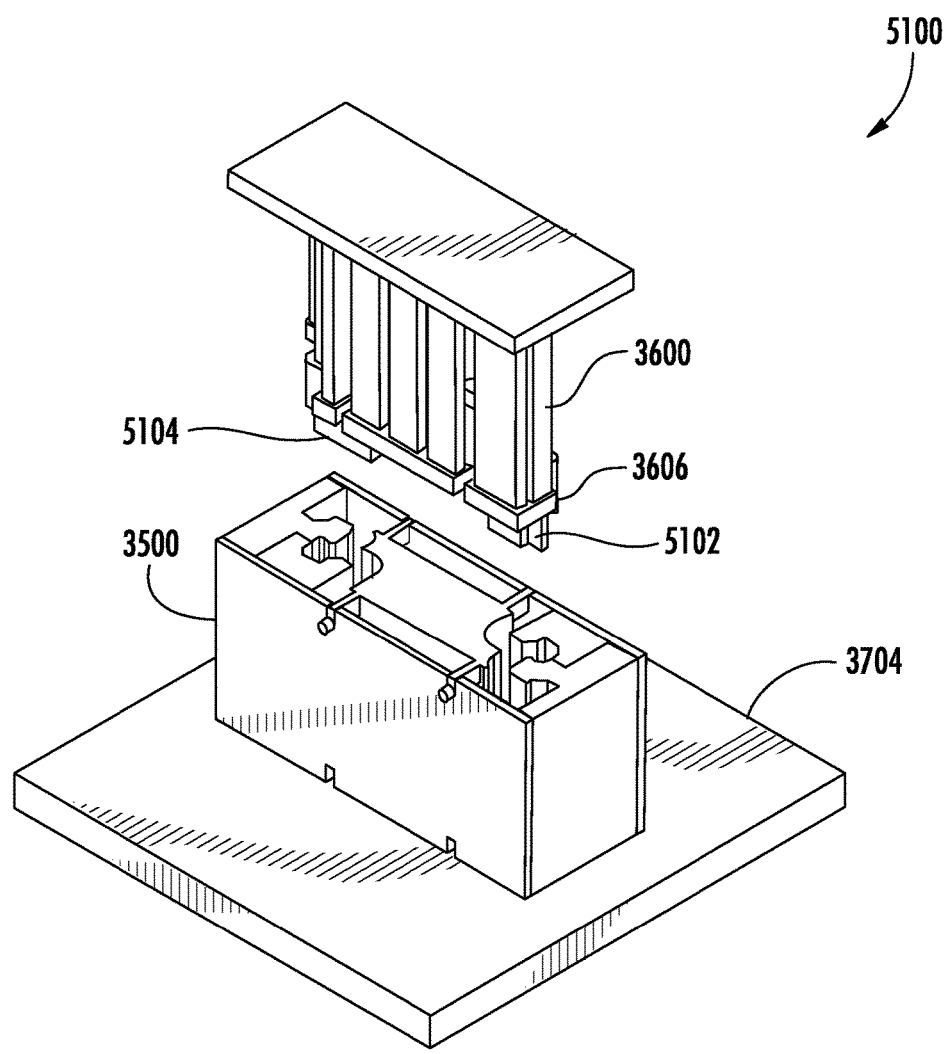
FIG. 51 depicts an exploded view of the female mold of FIG. 35 and the male mold of FIG. 36 for manufacturing an interlocking construction block with a bottom channel, in accordance with one embodiment of the present disclosure.

In FIGS. 49-51, below, the setup relationship for manufacturing an interlocking construction block, an interlocking construction block with a top channel, and an interlocking construction block with a bottom channel are described. In FIGS. 37A-I, the method for manufacturing an interlocking construction block is described.

FIG. 49 depicts an exploded view of the female mold 3500 of FIG. 35 and the male mold 3600 of FIG. 36 for manufacturing a solid interlocking construction block, in accordance with one embodiment of the present disclosure. In the embodiment, the female mold 3500 is placed upside down on a large, flat surface 3704, such that the male mold 3600 may be received within the negative space of the female mold 3500. In this configuration, the male mold 3600 may push the resulting interlocking construction block out of the female mold 3500 from the bottom first.

FIG. 50 depicts an exploded view of the female mold 3500 of FIG. 35 and the male mold 3600 of FIG. 36 for manufacturing an interlocking construction block with a top channel, as described in FIGS. 9-21, in accordance with one embodiment of the present disclosure. In the embodiment, the female mold 3500 is placed upside down on the large, flat surface 3704, such that the male mold 3600 may be received within the negative space of the female mold 3500. The male mold 3600 may additionally comprise one or more extended plungers 5002 and 5004 that extend below the plungers 3606. The extended plungers 5002 and 5004 may be shaped and sized to form the top channel in the resulting interlocking construction block by reducing the size of the negative space of the female mold 3500. In this configuration, the male mold 3600 may push the resulting interlocking construction block out of the female mold 3500 from the bottom first.

FIG. 51 depicts an exploded view of the female mold 3500 of FIG. 35 and the male mold 3600 of FIG. 36 for manufacturing an interlocking construction block with a bottom channel, as described in FIGS. 9-21, in accordance with one embodiment of the present disclosure. In the embodiment, the female mold 3500 is placed right side up on the large, flat surface 3704, such that the male mold 3600 may be received within the negative space of the female mold 3500. The male mold 3600 may additionally comprise one or more extended plungers 5002 and 5004 that extend below the plungers 3606. The extended plungers 5002 and 5004 may be shaped and sized to form the bottom channel in the resulting interlocking construction block by reducing the size of the negative space of the female mold 3500. In this configuration, the male mold 3600 may push the resulting interlocking construction block out of the female mold 3500 from the top first.

FIGS. 37A-I depict a method 3700 for manufacturing an interlocking construction block with the female mold 3500 of FIG. 35 and the male mold 3600 of FIG. 36, in accordance with one embodiment of the present disclosure.

Figure 37A:
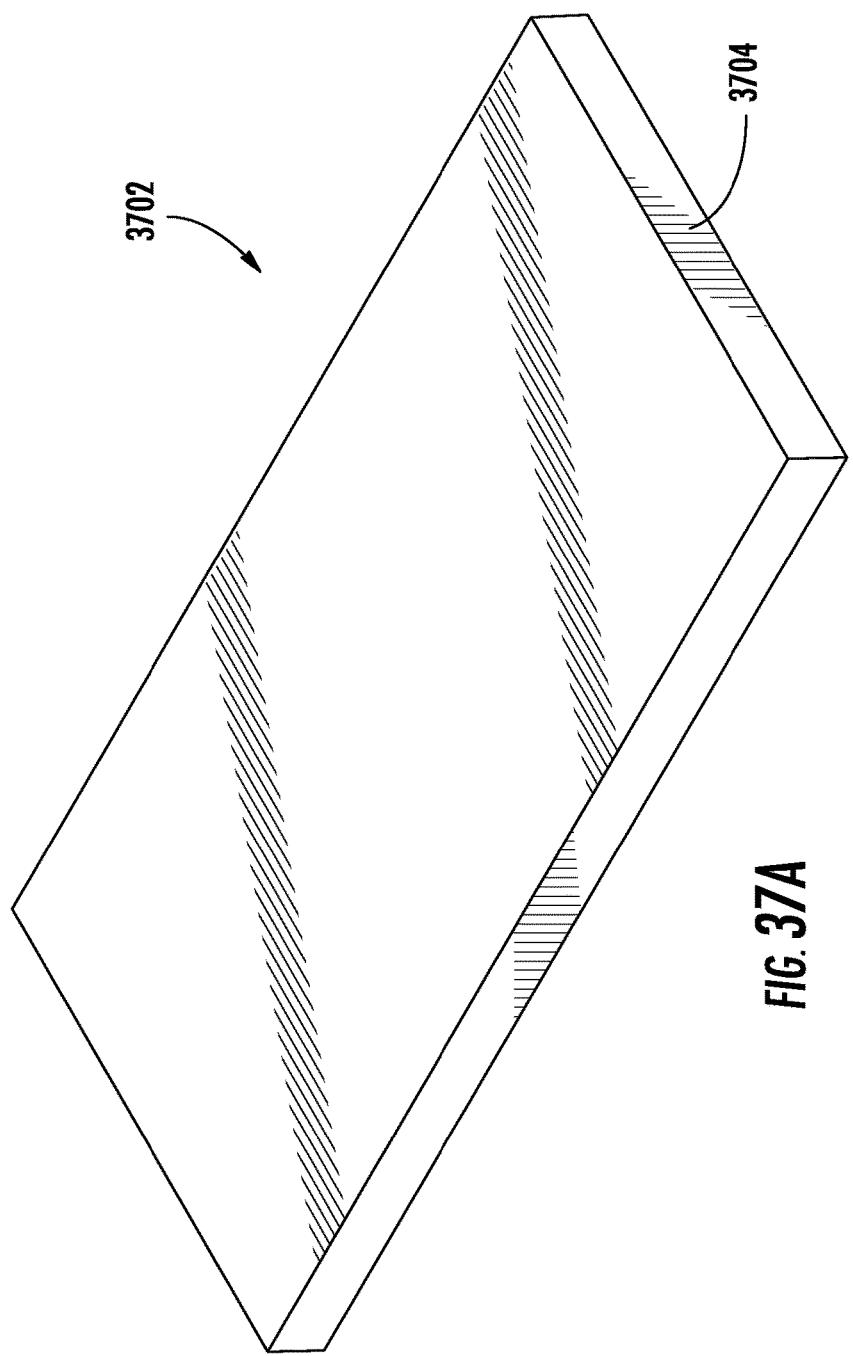
FIGS. 37A-I depict a method for manufacturing an interlocking construction block with the female mold of FIG. 35 and the male mold of FIG. 36, in accordance with one embodiment of the present disclosure.

As shown in FIG. 37A, at step 3702, the large, flat surface 3704 may be provided. This surface 3704 should be larger than the desired size of the interlocking construction block and should be made of a material such that when the interlocking construction block material is poured into the mold, it does to bond to the surface 3704. In an embodiment, the surface 3704 is made of wood, although it could also be made of plastics.

Figure 37B:
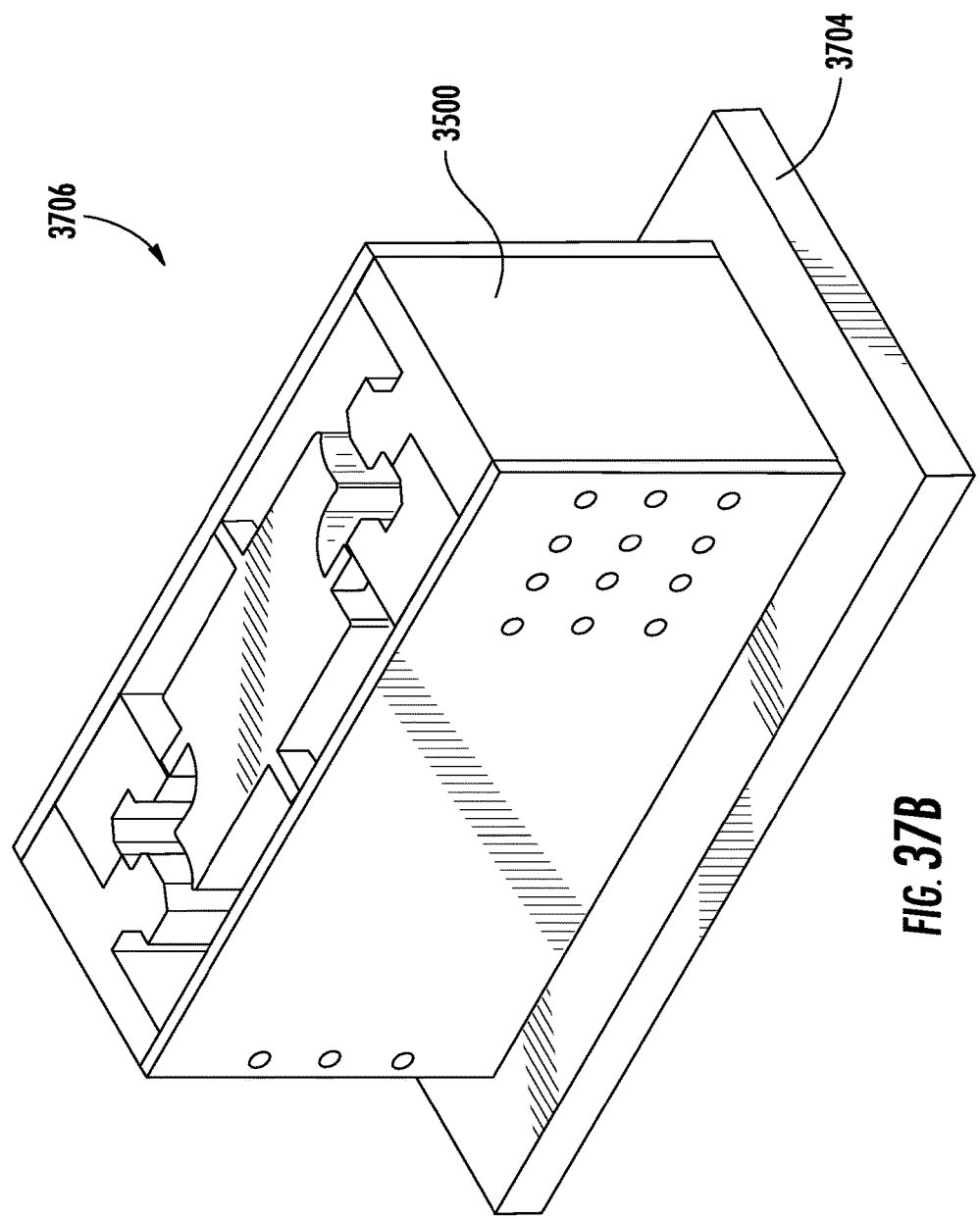

As shown in FIG. 37B, at step 3706, the assembled female mold 3500 of FIG. 35 is placed on top of the large, flat surface 3704. The female mold 3500 may be positioned with the tabs 3400 of the central core of mold cavity defining mold component 3400 up. As described in FIGS. 49 and 50, if a block without channels or a block with top channels is desired, the female mold 3500 may be positioned upside down such that the top of the block will form proximate to the flat surface 3704, while if a block with bottom channels is desired, the female mold 3500 may be positioned right side up such that the bottom of the block with form proximate to the flat surface 3704.

In an embodiment, the internal mesh cage 4700 of FIG. 47 may be inserted into the center cavity of the female mold 3500 to reinforce the interlocking block during the mold process. The internal mesh cage 4700 may be shaped and placed proximate to the outer perimeter of the interlocking block and may be made from steel mesh, carbon fiber, or any other material suitable for providing reinforcement to the interlocking block.

Figure 37C:
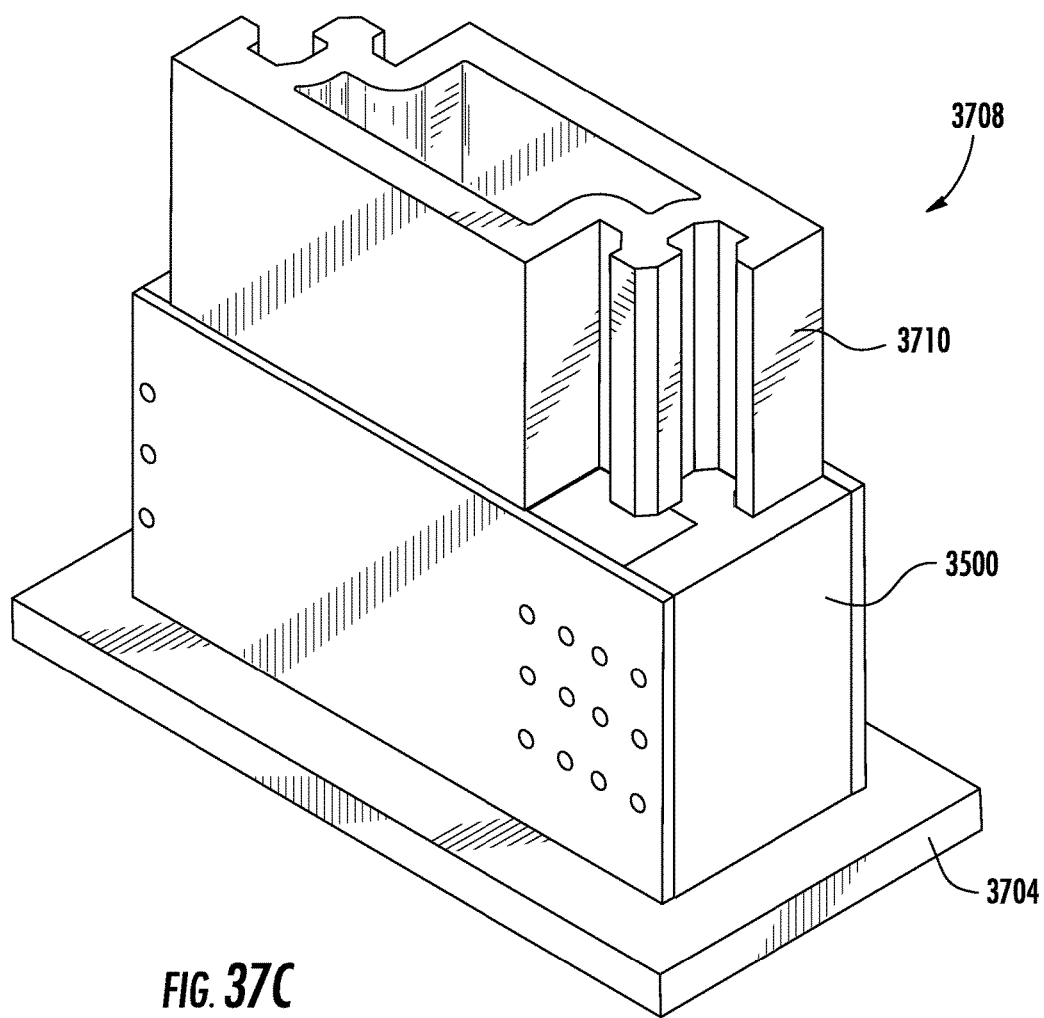

As shown in FIG. 37C, at step 3708, the interlocking construction block raw material 3710 may be poured into the central cavity of the female mold 3500. The raw material 3710 may be a fluid cement, mortar, sand, water, or plastic mixture that hardens over time. This characteristic allows the raw material 3710 to be poured into and formed in the female mold 3500.

Figure 37D:
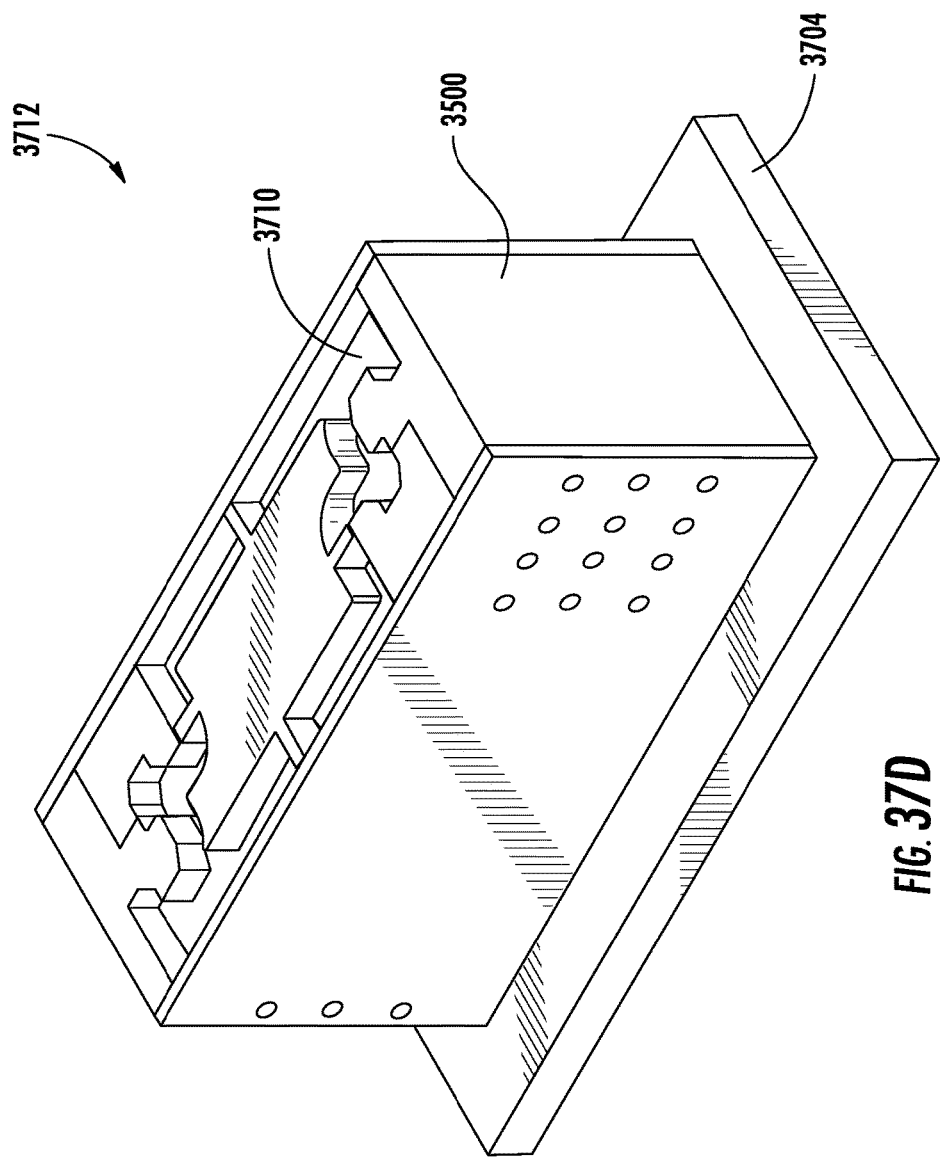

As shown in FIG. 37D, at step 3712, the raw material 3710 has settled into the female mold 3500 on top of the surface 3704. As shown here, the overall height of the female mold 3500 is greater than the height of the poured raw material 3710 so that the raw material 3710 is below the tabs. This also allows space for the plungers of the male mold 3600 to mate within the negative space of the female mold 3500.

Figure 37E:
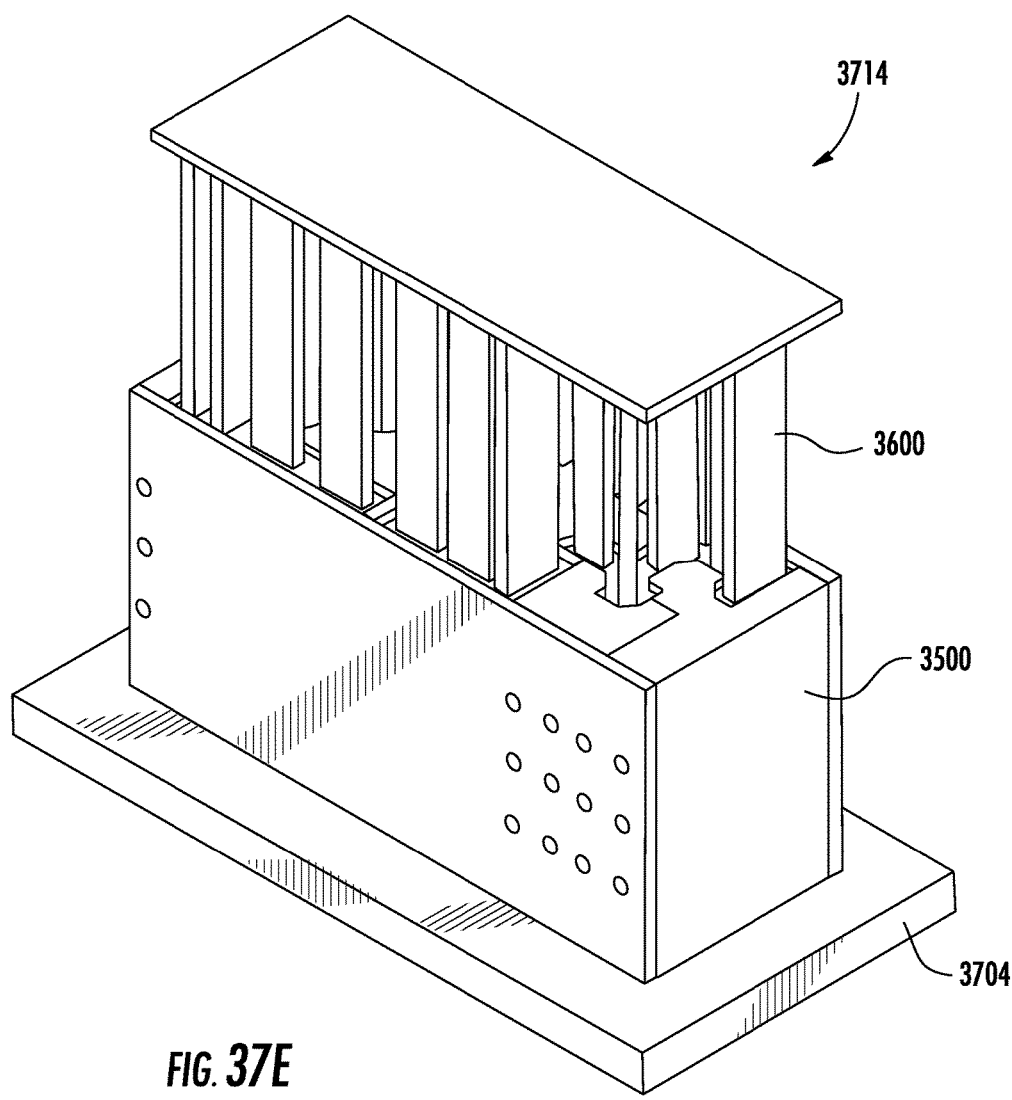

As shown in FIG. 37E, at step 3714, the male mold 3600 is placed over the female mold 3500 and the plungers 3606 are inserted into the negative space of the female mold 3500. By this time, the raw material 3710 may have been allowed to set for a predetermined amount of time, beginning the transformation from fluid cement to solid concrete. Once the raw material 3710 has hardened enough to maintain the form of the interlocking construction block, the molds may be removed from the block. As described in FIGS. 50 and 51, if a block with channels is desired, the male mold 3600 may comprise extended plungers 5002, 5004, 5102, and/or 5104 that reduce the size of the negative space of the female mold 3500.

Figure 37F:
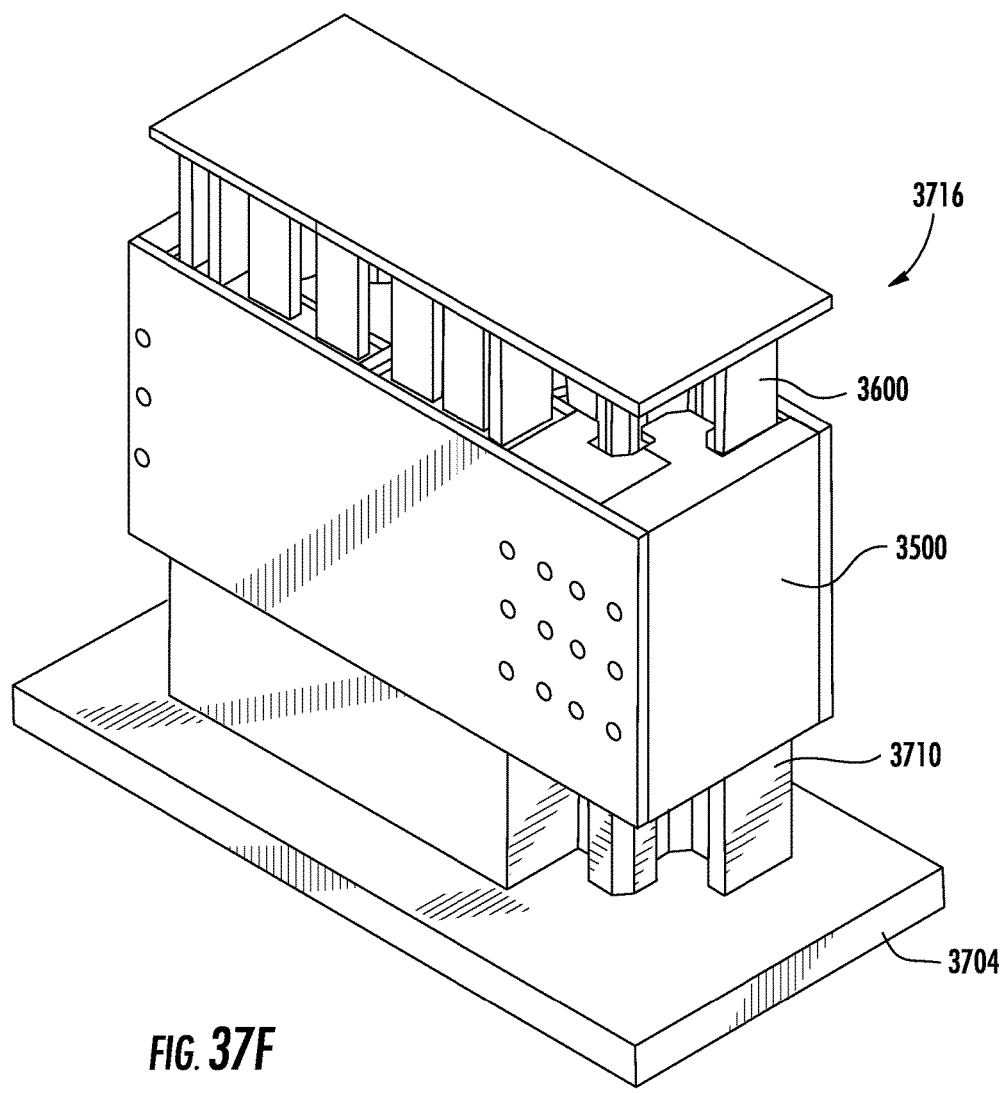

As shown in FIG. 37F, at step 3716, the female mold 3500 is moved upwards towards the male mold 3600. During this step, the female mold 3500 is moved around the plungers of the male mold 3600 while the interlocking construction block 3710 remains on the flat surface 3704.

Figure 37G:
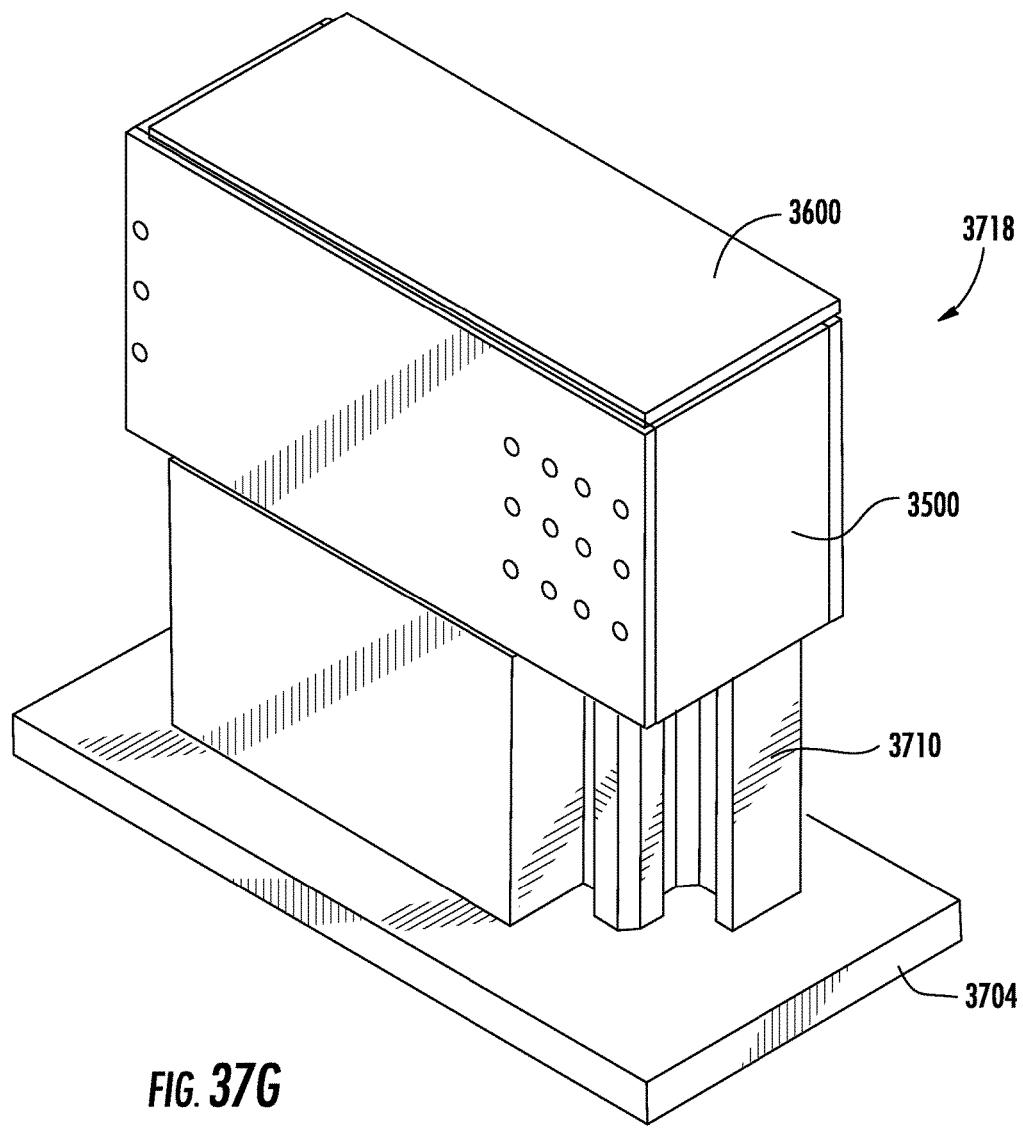

As shown in FIG. 37G, at step 3718, the female mold 3500 is moved further upwards around the male mold 3600.

Figure 37H:
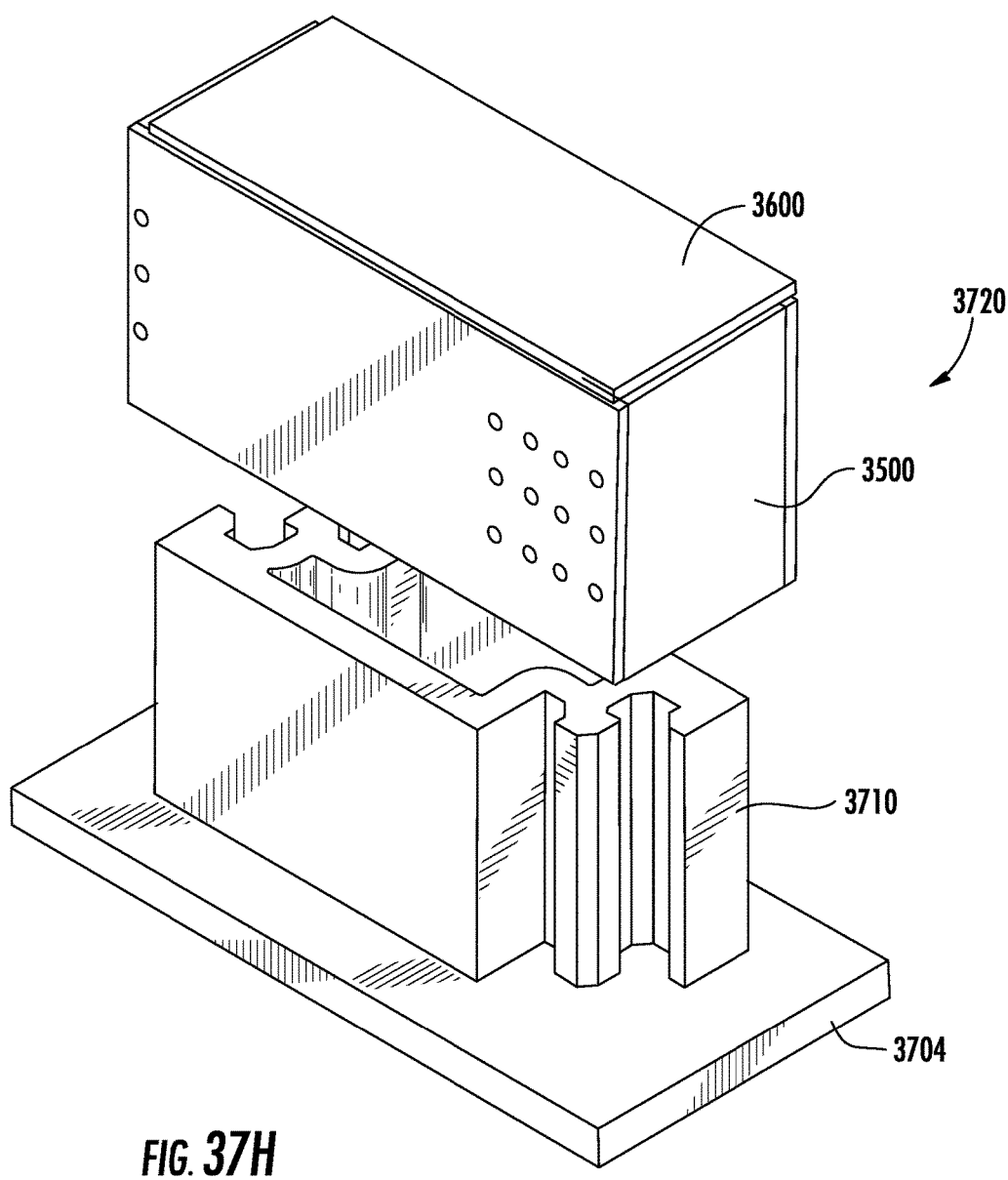

As shown in FIG. 37H, at step 3720, the female mold 3500 has been moved fully upwards around the male mold 3600 and the molds 3500 and 3600 have been removed from the interlocking construction block 3710, which is shaped and sized according to the female mold 3500.

Figure 37I:
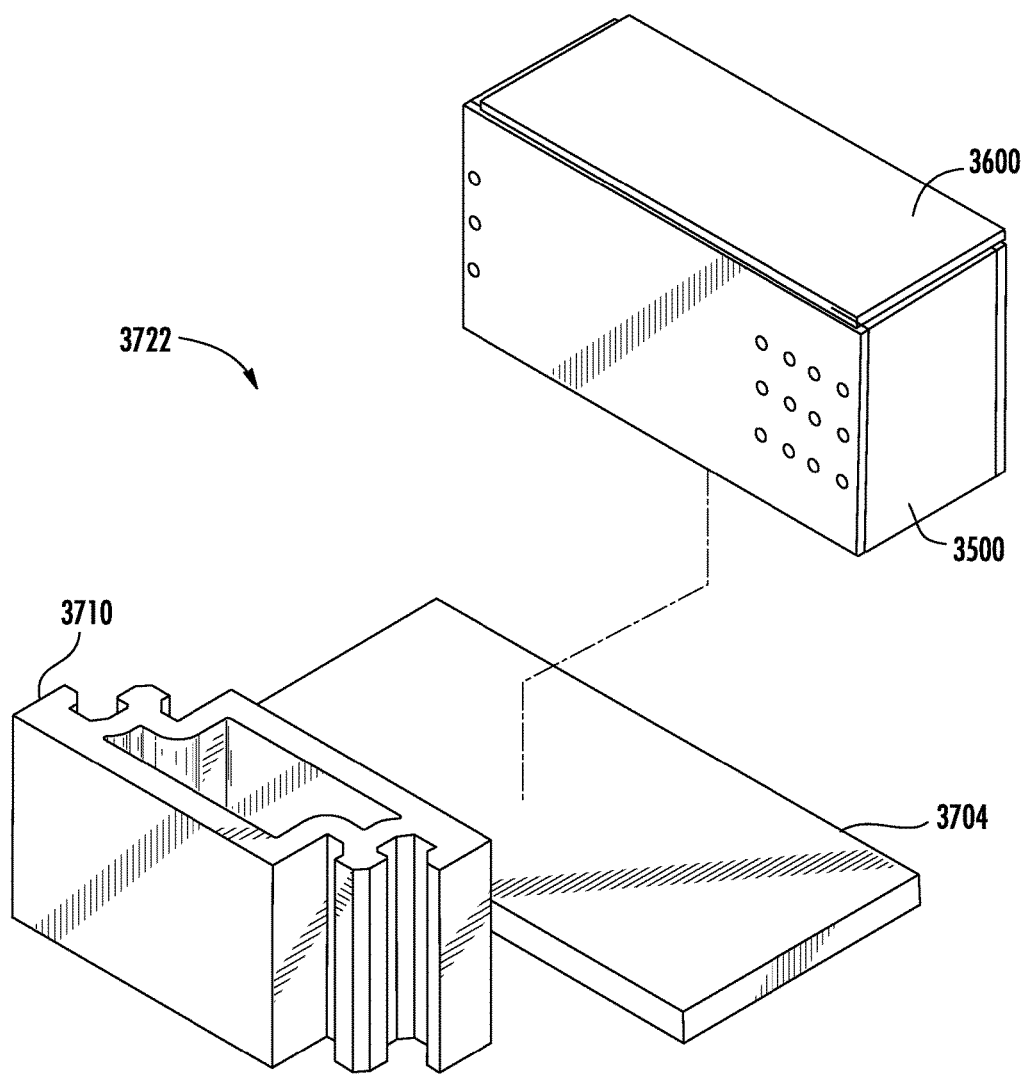

As shown in FIG. 37I, at step 3722, the finished interlocking construction block 3701 is removed from the flat surface 3704.

The assembled female molds described in relation to FIGS. 38-42 below correspond with the interlocking construction blocks described above and are all modular so that they can be made with a standard mold set comprising one or more molds 2900, one or more molds 3100, and two or more connecting side wall panels. These molds may be assembled using a plurality of bolts threaded through the corresponding apertures in the connecting side walls and molds to make an assembled mold that is the size and shape of a desired interlocking construction block. While various shapes of assembled molds are discussed below, it is understood that these are not the only shapes of molds that can be made with a mold set. Further, while the central core of mold cavity defining mold components 3400 are not shown in FIGS. 38-42, central core of mold cavity defining mold components 3400 may be inserted into the center cavity of any of the female molds discussed below, thereby reducing the negative space in the female mold which reduces overall weight and material needed to manufacture the interlocking construction blocks within the female molds.

Figure 38:
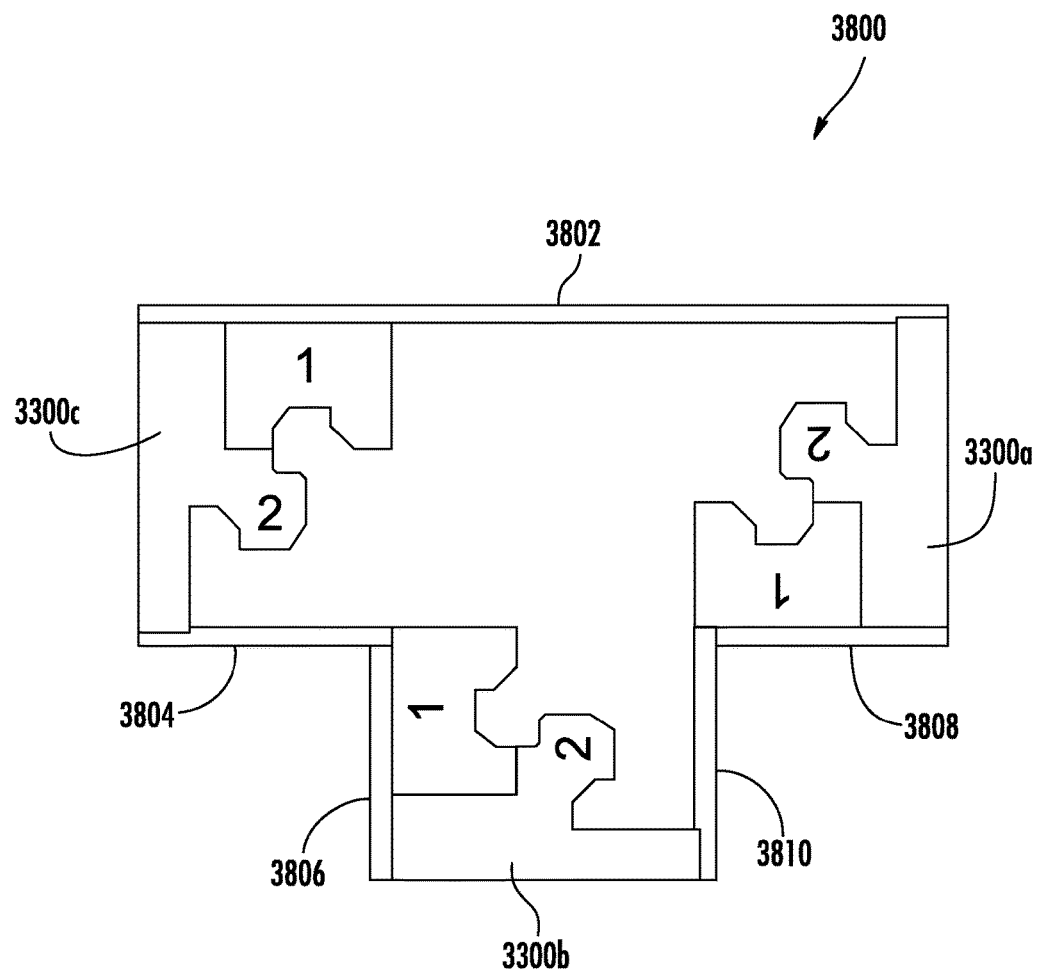
FIG. 38 depicts a top view of an assembled female mold for an interlocking T-section construction block, in accordance with one embodiment of the present disclosure.

FIG. 38 depicts a top view of an assembled female mold 3800 for an interlocking T-section construction block, which is used to connect three walls, in accordance with one embodiment of the present disclosure. The assembled female mold 3800 may be used to construct the T-section constructions blocks of FIGS. 1 and 23.

The assembled female mold 3800 may comprise three two-part molds 3300, each combining the first interlocking mold component 2900 ("1") and the second interlocking mold component 3100 ("2"), and a plurality of connecting side walls. These molds 3300 may be spaced apart from each other in a T-configuration, with two molds 3300a and 3300b positioned opposite each other with the interlocking sections facing each other and connected by a long connecting side wall 3802 on one side. The third mold 3300c may be positioned between the first two molds and oriented 90 degrees from the first two molds with the interlocking section facing inwards. The third mold 3300c may be connected to the two molds 3300a and 3300b opposite the long connecting side wall 3802 with a plurality of short connecting side walls 3804, 3806, 3808, and 3810.

Figure 39:
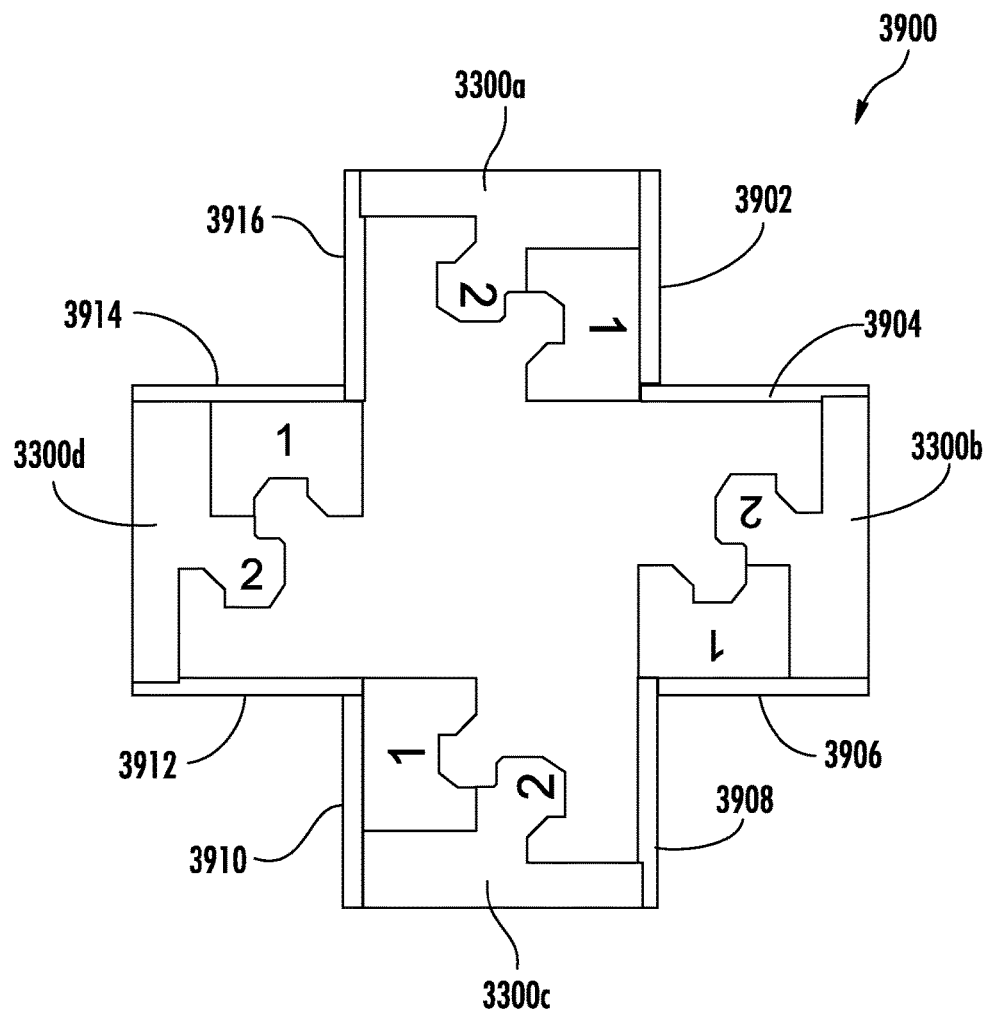
FIG. 39 depicts a top view of an assembled female mold for an interlocking cross-section construction block, in accordance with one embodiment of the present disclosure.

FIG. 39 depicts a top view of an assembled female mold 3900 for an interlocking cross-section construction block, which is used to connect four walls, in accordance with one embodiment of the present disclosure. The assembled female mold 3900 may be used to construct the cross-section constructions blocks of FIGS. 2 and 24.

The assembled female mold 3900 may comprise four two-part molds 3300, each combining the first interlocking mold component 2900 ("1") and the second interlocking mold component 3100 ("2"), and a plurality of connecting side walls. These molds 3300 may be spaced apart from each other in a square configuration, with each mold 3300a, 3300b, 3300c, and 3300d oriented 90 degrees from each other and with the interlocking sections facing inwards. The molds 3300 may each be connected to each other with a plurality of short connecting side walls 3902, 3904, 3906, 3908, 3910, 3912, 3914, and 3916.

Figure 40:
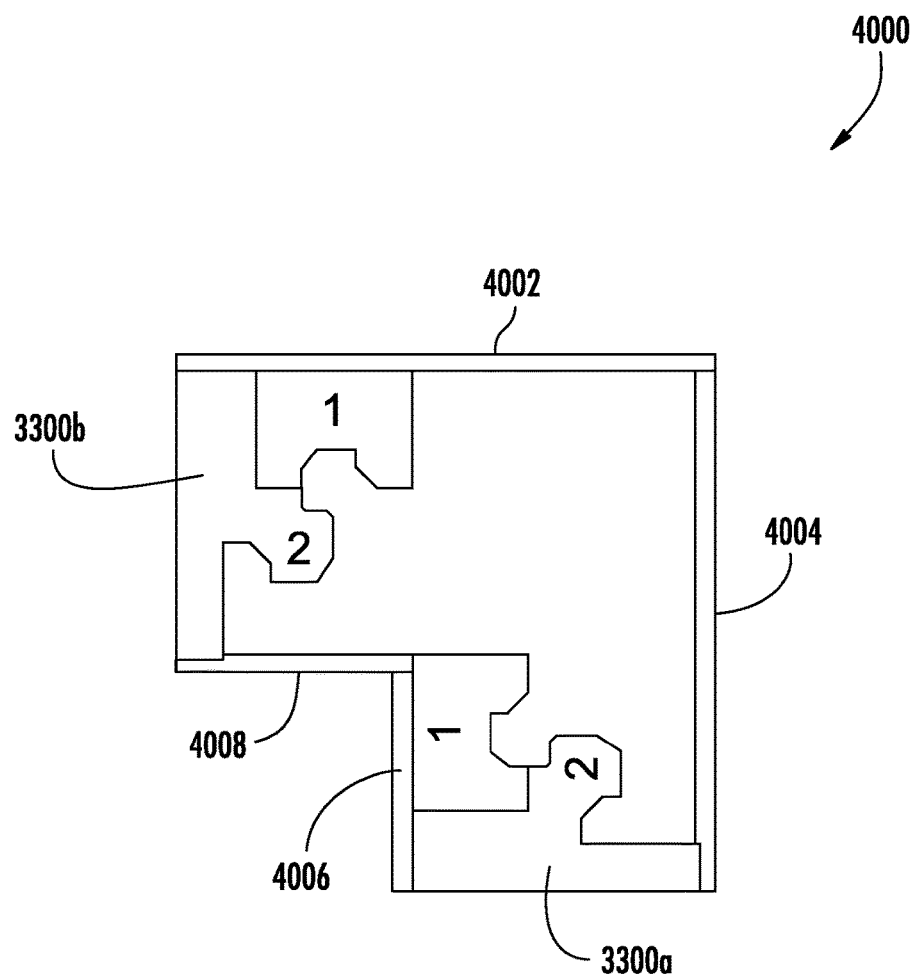
FIG. 40 depicts a top view of an assembled female mold for an interlocking corner-section construction block, in accordance with one embodiment of the present disclosure.

FIG. 40 depicts a top view of an assembled female mold 4000 for an interlocking corner-section construction block, which is used to connect two walls at a corner, in accordance with one embodiment of the present disclosure. The assembled female mold 4000 may be used to construct the corner-section constructions blocks of FIGS. 3 and 25.

The assembled female mold 4000 may comprise two two-part molds 3300, each combining the first interlocking mold component 2900 ("1") and the second interlocking mold component 3100 ("2"), and a plurality of connecting side walls. These molds 3300 may be spaced apart from each other in a corner-configuration, with the molds 3300a and 3300b oriented 90 degrees from each other and with the interlocking sections facing inwards. The molds 3300 may each be connected to each other with two medium connecting side walls 4002 and 4004 forming the outside of the corner and two short connecting side walls 4006 and 4008 forming the inside of the corner.

Figure 41:
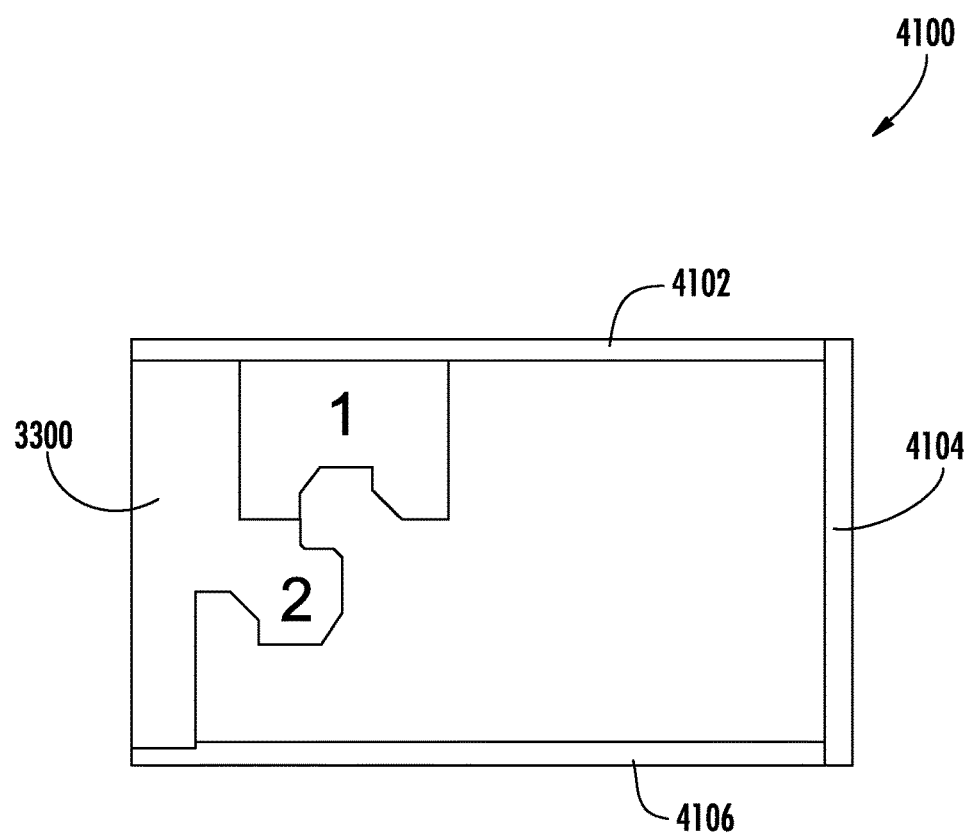
FIG. 41 depicts a top view of an assembled female mold for an interlocking end-piece construction block, in accordance with one embodiment of the present disclosure.

FIG. 41 depicts a top view of an assembled female mold 4100 for an interlocking end-piece construction block, in accordance with one embodiment of the present disclosure. The assembled female mold 4100 may be used to construct the end-piece constructions blocks of FIGS. 4 and 26.

The assembled female mold 4100 may comprise one two-part molds 3300, each combining the first interlocking mold component 2900 ("1") and the second interlocking mold component 3100 ("2"), and a plurality of connecting side walls. The mold 3300 may be positioned with the interlocking section facing inwards with two long connecting side walls 4102 and 4106 extending away from the interlocking section and connected by a medium connecting sidewall 4104 that is opposite the mold 3300 and the width of the mold 3300.

Figure 42:
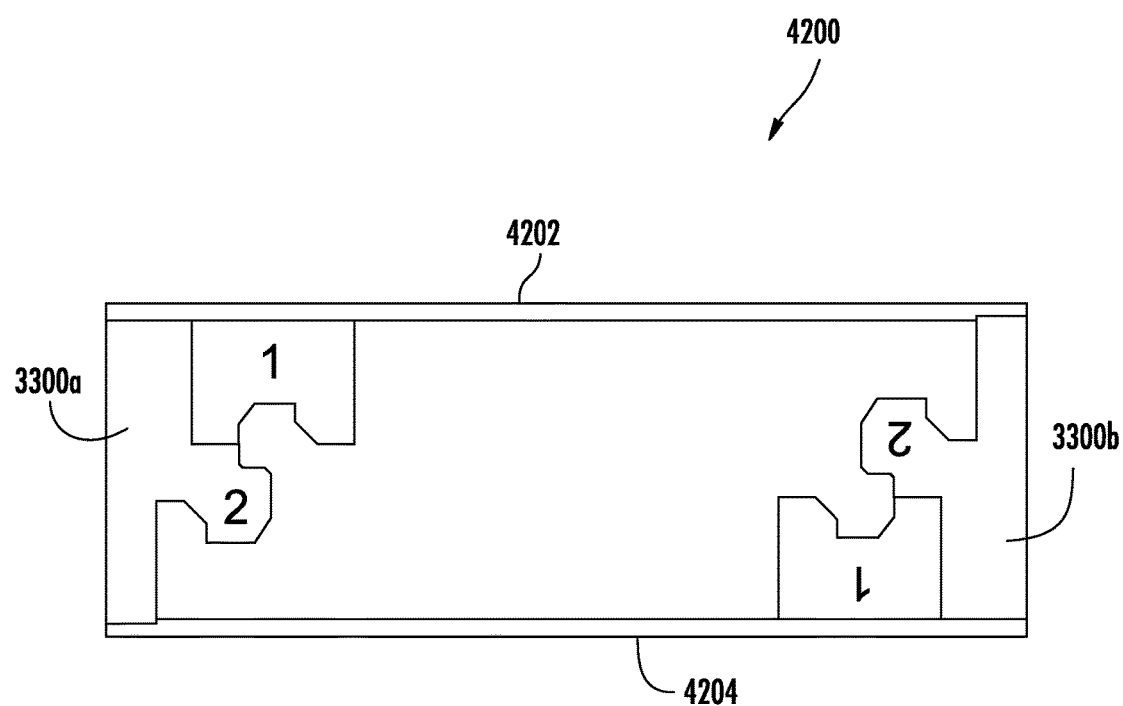
FIG. 42 depicts a top view of an assembled female mold of an interlocking stretcher construction block, in accordance with one embodiment of the present disclosure.

FIG. 42 depicts a top view of an assembled female mold 4200 for of an interlocking stretcher construction block, in accordance with one embodiment of the present disclosure. The assembled female mold 4200 may be used to construct the stretcher constructions blocks of FIGS. 5 and 27.

The assembled female mold 4200 may comprise two two-part molds 3300, each combining the first interlocking mold component 2900 ("1") and the second interlocking mold component 3100 ("2"), and a plurality of connecting side walls. These molds 3300 may be spaced apart from each other and with the interlocking sections facing inwards. The molds 3300a and 3300b may each be connected to each other with two long connecting sidewalls 4202 and 4204.

In each of the assembled female molds depicted in FIGS. 38-42, the molds may be full height or half-height, allowing the resulting manufactured construction blocks to be alternated in an interlocking pattern between the seams of the blocks in the wall, creating a "woven" effect which locks the blocks in place in three axes and allows even distribution of structural weights and stresses, even during seismic or wind events.

Figure 43:
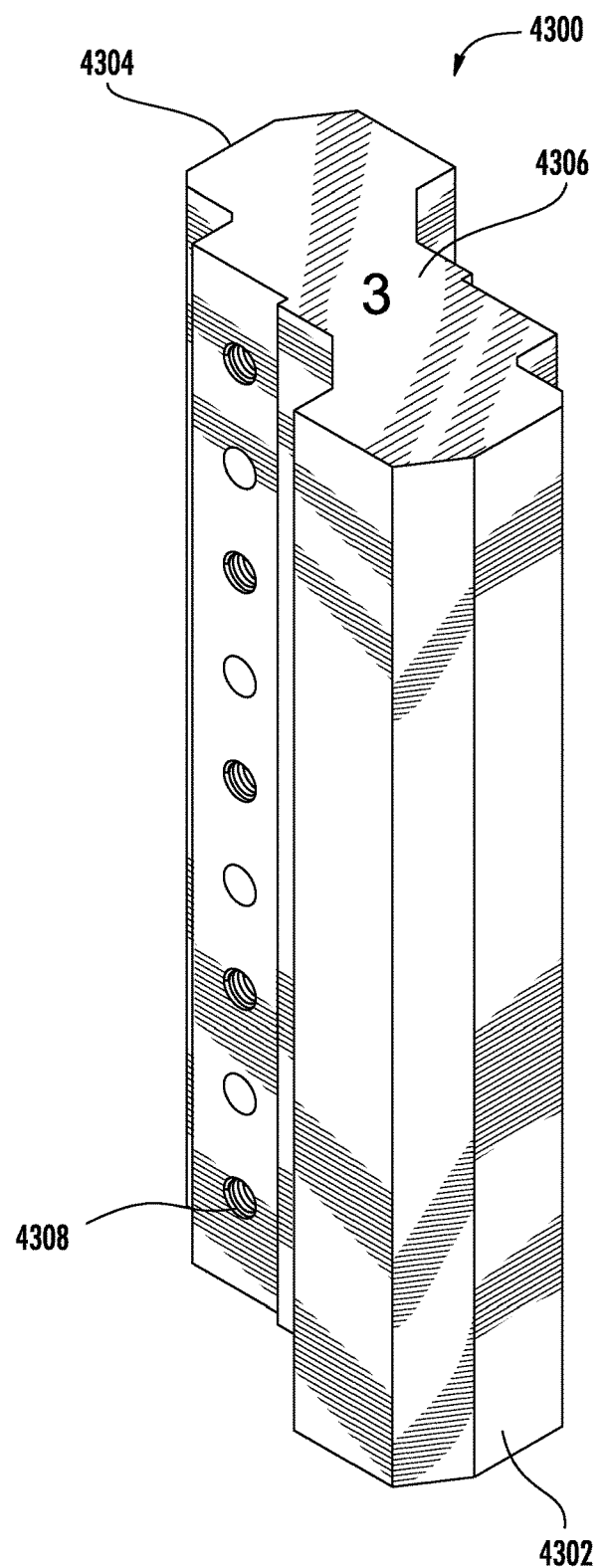
FIG. 43 depicts a perspective view of a third interlocking mold component, in accordance with one embodiment of the present disclosure.
Figure 44:
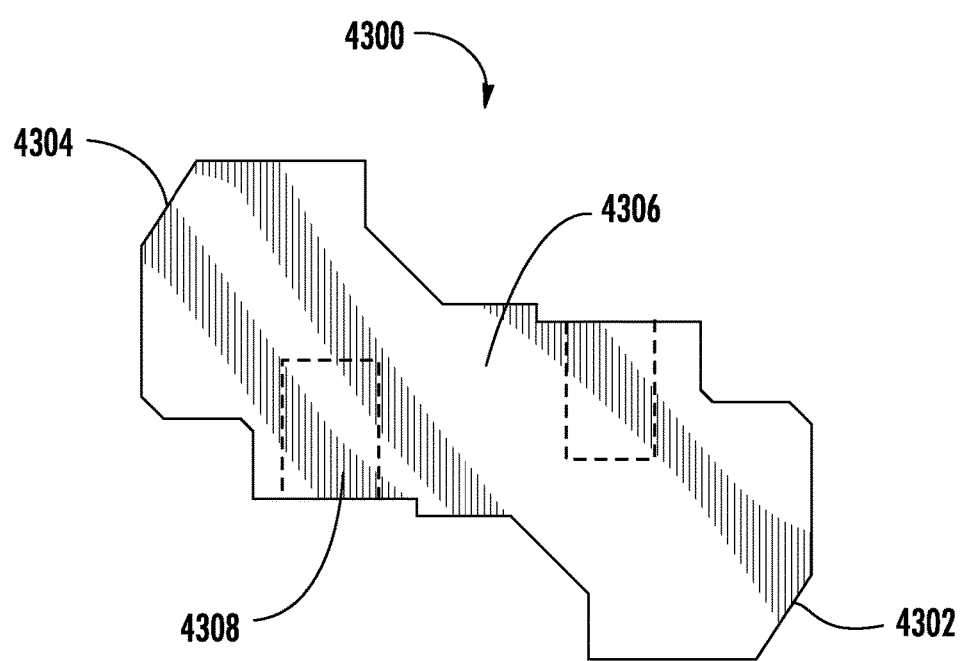
FIG. 44 depicts a top view of the third interlocking mold component of FIG. 43, in accordance with one embodiment of the present disclosure.

FIG. 43 depicts a perspective view and FIG. 44 depicts a top view of a third interlocking mold component 4300, in accordance with one embodiment of the present disclosure. The third interlocking mold component 4300, or "3" in some views, when combined with two interlocking mold components 2900, or "1" in some views, to create a repeating pattern that can be used to manufacture more than one interlocking construction block at a time.

As seen in FIG. 43, the third interlocking mold component 4300 may be a generally vertical mold and may comprise two geometric protrusions 4302 and 4304 connected by a central shoulder section 4306. Like the geometric protrusion 3104 of the second interlocking mold component 3100, the geometric protrusions 4302 and 4304 may be sized and shaped to form a gap between the first and second interlocking portions of an interlocking block that is created with the mold set. When combined with the two first interlocking mold components 2900, two geometric recess may be sized and shaped to form a first interlocking portion catch of an interlocking block that is created with the mold set.

Both geometric protrusions 4302 and 4304 may comprise a plurality of apertures 4308 that may extend within, but not through, the geometric protrusions 4302 and 4304. These apertures 4308 may be used to connect the first interlocking mold components 2900 to the third interlocking mold component 4300.

In an embodiment, the third mold component 4300 may have outer dimensions of approximately 100 mm by 70 mm, and more specifically, may have outer dimensions of approximately 97.5 mm by 72.5 mm. In an embodiment, the mold 4300 may weigh between 5 and 8 kilograms, and more specifically, may weigh approximately 6.37 kilograms.

Figure 45:
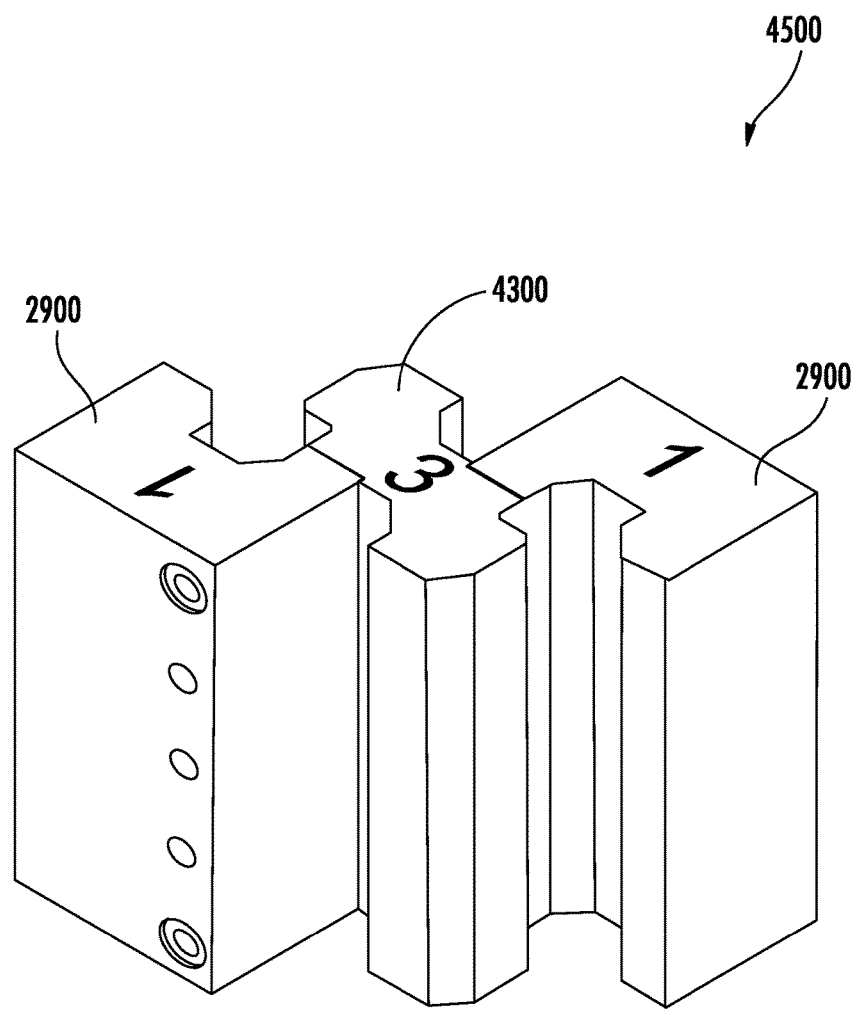
FIG. 45 depicts a perspective view of two first interlocking mold components of FIG. 29 connected to the third interlocking mold component of FIG. 43 to create a three-part repeating interlocking section mold, in accordance with one embodiment of the present disclosure.

FIG. 45 depicts a perspective view of two first interlocking mold components 2900 of FIG. 29 connected to the third interlocking mold component 4300 of FIG. 43 to create a three-part interlocking section mold 4500, in accordance with one embodiment of the present disclosure.

When the apertures 2912 of the first interlocking mold components 2900 and the apertures 4308 of the third interlocking mold component 4300 are aligned, threaded bolts (not shown) may be inserted through washers (not shown) and threaded into the apertures 2912 of the first interlocking mold components 2900 and then threaded into the apertures 4308 of the third interlocking mold component 4300. Once connected, the three-part mold 4500 may be used to create a repeating interlocking section of an interlocking construction block. This three-part mold 4500 using two molds 1 and one mold 3 may be used to create two interlocking sections for molds for any shape and size of interlocking construction block by using a combination of two-part molds, connecting side walls, and connecting end walls.

Figure 46:
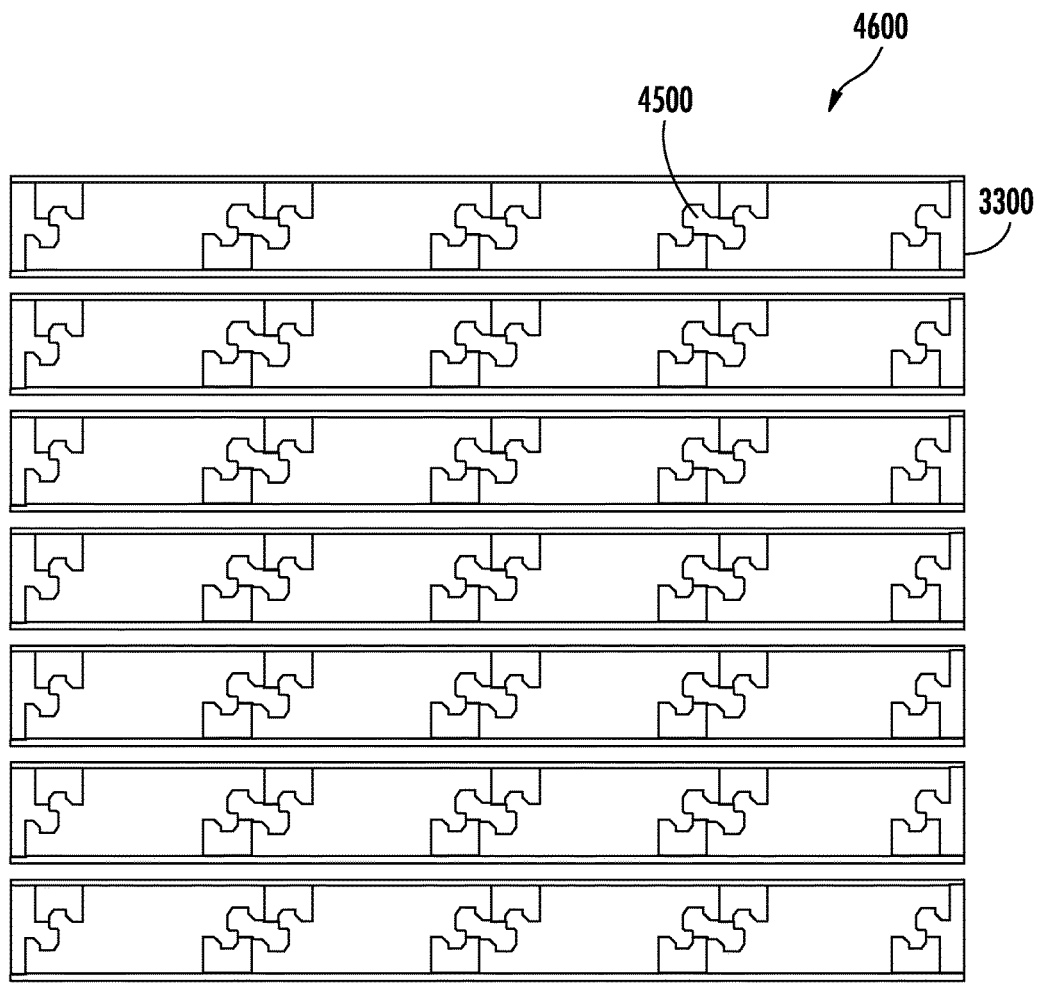
FIG. 46 depicts a top view of an assembled female mold for a plurality of interlocking stretcher construction blocks, in accordance with one embodiment of the present disclosure.

FIG. 46 depicts a top view of an assembled repeating female mold 4600 for a plurality of interlocking stretcher construction blocks, in accordance with one embodiment of the present disclosure. A plurality of two-part molds 3300 can be combined with a plurality of three-part molds 4500 and extended connecting side walls 4602 and 4604 to create the repeating female mold 4600 in order to manufacture four stretcher interlocking construction blocks at a time. Any number "x" of interlocking construction blocks may be manufactured in a line by placing two two-part molds 3300 at the ends and separating them with (x−1) three-part molds 4500. In addition, and as shown in FIG. 46, rows of repeating female molds 4600 may be connected end to end with connecting end walls to create a repeating female mold with more than one row of interlocking construction blocks. By utilizing the three-part molds 4500, more than one interlocking construction block can be poured at a time, reducing the time required to manufacture each block.

These repeating female molds 4600 may be assembled using a plurality of bolts threaded through the corresponding apertures in the connecting side walls and molds in order to make an assembled mold that results in the desired number of interlocking construction blocks. Further, while central core of mold cavity defining mold components 3400 are not shown in FIG. 46, central core of mold cavity defining mold components 3400 may be inserted into the center cavity of any of the female molds, thereby reducing the overall weight and material needed to manufacture the interlocking construction blocks.

The modular molds described in FIGS. 29-46 may be manufactured from steel or stainless steel, depending on the environment that the molds will be used in. These molds will be able to withstand high pressures and temperatures in order to allow concrete blocks to be formed within the molds.

Additional Interlocking Construction Blocks and Related Mold Set Embodiments

The interlocking construction blocks and related mold sets of FIGS. 52-79, described below, may be similar to the interlocking construction blocks and mold sets described in FIGS. 1-46, but may additionally include internal mesh cages for reinforcement, as described in FIGS. 47-48. Therefore, the disclosure of FIGS. 1-46 is herein incorporated by reference in relation to FIGS. 52-79.

Figure 52:
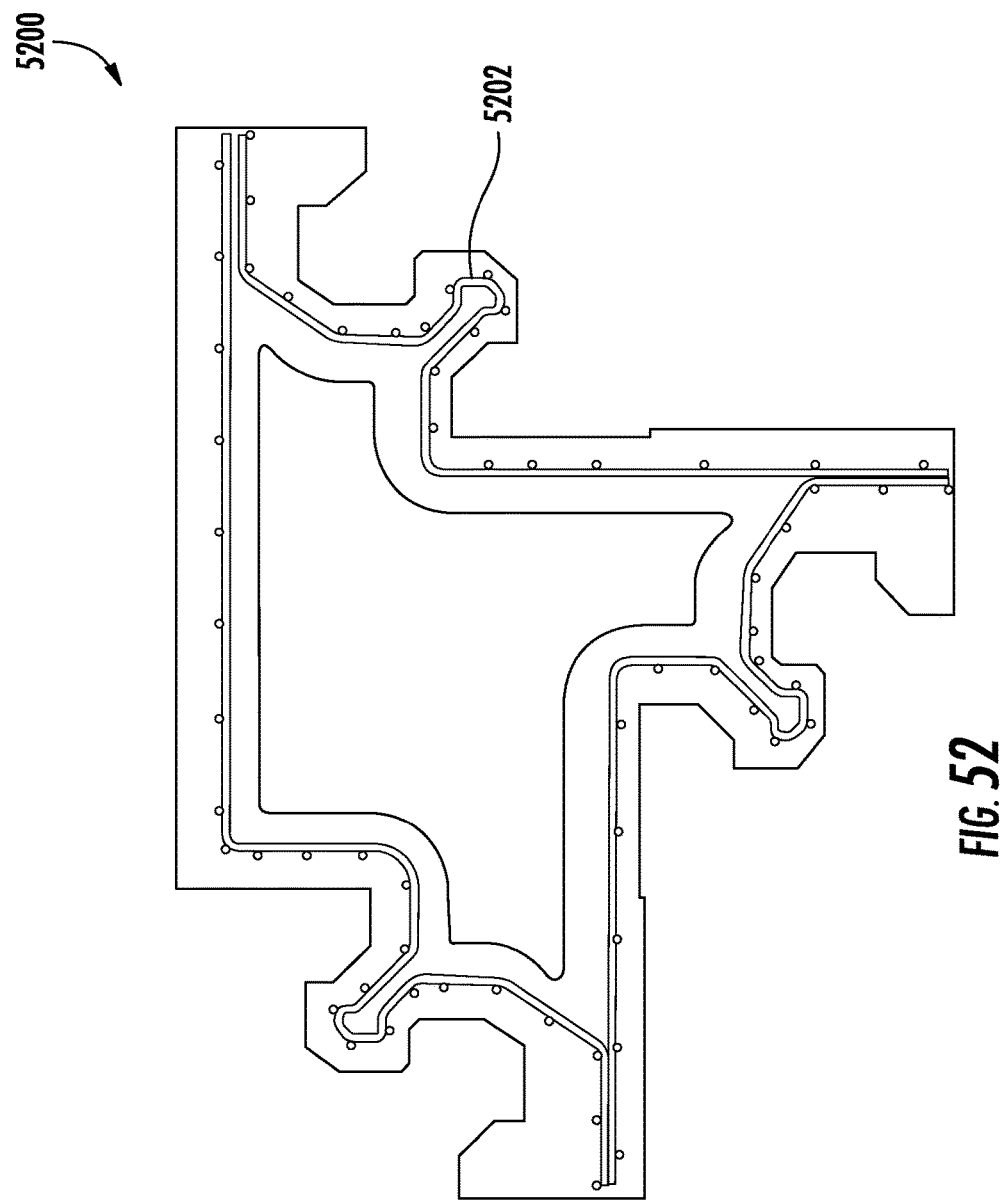
FIG. 52 depicts a top view of an interlocking reinforced concrete T-section construction block with an internal mesh cage, in accordance with one embodiment of the present disclosure.
Figure 53:
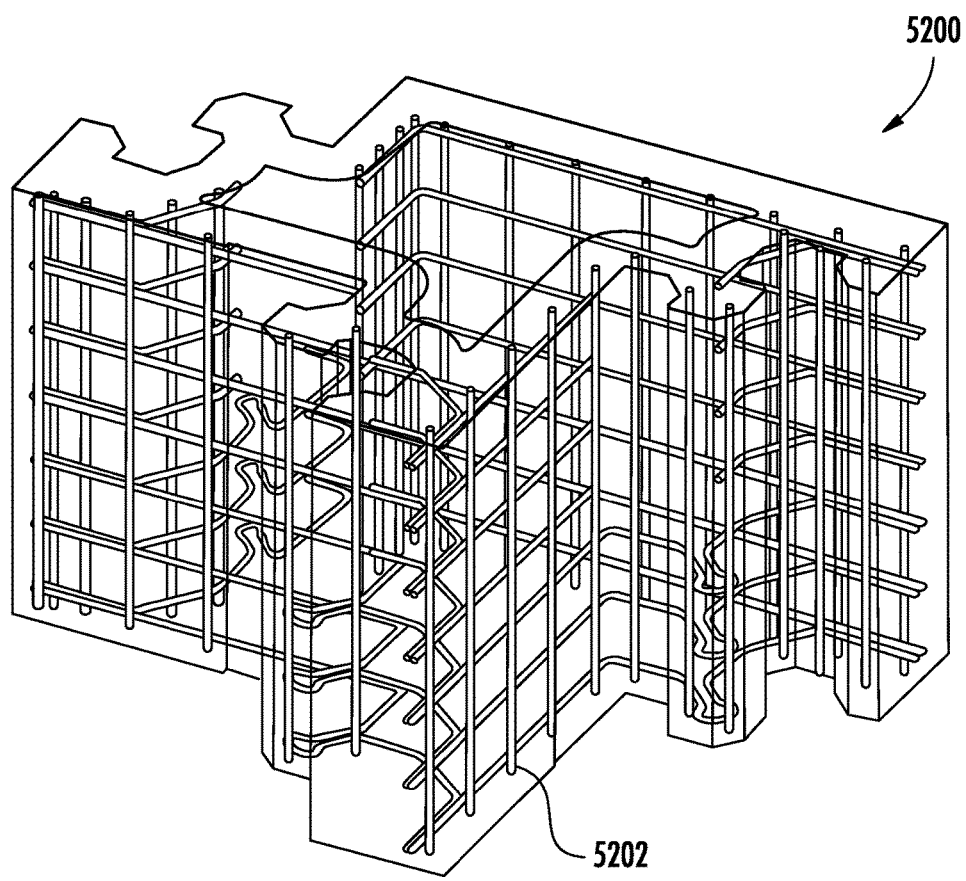
FIG. 53 depicts a perspective view of the interlocking T-section construction block of FIG. 52, with the block's concrete material made transparent to show the internal mesh cage inside the block, in accordance with one embodiment of the present disclosure.
Figure 54:
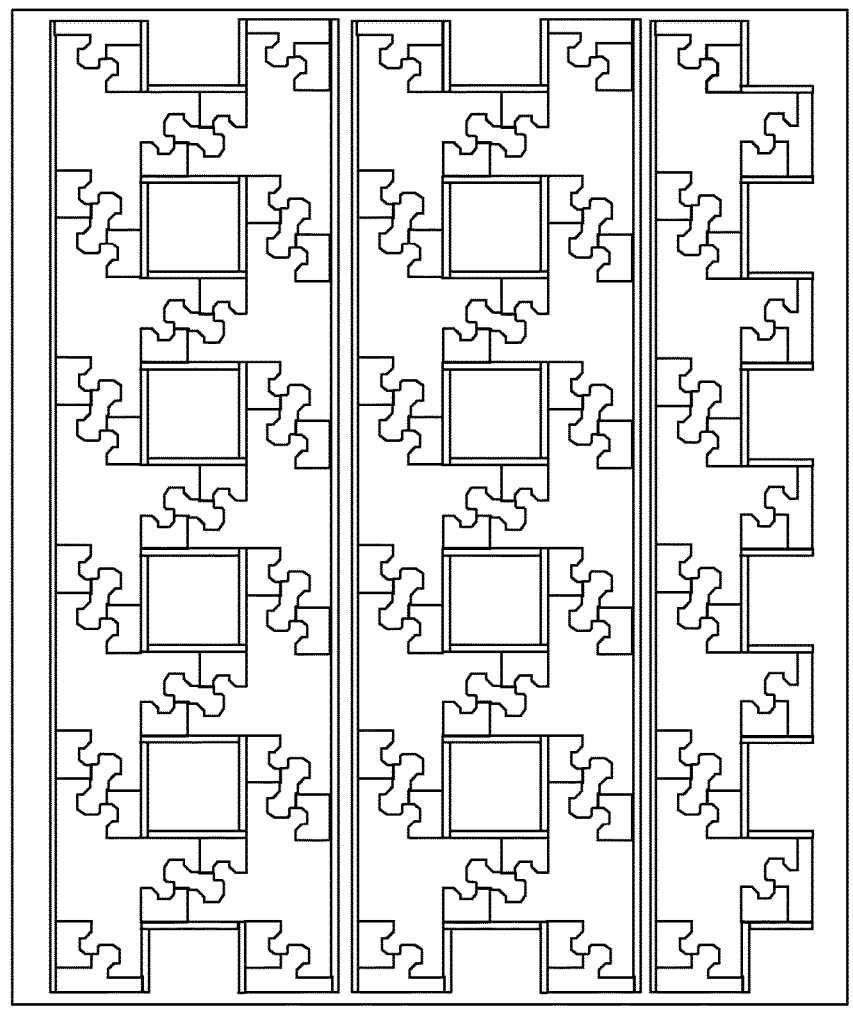
FIG. 54 depicts a top view of an assembled repeating female mold for a plurality of the interlocking T-section construction blocks of FIG. 52, in accordance with one embodiment of the present disclosure.
Figure 55:
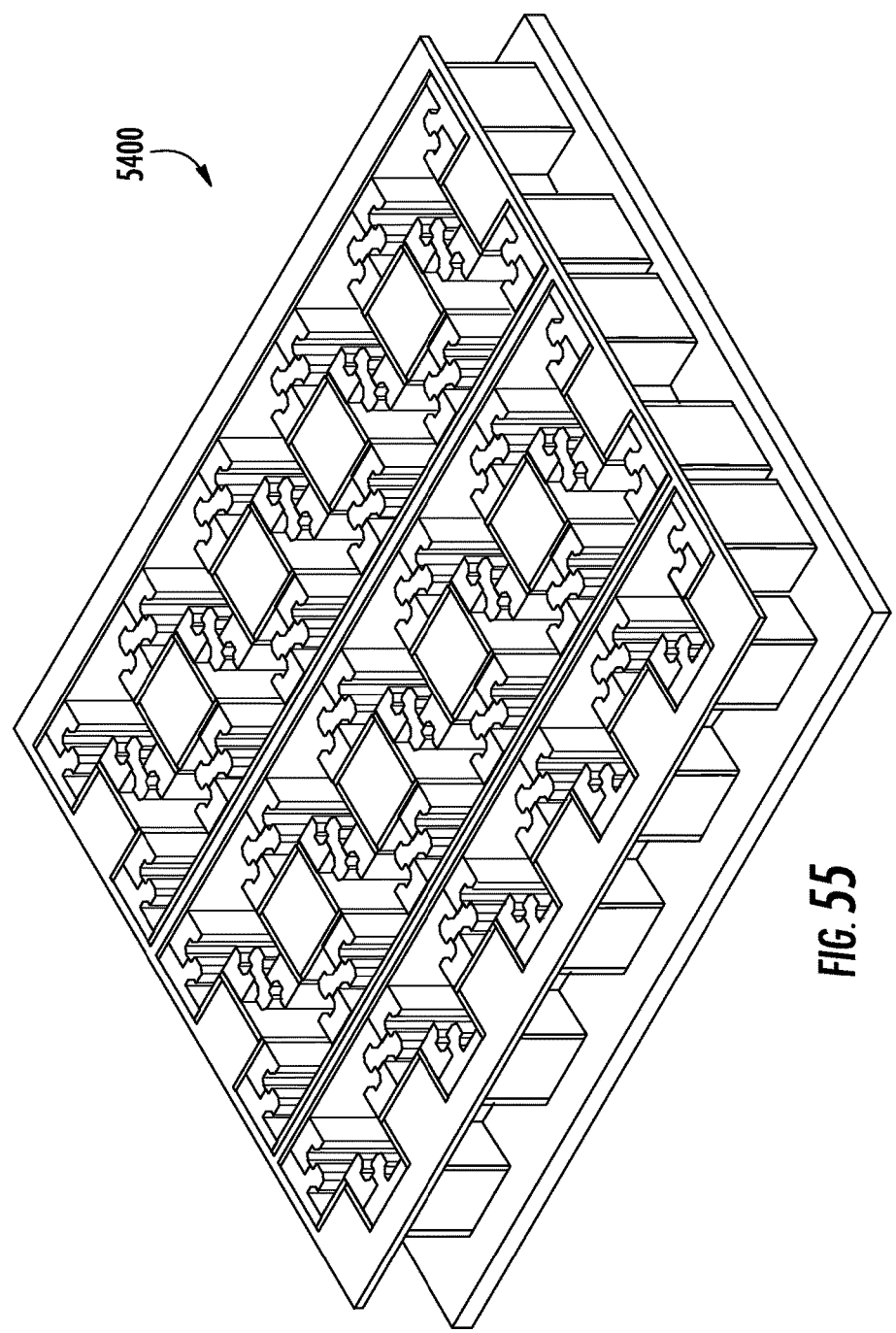
FIG. 55 depicts a perspective view of the assembled repeating female mold of FIG. 54, in accordance with one embodiment of the present disclosure.

FIG. 52 depicts a top view and FIG. 53 depicts a perspective view of an interlocking T-section construction block 5200 with an internal mesh cage 5202, in accordance with one embodiment of the present disclosure. FIG. 54 depicts a top view and FIG. 55 depicts a perspective view of an assembled repeating female mold 5400 for manufacturing a plurality of the interlocking T-section construction blocks 5200 of FIG. 52, which is used to connect three walls, in accordance with one embodiment of the present disclosure. As shown in FIGS. 54-55, the disclosed female mold 5400 comprises 25 cavities for manufacturing 25 construction blocks 5200, although any number of cavities may be provided in the female mold 5400 for making a desired number of T-section construction blocks 5200.

Figure 57:
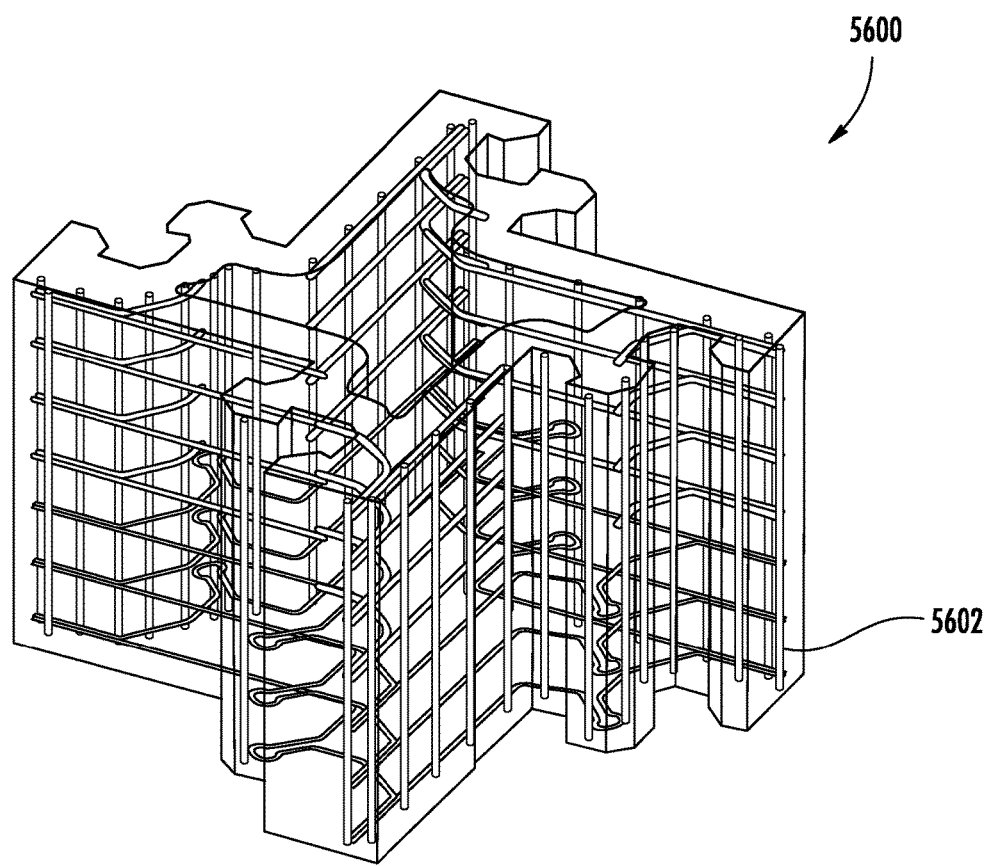
FIG. 57 depicts a perspective view of the interlocking reinforced concrete cross-section construction block of FIG.

FIG. 56 depicts a top view and FIG. 57 depicts a perspective view of an interlocking cross-section construction block 5600 with an internal mesh cage 5602, which is used to connect four walls, in accordance with one embodiment of the present disclosure. FIG. 58 depicts a top view and FIG. 59 depicts a perspective view of an assembled repeating female mold 5800 for manufacturing a plurality of the interlocking cross-section construction blocks 5600 of FIG. 56, which is used to connect four walls, in accordance with one embodiment of the present disclosure. As shown in FIGS. 58-59, the disclosed female mold 5800 comprises 20 cavities for manufacturing 20 construction blocks 5600, although any number of cavities may be provided in the female mold 5800 for making a desired number of cross-section construction blocks 5600.

FIG. 60 depicts a top view and FIG. 61 depicts a perspective view of an interlocking corner-section construction block 6000 with an internal mesh cage 6002, in accordance with one embodiment of the present disclosure. FIG. 62 depicts a top view and FIG. 63 depicts a perspective view of an assembled repeating female mold 6200 for manufacturing a plurality of the interlocking corner-section construction blocks 6000 of FIG. 60, in accordance with one embodiment of the present disclosure. As shown in FIGS. 62-63, the disclosed female mold 6000 comprises 30 cavities for manufacturing 30 construction blocks 6000, although any number of cavities may be provided in the female mold 6200 for making a desired number of corner-section construction blocks 6000.

FIG. 64 depicts a top view and FIG. 65 depicts a perspective view of an interlocking end-section construction block 6400 with an internal mesh cage 6402, in accordance with one embodiment of the present disclosure. FIG. 66 depicts a top view and FIG. 67 depicts a perspective view of an assembled repeating female mold 6600 for manufacturing a plurality of the interlocking end-section construction blocks 6400 of FIG. 64, in accordance with one embodiment of the present disclosure. As shown in FIGS. 66-67, the disclosed female mold 6600 comprises 42 cavities for manufacturing 42 construction blocks 6400, although any number of cavities may be provided in the female mold 6600 for making a desired number of end-section construction blocks 6400.

FIG. 68 depicts a top view and FIG. 69 depicts a perspective view of an interlocking stretcher construction block 6800 with an internal mesh cage 6802, in accordance with one embodiment of the present disclosure. FIG. 70 depicts a top view and FIG. 71 depicts a perspective view of an assembled repeating female mold 7000 for manufacturing a plurality of the interlocking stretcher construction blocks 6800 of FIG. 68, in accordance with one embodiment of the present disclosure. As shown in FIGS. 70-71, the disclosed female mold 7000 comprises 28 cavities for manufacturing 28 construction blocks 6800, although any number of cavities may be provided in the female mold 7000 for making a desired number of stretcher construction blocks 6800. In the embodiments depicted in FIGS. 68-71, the resulting stretcher construction blocks 6800 may be standard 12" long and 8" tall stretcher blocks.

FIG. 72 depicts a top view and FIG. 73 depicts a perspective view of an interlocking half-stretcher construction block 7200 with an internal mesh cage 7202, in accordance with one embodiment of the present disclosure. FIG. 74 depicts a top view and FIG. 75 depicts a perspective view of an assembled repeating female mold 7000 for manufacturing a plurality of the interlocking half-stretcher construction blocks 7200 of FIG. 72, in accordance with one embodiment of the present disclosure. As shown in FIGS. 74-75, the disclosed female mold 7400 comprises 28 cavities for manufacturing 28 construction blocks 7200, although any number of cavities may be provided in the female mold 7400 for making a desired number of half-stretcher construction blocks 7200. In the embodiments depicted in FIGS. 72-75, the resulting half-stretcher construction blocks 7200 may be standard 12" long and 4" tall half-stretcher blocks.

FIG. 76 depicts a top view and FIG. 77 depicts a perspective view of an interlocking 9" spacer construction block 7600 with an internal mesh cage 7602, in accordance with one embodiment of the present disclosure. FIG. 78 depicts a top view and FIG. 79 depicts a perspective view of an assembled repeating female mold 7800 for manufacturing a plurality of the interlocking 9" stretcher construction blocks 7600 of FIG. 68, in accordance with one embodiment of the present disclosure. As shown in FIGS. 78-79, the disclosed female mold 7800 comprises 28 cavities for manufacturing 28 construction blocks 7600, although any number of cavities may be provided in the female mold 7800 for making a desired number of 9" spacer construction blocks 7600. In the embodiments depicted in FIGS. 76-79, the resulting stretcher construction blocks 7600 may be 9" long and 8" tall stretcher blocks, although other lengths of stretcher blocks 7600 to create desired lengths of wall structures.

As depicted in FIGS. 52-79, one or more repeating mold components may be received within the central cavity, thereby creating repeating geometric openings and reducing the volume of the central cavities within the female mold. In an embodiment, the one or more repeating mold components may be the geometric third interlocking mold components depicted in FIG. 43, which are used to create repeating patterns within the central cavity. In an embodiment, the one or more repeating mold components may be square or rectangular repeating mold components, which are used to reduce the overall volume of the central cavity within the female mold. By reducing the overall volume of the central cavity, the amount of raw material received within the central cavity and needed to create the construction blocks is also reduced.

It is to be understood that in order to interlock and self-align properly, different blocks within a family of an interlocking construction block system will utilize the same geometries of interlocking portions. That is, the interlocking construction blocks of FIGS. 1-6 may interlock and self-align with each other without the use of a binding agent such as mortar during assembly, the interlocking construction blocks of FIGS. 23-28 may interlock and self-align with each other without the use of a binding agent such as mortar during assembly, and the interlocking construction blocks of FIGS. 52-79 may interlock and self-align with each other without the use of a binding agent such as mortar during assembly. But blocks with different interlocking section geometries may not interlock and self-align with each other without the use of a binding agent such as mortar during assembly.

In each of the embodiments described in relation to FIGS. 1-28 and FIGS. 52-79, the interlocking constructions blocks are operable to interlock with each other in at least three directions. The blocks may interlock along three axes: a left/right axis, a front/back axis, and an up/down axis. Each of the various configurations of blocks can be manufactured in different widths to conform to building code requirements around the world.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

The term "or combinations thereof" as used herein refers to all permutations and combinations of the listed items preceding the term. For example, "A, B, C, or combinations thereof is intended to include at least one of: A, B, C, AB, AC, BC, or ABC, and if order is important in a particular context, also BA, CA, CB, CBA, BCA, ACB, BAC, or CAB.

Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. An interlocking construction block, comprising:
   (a) a core section comprising:
      one or more wall sides; and
      first and second interlocking section attachment sides; and
   (b) a first interlocking section comprising:
      (i) a first interlocking portion, which is defined by;
         a first interlocking portion attachment end;
         a first interlocking portion catch end; and
         a first interlocking portion catch;
      (ii) a second interlocking portion, which is defined by;
         a second interlocking portion attachment end; and
         a second interlocking portion key;
   (c) a second interlocking section comprising:
      (i) a third interlocking portion, which is defined by;
         a third interlocking portion attachment end;
         a third interlocking portion catch end; and
         a third interlocking portion catch;
      (ii) a fourth interlocking portion, which is defined by;
         a fourth interlocking portion attachment end; and
         a fourth interlocking portion key; and
   (d) a first interlocking section bridge operable to connect the first interlocking section (b) to the first interlocking section attachment side of the core section, and a second interlocking section bridge operable to connect the second interlocking section (c) to the second interlocking section attachment side of the core section, wherein the second interlocking section attachment side is opposite the first interlocking section attachment side.

2. The interlocking construction block of claim 1, wherein the one or more wall sides of the core section further comprise a first wall side end and a second wall side end.

3. The interlocking construction block of claim 2, wherein the first interlocking section attachment side further comprises a first interlocking section attachment side end and the second interlocking section attachment side further comprises a second interlocking section attachment side end.

4. The interlocking construction block of claim 3, wherein each of the first and second interlocking sections further comprise one or more negative space gaps operable to receive an interlocking section of a second interlocking construction block.

5. The interlocking construction block of claim 1, wherein the first and second interlocking sections are spaced approximately 180 degrees from each other about the core section such that the block is operable to create a section of a straight wall structure.

6. The interlocking construction block of claim 5, wherein the block is approximately 8" tall and is a stretcher block.

7. The interlocking construction block of claim 5, wherein the block is approximately 4" tall and is a half-stretcher block.

8. The interlocking construction block of claim 1, further comprising an internal channel intersecting the core section about a horizontal longitudinal axis, the internal channel configured to receive a reinforcing member or operable as an internal conduit.

9. The interlocking construction block of claim 1, wherein the block is constructed from a cement mixture, aggregate, sand, water, or other raw materials hardened into concrete.

10. An interlocking construction block, comprising:
   (a) a core section comprising:
      one wall side; and
      first, second and third interlocking section attachment sides; and
   (b) a first interlocking section comprising:
      (i) a first interlocking portion, which is defined by;
         a first interlocking portion attachment end;
         a first interlocking portion catch end; and
         a first interlocking portion catch;
      (ii) a second interlocking portion, which is defined by;
         a second interlocking portion attachment end; and
         a second interlocking portion key;
   (c) a second interlocking section comprising:
      (i) a third interlocking portion, which is defined by;
         a third interlocking portion attachment end;
         a third interlocking portion catch end; and
         a third interlocking portion catch;
      (ii) a fourth interlocking portion, which is defined by;
         a fourth interlocking portion attachment end; and
         a fourth interlocking portion key;
   (d) a third interlocking section comprising:
      (i) a fifth interlocking portion, which is defined by;
         a fifth interlocking portion attachment end;
         a fifth interlocking portion catch end; and
         a fifth interlocking portion catch;
      (ii) a sixth interlocking portion, which is defined by;
         a sixth interlocking portion attachment end; and
         a sixth interlocking portion key; and
   (e) (i) a first interlocking section bridge operable to connect the first interlocking section (b) to the first interlocking section attachment side of the core section,
      (ii) a second interlocking section bridge operable to connect the second interlocking section (c) to the second interlocking section attachment side of the core section, the second interlocking section attachment side spaced approximately 90 degrees from the first interlocking section attachment side; and
      (iii) a third interlocking section bridge operable to connect the third interlocking section (d) to the third interlocking section attachment side of the core section, the third interlocking section attachment side spaced approximately 90 degrees from the second interlocking section attachment side and approximately 180 degrees from the first interlocking section attachment side.

11. The interlocking construction block of claim 10, further comprising internal channels intersecting the core section about a horizontal longitudinal axis and a horizontal lateral axis, wherein each of the internal channels is configured to receive a reinforcing member or operable as an internal conduit.

12. The interlocking construction block of claim 10, wherein each of the first, second and third interlocking sections further comprises one or more negative space gaps operable to receive an interlocking section of a second interlocking construction block.

13. The interlocking construction block of claim 10, wherein the first interlocking section and the second interlocking section are spaced approximately 90 degrees from each other about the core section, and the second interlocking section and the third interlocking section are spaced approximately 90 degrees from each other about the core section, such that the block is operable to create a T-section construction block.

14. The interlocking construction block of claim 10, wherein the block is operable to connect three wall structures, wherein a first wall structure is spaced approximately 90 degrees from a second wall structure, and wherein a third wall structure is spaced approximately 90 degrees from the second wall structure and approximately 180 degrees from the first wall structure.

15. An interlocking construction block, comprising:
 (a) a core section having four interlocking section attachment sides; and
 (b) four interlocking sections, each interlocking section comprising:
  (i) a first interlocking portion, which is defined by;
   a first interlocking portion attachment end;
   a first interlocking portion catch end; and
   a first interlocking portion catch;
  (ii) a second interlocking portion, which is defined by;
   a second interlocking portion attachment end; and
   a second interlocking portion key; and
 (c) four interlocking section bridges, wherein:
  (i) a first interlocking section bridge is configured to connect the first interlocking section to the first interlocking section attachment side of the core section;
  (ii) a second interlocking section bridge is configured to connect the second interlocking section to the second interlocking section attachment side of the core section, wherein the second interlocking section attachment side is spaced approximately 90 degrees from the first interlocking section attachment side;
  (iii) a third interlocking section bridge is configured to connect the third interlocking section to the third interlocking section attachment side of the core section, wherein the third interlocking section attachment side is spaced approximately 90 degrees from the second interlocking section attachment side; and
  (iv) a fourth interlocking section bridge is configured to connect the fourth interlocking section to the fourth interlocking section attachment side of the core section, wherein the fourth interlocking section attachment side is spaced approximately 90 degrees from the third interlocking section attachment side.

16. The interlocking construction block of claim 15, further comprising internal channels intersecting the core section about a horizontal longitudinal axis and a horizontal lateral axis, wherein each of the internal channels is configured to receive a reinforcing member or operable as an internal conduit.

17. The interlocking construction block of claim 15, wherein each of the first, second, third and fourth interlocking sections further comprises one or more negative space gaps operable to receive an interlocking section of a second interlocking construction block.

18. The interlocking construction block of claim 15, wherein the first interlocking section and the second interlocking section are spaced approximately 90 degrees from each other about the core section, the second interlocking section and the third interlocking section are spaced approximately 90 degrees from each other about the core section, and the third interlocking section and the fourth interlocking section are spaced approximately 90 degrees from each other about the core section, such that the block is operable to create a cross-section construction block.

19. The interlocking construction block of claim 15, wherein the block is operable to connect four wall structures, wherein each of the four wall structures is spaced approximately 90 degrees from one another.

* * * * *